United States Patent
Nan et al.

(10) Patent No.: US 12,096,380 B2
(45) Date of Patent: *Sep. 17, 2024

(54) PHYSICAL RANDOM ACCESS CHANNEL ENHANCED TRANSMISSION METHOD, NETWORK DEVICE, AND TERMINAL

(71) Applicant: Huawei Technologies Co., Ltd., Shenzhen (CN)

(72) Inventors: Fang Nan, Shenzhen (CN); Xingqing Cheng, Beijing (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,434

(22) Filed: Aug. 6, 2021

(65) Prior Publication Data
US 2022/0039170 A1      Feb. 3, 2022

Related U.S. Application Data

(63) Continuation of application No. 16/056,182, filed on Aug. 6, 2018, now Pat. No. 11,089,556, which is a
(Continued)

(51) Int. Cl.
*H04W 52/36* (2009.01)
*H04W 52/14* (2009.01)
(Continued)

(52) U.S. Cl.
CPC ....... *H04W 52/362* (2013.01); *H04W 52/146* (2013.01); *H04W 52/242* (2013.01);
(Continued)

(58) Field of Classification Search
CPC ............. H04W 52/146; H04W 52/242; H04W 52/36; H04W 52/362; H04W 52/50;
(Continued)

(56) References Cited

U.S. PATENT DOCUMENTS 9,281,931 B2    3/2016  Kwon et al.
9,674,796 B2 *  6/2017  Nan .................. H04W 52/362
(Continued)

FOREIGN PATENT DOCUMENTS

CN      1960209 A       5/2007
CN    101123467 A       2/2008
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.0.0, pp. 1-58, 3rd Generation Partnership Project, Valbonne, France (Dec. 2013).
(Continued)

*Primary Examiner* — Kashif Siddiqui
(74) *Attorney, Agent, or Firm* — Leydig, Voit & Mayer, Ltd.

(57) ABSTRACT

A physical random access channel enhanced transmission method, a network device, and a terminal are disclosed, where implementation of the terminal is used as an example, and the terminal includes: a processor, configured to determine level information of physical random access channel PRACH enhanced transmission; and to determine a first characteristic parameter that is of PRACH enhanced transmission and that is related to the determined level information of PRACH enhanced transmission, where the first characteristic parameter includes transmit power and a preamble format; and a transmitter, configured to perform PRACH enhanced sending according to the first characteristic parameter determined by the processor.

20 Claims, 8 Drawing Sheets

Related U.S. Application Data continuation of application No. 15/588,504, filed on May 5, 2017, now Pat. No. 10,070,399, which is a continuation of application No. 15/221,320, filed on Jul. 27, 2016, now Pat. No. 9,674,796, which is a continuation of application No. PCT/CN2014/071664, filed on Jan. 28, 2014.

(51) Int. Cl.
| | | |
|---|---|---|
| *H04W 52/24* | (2009.01) | |
| *H04W 52/50* | (2009.01) | |
| *H04W 74/00* | (2009.01) | |
| *H04W 74/08* | (2024.01) | |
| *H04W 74/0833* | (2024.01) | |

(52) U.S. Cl.
CPC ........... *H04W 52/36* (2013.01); *H04W 52/50* (2013.01); *H04W 74/004* (2013.01); *H04W 74/006* (2013.01); *H04W 74/08* (2013.01); *H04W 74/0833* (2013.01); *Y02D 30/70* (2020.08)

(58) Field of Classification Search
CPC ............. H04W 74/004; H04W 74/006; H04W 74/08; H04W 74/0833; Y02D 70/1222; Y02D 70/1224; Y02D 70/1242; Y02D 70/1262; Y02D 70/1264; Y02D 70/142; Y02D 70/144; Y02D 70/21
See application file for complete search history.

(56) References Cited

U.S. PATENT DOCUMENTS

| | | | | |
|---|---|---|---|---|
| 10,070,399 | B2* | 9/2018 | Nan | H04W 52/242 |
| 11,089,556 | B2* | 8/2021 | Nan | H04W 74/004 |
| 2009/0046573 | A1 | 2/2009 | Damnjanovic | |
| 2010/0034177 | A1 | 2/2010 | Santhanam | |
| 2010/0232318 | A1 | 9/2010 | Sarkar | |
| 2012/0127964 | A1 | 5/2012 | Turtinen et al. | |
| 2014/0269579 | A1 | 9/2014 | Xu et al. | |
| 2014/0321389 | A1 | 10/2014 | Zhang et al. | |
| 2015/0016312 | A1* | 1/2015 | Li | H04W 74/006 |
| | | | | 370/280 |
| 2015/0296518 | A1 | 10/2015 | Yi et al. | |
| 2016/0142981 | A1* | 5/2016 | Yi | H04W 52/146 |
| | | | | 455/522 |
| 2016/0330766 | A1* | 11/2016 | Liu | H04W 74/0833 |

FOREIGN PATENT DOCUMENTS

| | | |
|---|---|---|
| CN | 101159485 A | 4/2008 |
| CN | 101594666 A | 12/2009 |
| CN | 101610578 A | 12/2009 |
| CN | 101742682 A | 6/2010 |
| CN | 103200663 A | 7/2013 |
| RU | 2474081 C2 | 1/2013 |
| WO | 2010008859 A1 | 1/2010 |
| WO | 2013078603 A1 | 6/2013 |
| WO | 2013104232 A1 | 7/2013 |

OTHER PUBLICATIONS

"WF on PRACH transmit power," 3GPP TSG RAN WG1 #82, Beijing, China, R1-154980, pp. 1-14, 3rd Generation Partnership Project, Valbonne, France (Aug. 24-28, 2015).
"Further NB-IoT random access physical layer aspects," 3GPP TSG RAN WG1 NB-IoT Ad-Hoc Meeting, Budapest, Hungary, R1-160035, pp. 1-3, 3rd Generation Partnership Project, Valbonne, France (Jan. 18-20, 2016).
"Discussion on PRACH and RACH procedure in coverage enhancement mode," San Francisco, USA, R1-135424, 3GPP TSG-RAN WG1 #75, pp. 1-6, 3rd Generation Partnership Project, Valbonne, France (Nov. 11-15, 2013).
"WF on Random Access for NB-IoT," 3GPP TSG RAN WG1 NB-IoT Ad-Hoc Meeting, Budapest, Hungary, R1-160206, pp. 1-2, 3rd Generation Partnership Project, Valbonne, France (Jan. 18-20, 2016).
"NB-IoT—Random access," 3GPP TSG-RAN WG1 Meeting #84, St Julian's, Malta, R1-160278, pp. 1-4, 3rd Generation Partnership Project, Valbonne, France (Feb. 15-19, 2016).
"Remaining NB-IoT random access physical layer aspects," 3GPP TSG RAN WG1 Meeting #84, St Julian's, Malta, R1-160327, pp. 1-4, 3rd Generation Partnership Project, Valbonne, France (Feb. 15-19, 2016).
"WF on NB-PRACH coverage level procedures," 3GPP TSG RAN WG1 Meeting #84, St. Julian's, Malta, R1-161313, pp. 1-3, 3rd Generation Partnership Project, Valbonne, France (Feb. 15-19, 2016).
"3rd Generation Partnership Project; Technical Specification Group Radio Access Network; Evolved Universal Terrestrial Radio Access (E-UTRA); Physical channels and modulation (Release 12)," 3GPP TS 36.211 V12.0.0, pp. 1-20, 3rd Generation Partnership Project, Valbonne, France (Dec. 2013).
"3rd Generation Partnership Project; Technical Specification Group Radio Access Network; Evolved Universal Terrestrial Radio Access (E-UTRA); Physical layer procedures (Release 12)," 3GPP TS 36.213 V12.0.0, pp. 1-186, 3rd Generation Partnership Project, Valbonne, France (Dec. 2013).
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.0.0, pp. 1-349, 3rd Generation Partnership Project, Valbonne, France (Dec. 2013).
"PRACH Coverage Enhancement for MTC UE," 3GPP TSG-RAN WG1 Meeting #75, R1-135155, pp. 1-8, 3rd Generation Partnership Project, Valbonne, France (Nov. 11-15, 2013).
"3rd Generation Partnership Project; Technical Specification Group Radio Access Network; Evolved Universal Terrestrial Radio Access (E-UTRA); User Equipment (UE) radio transmission and reception (Release 12)," 3GPP TS 36.101 V12.2.0, pp. 1-507, 3rd Generation Partnership Project, Valbonne, France (Dec. 2013).
"On PRACH resource indication and level determination during random access," 3GPP TSG RAN WG1 Meeting #83, R1-156446, Anaheim, USA, pp. 1-6, 3rd Generation Partnership Project, Valbonne, France (Nov. 15-22, 2015).
"Measurement restriction for TM9 based operation," 3GPP TSG RAN WG1 Meeting #83, Anaheim, USA, R1-156774, pp. 1-2, 3rd Generation Partnership Project, Valbonne, France (Nov. 15-22, 2015).
"PRACH for LC-MTC," 3GPP TSG RAN WG1 Meeting #81, Fukuoka, Japan, R1-152605, 3rd Generation Partnership Project, Valbonne, France (May 25-29, 2015).
"PRACH transmission power setting," 3GPP TSG RAN WG1 Meeting #80bis, Belgrade, Serbia, R1-151878, 3rd Generation Partnership Project, Valbonne, France (Apr. 20-24, 2015).
"Discussion on the power ramping for PRACH coverage enhancement," 3GPP TSG RAN WG1 Meeting #80, Athens, Greece, R1-150397, 3rd Generation Partnership Project, Valbonne, France (Feb. 9-13, 2015).
CN201911136046.5, Office Action and Search Report, Jul. 17, 2023.
U.S. Appl. No. 16/056,182, filed Aug. 6, 2018.
U.S. Appl. No. 15/588,504, filed May 5, 2017.
U.S. Appl. No. 15/221,320, filed Jul. 27, 2016.

* cited by examiner

PHYSICAL RANDOM ACCESS CHANNEL ENHANCED TRANSMISSION METHOD, NETWORK DEVICE, AND TERMINAL

CROSS-REFERENCE TO RELATED APPLICATIONS

This application is a continuation of U.S. patent application Ser. No. 16/056,182, filed on Aug. 6, 2018, which is a continuation of U.S. patent application Ser. No. 15/588,504, filed on May 5, 2017, now U.S. Pat. No. 10,070,399, which is a continuation of U.S. patent application Ser. No. 15/221,320, filed on Jul. 27, 2016, now U.S. Pat. No. 9,674,796, which is a continuation of International Patent Application No. PCT/CN2014/071664, filed on Jan. 28, 2014. All of the afore-mentioned patent applications are hereby incorporated by reference in their entireties.

TECHNICAL FIELD

Embodiment of the present invention relates to the field of communications technologies, and in particular, to a physical random access channel enhanced transmission method, a network device, and a terminal.

BACKGROUND

A resource in an LTE (Long Term Evolution) or LTE-A (LTE Advanced) system is classified into a radio frame (a system frame) in terms of time, where one radio frame includes 10 subframes, a length of one subframe is 1 ms, and one subframe includes two timeslots; and is classified into a subcarrier in terms of frequency. A physical resource block (PRB) is defined as a timeslot in terms of time and 12 subcarriers in terms of frequency.

In a radio communications system, user equipment (UE)/terminal needs to establish a connection to a network, and this process is generally referred to as a random access process. In the LTE or LTE-A system, the random access process is classified into two types: a contention-based random access process and a non-contention based random access process. The contention-based random access process includes four steps: Step 1. The UE sends a random access preamble (a preamble for short) to a base station. Step 2. The base station returns a random access response to the terminal. Step 3. Message 3 (Msg 3). Step 4. Contention resolution message (Msg 4). The non-contention based random access process includes only the first two steps.

In an LTE or LTE-A network with coverage enhancement, enhanced transmission needs to be performed on a physical random access channel (PRACH), and PRACH enhanced transmission refers to resending, in a random access process, a random access preamble according to an existing preamble format. When existing LTE/LTE-A network coverage needs coverage enhancement of additional x dB (for example, x=15 or 20), actually, because distances between different UEs and the base station are different, channel environments between the different UEs and the base station are different, and path losses between the UEs and the base station are also different, a required system coverage enhancement value may be a value in 0-x dB for the different UEs. To implement connection establishment between the different UEs and the network, quantities of repetition times required by the UEs to send a preamble are also different.

Currently, a solution to implementing PRACH enhanced transmission is as follows: there are multiple repetition levels of PRACH enhanced transmission for preamble resending, for example, repetition levels 1, 2, and 3 of PRACH enhanced transmission. A quantity of repetition times for sending a preamble by UE at each repetition level is specified in advance by the system or signaled. At different repetition levels of PRACH enhanced transmission, quantities of repetition times for sending a preamble by the UE are different. When a required system coverage enhancement value is larger, a path loss between the UE and the base station is also larger, a repetition level that is of PRACH enhanced transmission and that is required to be used by the UE to successfully complete a random access process is also higher, and the quantity of repetition times for sending the preamble is larger. At each repetition level, the UE resends the random access preamble according to a quantity of repetition times for the repetition level.

For each repetition level of PRACH enhanced transmission, a resource set of PRACH enhanced transmission is specified in advance by the system or signaled. The resource set of PRACH enhanced transmission includes one or more resources of PRACH enhanced transmission. The resources of PRACH enhanced transmission include a code resource (a preamble), a time resource, and a frequency resource that are used to send the preamble. The time resource and the frequency resource may be collectively referred to as a time-frequency resource. During PRACH enhanced transmission, the UE sends the preamble by using one repetition level of PRACH enhanced transmission, and resends, according to a quantity of repletion times for the repetition level and according to an existing preamble format, the preamble on a resource that is of PRACH enhanced transmission and that is included in a resource set for the repetition level.

For PRACH enhanced transmission, a time resource and/or a frequency resource included in a resource set of PRACH enhanced transmission may be the same as a time resource and/or a frequency resource for PRACH transmission (PRACH transmission that does not need to be enhanced, and a preamble is sent according to an existing format without repetition). In PRACH enhanced transmission and PRACH transmission, resource multiplexing is performed in a code division multiplexing (CDM) manner, that is, the resource set of PRACH enhanced transmission and a resource set of PRACH transmission include different code resources (preambles). The time resource and/or the frequency resource included in the resource set of PRACH enhanced transmission may also be newly defined, and are different from the time resource and/or the frequency resource of PRACH transmission.

At each repetition level of PRACH enhanced transmission, resending a preamble by UE according to a quantity of repetition times for the repetition level is denoted as one preamble sending attempt. If the UE does not receive an RAR after completing one preamble sending attempt at a repetition level of PRACH enhanced transmission (not a highest repetition level of PRACH enhanced transmission), the UE increases the repetition level of PRACH enhanced transmission by one level, and performs a preamble resending attempt according to a quantity of repetition times for an increased repetition level of PRACH enhanced transmission.

Transmit power $P_{PRACH}$ for sending the random access preamble by the UE is obtained according to the following formula: $P_{PRACH}=\min\{P_{CMAX,c}(i), P_{REAMBLE\_RECEIVED\_TARGET\_POWER}+PL_c\}\_[dBm]$, where min{ } indicates an operation for calculating a minimum value, $P_{CMAX,c}(i)$ is a maximum value of transmit power of the UE in a subframe whose number is i, $PL_c$ is a value of a downlink path loss that is estimated by the UE, dBm is a power unit decibels per milliwatt, and PREAMBLE_RECEIVED_TARGET_POWER is preamble received target power and is obtained by calculating preambleInitialReceivedTargetPower+DELTA_PREAMBLE+(PREAMBLE_TRANSMISSION_COUNTER−1)*powerRampingStep, where preambleInitialReceivedTargetPower is preamble initial received target power, DELTA_PREAMBLE is a power offset value related to a preamble format, powerRampingStep is a power ramping step, and PREAMBLE_TRANSMISSION_COUNTER is a quantity of preamble transmission times.

In the foregoing PRACH enhanced transmission method, if transmit power is determined in the power calculation manner for each preamble sending attempt performed by the UE, there is a problem of a power waste of UE.

SUMMARY

Embodiments of the present invention provide a physical random access channel enhanced transmission method, a network device, and a terminal, which are used to reduce power of a terminal.

A first aspect of the embodiments of the present invention provides a terminal, including:
  a level determining unit, configured to determine level information of physical random access channel PRACH enhanced transmission;
  a parameter determining unit, configured to determine a first characteristic parameter that is of PRACH enhanced transmission and that is related to the level information of PRACH enhanced transmission that is determined by the level determining unit, where the first characteristic parameter includes at least one of transmit power, a preamble format, and a time-frequency resource; and
  a sending unit, configured to perform PRACH enhanced sending according to the first characteristic parameter determined by the parameter determining unit.

With reference to an implementation solution of the first aspect, in a first possible implementation manner, the first characteristic parameter includes the transmit power; and
  the parameter determining unit is configured to determine the transmit power of PRACH enhanced transmission according to a second characteristic parameter corresponding to the level information of PRACH enhanced transmission, where the second characteristic parameter is at least one of preamble initial received target power, a quantity of preamble transmission attempt times, a path loss, a path loss threshold, a power ramping step, a power offset value related to the preamble format, and a power offset value related to the level information of PRACH enhanced transmission.

With reference to the first possible implementation solution of the first aspect, in a second possible implementation manner, the parameter determining unit is configured to determine the transmit power of PRACH enhanced transmission according to the second characteristic parameter corresponding to the level information of PRACH enhanced transmission, where second characteristic parameters corresponding to different level information of PRACH enhanced transmission are completely identical, or partially identical, or completely different.

With reference to the first possible implementation solution of the first aspect, in a third possible implementation manner, the parameter determining unit is configured to determine, according to a third characteristic parameter corresponding to level information that is of PRACH enhanced transmission and that is one level lower than the level information of PRACH enhanced transmission, the at least one parameter included in the second characteristic parameter corresponding to the level information of PRACH enhanced transmission, where the third characteristic parameter is at least one of preamble initial received target power, a power ramping step, a fixed power offset value, and a maximum quantity of preamble transmission attempt times.

With reference to the third possible implementation solution of the first aspect, in a fourth possible implementation manner, the second characteristic parameter includes the preamble initial received target power; and
  the parameter determining unit is configured to: if the level information of PRACH enhanced transmission is not the first level of PRACH enhanced transmission, determine that: the preamble initial received target power corresponding to the level information of PRACH enhanced transmission is a sum of the preamble initial received target power and the power ramping step that are corresponding to the level information that is of PRACH enhanced transmission and that is one level lower than the level information of PRACH enhanced transmission, or the preamble initial received target power corresponding to the level information of PRACH enhanced transmission is a fixed power offset value plus a sum of the preamble initial received target power and the power ramping step that are corresponding to the level information that is of PRACH enhanced transmission and that is one level lower than the level information of PRACH enhanced transmission; or
  if the level information of PRACH enhanced transmission is the first level of PRACH enhanced transmission, determine that: the preamble initial received target power corresponding to the level information of PRACH enhanced transmission is preamble initial received target power configured by a network device, or the preamble initial received target power corresponding to the level information of PRACH enhanced transmission is a sum of preamble initial received target power and a power ramping step that are corresponding to PRACH transmission, or the preamble initial received target power corresponding to the level information of PRACH enhanced transmission is a fixed power offset value plus a sum of preamble initial received target power and a power ramping step that are corresponding to PRACH transmission.

With reference to the third possible implementation solution of the first aspect, in a fifth possible implementation manner, the second characteristic parameter includes the quantity of preamble transmission attempt times; and
  the parameter determining unit is configured to: set an initial value of the quantity of preamble transmission attempt times corresponding to the level information of PRACH enhanced transmission to 1 plus the maximum quantity of preamble transmission attempt times corresponding to the level information that is of PRACH enhanced transmission and that is one level lower than the level information of PRACH enhanced transmission; or set an initial value of the quantity of preamble transmission attempt times corresponding to the level information of PRACH enhanced transmission to 1; or set an initial value of the quantity of preamble transmission attempt times corresponding to the level information of PRACH enhanced transmission to 1 plus a maximum quantity of preamble transmission attempt times corresponding to PRACH transmission.

With reference to the first possible implementation solution of the first aspect, in a sixth possible implementation manner, the second characteristic parameter includes the path loss or the path loss threshold; and the parameter determining unit is configured to: set the path loss corresponding to the level information of PRACH enhanced transmission to a lowest path loss for determining the level information of PRACH enhanced transmission; or set the path loss threshold corresponding to the level information of PRACH enhanced transmission to a lowest path loss threshold for determining the level information of PRACH enhanced transmission.

With reference to the first possible implementation solution of the first aspect, in a seventh possible implementation manner, the second characteristic parameter includes the power offset value related to the level information of PRACH enhanced transmission; and the parameter determining unit is configured to: set the power offset value related to the level information of PRACH enhanced transmission to a difference between a highest path loss or path loss threshold for determining the level information of PRACH enhanced transmission and a path loss estimated by a terminal UE; or set the power offset value related to the level information of PRACH enhanced transmission to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE.

With reference to the first, the second, the third, the fourth, the fifth, the sixth, or the seventh possible implementation solution of the first aspect, in an eighth possible implementation manner, the parameter determining unit is further configured to: if the level information of PRACH enhanced transmission is not highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, increase the level information of PRACH enhanced transmission by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, increase the level information of PRACH enhanced transmission by one level; or if the level information of PRACH enhanced transmission is highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails; or if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

With reference to the eighth possible implementation solution of the first aspect, in a ninth possible implementation manner, the parameter determining unit is further configured to determine that: quantities that are of preamble transmission available attempt times and that are corresponding to all level information of PRACH enhanced transmission are the same, or quantities that are of preamble transmission available attempt times and that are corresponding to at least two different levels of PRACH enhanced transmission are different.

With reference to the eighth possible implementation solution of the first aspect, in a tenth possible implementation manner, the parameter determining unit is configured to determine that: the quantity of preamble transmission available attempt times corresponding to the level information of PRACH enhanced transmission is configured by the network device, or the quantity of preamble transmission available attempt times corresponding to the level information of PRACH enhanced transmission is predefined, or the quantity of preamble transmission available attempt times corresponding to the level information of PRACH enhanced transmission is determined according to a predefined rule.

With reference to an implementation solution of the first aspect, in an eleventh possible implementation manner, if the first characteristic parameter includes the transmit power, the parameter determining unit is configured to: if the level information of PRACH enhanced transmission is the $n^{th}$ level of PRACH enhanced transmission, determine that; the transmit power of PRACH enhanced transmission is a maximum value of transmit power of a terminal UE, or the transmit power of PRACH enhanced transmission is a dedicated power value of the level information of PRACH enhanced transmission, where n is a positive integer.

With reference to the eleventh possible implementation solution of the first aspect, in a twelfth possible implementation manner, the parameter determining unit is configured to: determine the dedicated power value of the level information of PRACH enhanced transmission according to a predefined value; or determine the dedicated power value of the level information of PRACH enhanced transmission according to configuration performed by a network device.

With reference to the eleventh or twelfth possible implementation solution of the first aspect, in a thirteenth possible implementation manner, the parameter determining unit is configured to determine that dedicated power values of at least two different levels of PRACH enhanced transmission in dedicated power values of the level information of PRACH enhanced transmission are different.

With reference to an implementation solution of the first aspect, in a fourteenth possible implementation manner, if the first characteristic parameter includes the preamble format, the parameter determining unit is configured to determine that: preamble formats related to all level information of PRACH enhanced transmission are the same, or preamble formats related to at least two different levels of PRACH enhanced transmission are different.

With reference to the fourteenth possible implementation solution of the first aspect, in a fifteenth possible implementation manner, the parameter determining unit is configured to: in a process of determining that preamble formats related to at least two different levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers. N1 is less than N, and the first preamble format and the second preamble format are different.

With reference to the fifteenth possible implementation solution of the first aspect, in a sixteenth possible implementation manner, the parameter determining unit is configured to determine that the first preamble format and the second preamble format are preamble formats in a preamble format 1 and a preamble format 3.

With reference to an implementation solution of the first aspect, in a seventeenth possible implementation manner, the parameter determining unit is configured to determine that a preamble format 4 is not used for PRACH enhanced transmission.

With reference to the fourteenth, the fifteenth, the sixteenth, or the seventeenth possible implementation solution of the first aspect, in an eighteenth possible implementation manner, the parameter determining unit is configured to determine that: the used preamble format related to the determined level information of PRACH enhanced transmission is predefined, or the preamble format related to the determined level information of PRACH enhanced transmission is configured by a network device.

With reference to an implementation solution of the first aspect, in a nineteenth possible implementation manner, the first characteristic parameter includes the time-frequency resource; and the parameter determining unit is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

A second aspect of the embodiments of the present invention provides a physical random access channel enhanced transmission method, including:
  determining level information of physical random access channel PRACH enhanced transmission;
  determining a first characteristic parameter that is of PRACH enhanced transmission and that is related to the level information of PRACH enhanced transmission, where the first characteristic parameter includes at least one of transmit power, a preamble format, and a time-frequency resource; and
  performing PRACH enhanced sending according to the first characteristic parameter.

With reference to an implementation solution of the second aspect, in a first possible implementation manner, if the first characteristic parameter includes the transmit power, the determining a first characteristic parameter that is of PRACH enhanced transmission and that is related to the level information of PRACH enhanced transmission includes:
  determining the transmit power of PRACH enhanced transmission according to a second characteristic parameter corresponding to the level information of PRACH enhanced transmission, where the second characteristic parameter is at least one of preamble initial received target power, a quantity of preamble transmission attempt times, a path loss, a path loss threshold, a power ramping step, a power offset value related to the preamble format, and a power offset value related to the level information of PRACH enhanced transmission.

With reference to the first possible implementation solution of the second aspect, in a second possible implementation manner, second characteristic parameters corresponding to different level information of PRACH enhanced transmission are completely identical, or partially identical, or completely different.

With reference to the first possible implementation solution of the second aspect, in a third possible implementation manner, the at least one parameter included in the second characteristic parameter corresponding to the level information of PRACH enhanced transmission is determined according to a third characteristic parameter corresponding to level information that is of PRACH enhanced transmission and that is one level lower than the level information of PRACH enhanced transmission, where the third characteristic parameter is at least one of preamble initial received target power, a power ramping step, a fixed power offset value, and a maximum quantity of preamble transmission attempt times.

With reference to the third possible implementation solution of the second aspect, in a fourth possible implementation manner, the second characteristic parameter includes the preamble initial received target power, and a method for determining the second characteristic parameter corresponding to the level information of PRACH enhanced transmission includes:
  if the level information of PRACH enhanced transmission is not the first level of PRACH enhanced transmission, determining that: the preamble initial received target power corresponding to the level information of PRACH enhanced transmission is a sum of the preamble initial received target power and the power ramping step that are corresponding to the level information that is of PRACH enhanced transmission and that is one level lower than the level information of PRACH enhanced transmission, or the preamble initial received target power corresponding to the level information of PRACH enhanced transmission is a fixed power offset value plus a sum of the preamble initial received target power and the power ramping step that are corresponding to the level information that is of PRACH enhanced transmission and that is one level lower than the level information of PRACH enhanced transmission; or if the level information of PRACH enhanced transmission is the first level of PRACH enhanced transmission, determining that: the preamble initial received target power corresponding to the level information of PRACH enhanced transmission is preamble initial received target power configured by a network device, or the preamble initial received target power corresponding to the level information of PRACH enhanced transmission is a sum of preamble initial received target power and a power ramping step that are corresponding to PRACH transmission, or the preamble initial received target power corresponding to the level information of PRACH enhanced transmission is a fixed power offset value plus a sum of preamble initial received target power and a power ramping step that are corresponding to PRACH transmission.

With reference to the third possible implementation solution of the second aspect, in a fifth possible implementation manner, the second characteristic parameter includes the quantity of preamble transmission attempt times, and a method for determining the second characteristic parameter corresponding to the level information of PRACH enhanced transmission includes:

setting an initial value of the quantity of preamble transmission attempt times corresponding to the level information of PRACH enhanced transmission to 1 plus the maximum quantity of preamble transmission attempt times corresponding to the level information that is of PRACH enhanced transmission and that is one level lower than the level information of PRACH enhanced transmission; or setting an initial value of the quantity of preamble transmission attempt times corresponding to the level information of PRACH enhanced transmission to 1; or setting an initial value of the quantity of preamble transmission attempt times corresponding to the level information of PRACH enhanced transmission to 1 plus a maximum quantity of preamble transmission attempt times corresponding to PRACH transmission.

With reference to the first possible implementation solution of the second aspect, in a sixth possible implementation manner, if the second characteristic parameter includes the path loss or the path loss threshold, a method for determining the second characteristic parameter corresponding to the level information of PRACH enhanced transmission includes:

setting the path loss corresponding to the level information of PRACH enhanced transmission to a lowest path loss for determining the level information of PRACH enhanced transmission; or setting the path loss threshold corresponding to the level information of PRACH enhanced transmission to a lowest path loss threshold for determining the level information of PRACH enhanced transmission.

With reference to the first possible implementation solution of the second aspect, in a seventh possible implementation manner, the second characteristic parameter includes the power offset value related to the level information of PRACH enhanced transmission, and a method for determining the second characteristic parameter corresponding to the level information of PRACH enhanced transmission includes:

setting the power offset value related to the level information of PRACH enhanced transmission to a difference between a highest path loss or path loss threshold for determining the level information of PRACH enhanced transmission and a path loss estimated by a terminal UE; or setting the power offset value related to the level information of PRACH enhanced transmission to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE.

With reference to the first, the second, the third, the fourth, the fifth, the sixth, or the seventh possible implementation solution of the second aspect, in an eighth possible implementation manner, the method further includes:

if the level information of PRACH enhanced transmission is not highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, increasing the level information of PRACH enhanced transmission by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, increasing the level information of PRACH enhanced transmission by one level; or if the level information of PRACH enhanced transmission is highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, executing a backoff operation and performing a preamble resending attempt starting from lowest level information of PRACH enhanced transmission, or executing a backoff operation and performing a preamble resending attempt by keeping the level information of PRACH enhanced transmission as highest level information of PRACH enhanced transmission, or adjusting a backoff parameter, or notifying a higher layer that enhanced random access fails; or if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, executing a backoff operation and performing a preamble resending attempt starting from lowest level information of PRACH enhanced transmission, or executing a backoff operation and performing a preamble resending attempt by keeping the level information of PRACH enhanced transmission as highest level information of PRACH enhanced transmission, or adjusting a backoff parameter, or notifying, by UE, a higher layer that enhanced random access fails.

With reference to the eighth possible implementation solution of the second aspect, in a ninth possible implementation manner, quantities that are of preamble transmission available attempt times and that are corresponding to all level information of PRACH enhanced transmission are the same, or quantities that are of preamble transmission available attempt times and that are corresponding to at least two different levels of PRACH enhanced transmission are different.

With reference to the eighth possible implementation solution of the second aspect, in a tenth possible implementation manner, the quantity of preamble transmission available attempt times corresponding to the level information of PRACH enhanced transmission is configured by the network device, or the quantity of preamble transmission available attempt times corresponding to the level information of PRACH enhanced transmission is predefined, or the quantity of preamble transmission available attempt times corresponding to the level information of PRACH enhanced transmission is determined according to a predefined rule.

With reference to an implementation solution of the second aspect, in an eleventh possible implementation manner, if the first characteristic parameter includes the transmit power, the determining a first characteristic parameter that is of PRACH enhanced transmission and that is related to the level information of PRACH enhanced transmission includes:

if the level information of PRACH enhanced transmission is the $n^{th}$ level of PRACH enhanced transmission, determining that: the transmit power of PRACH enhanced transmission is a maximum value of transmit power of a terminal UE, or the transmit power of PRACH enhanced transmission is a dedicated power value of the level information of PRACH enhanced transmission, where n is a positive integer.

With reference to the eleventh possible implementation solution of the second aspect, in a twelfth possible implementation manner, the dedicated power value of the level information of PRACH enhanced transmission is predefined; or the dedicated power value of the level information of PRACH enhanced transmission is configured by a network device.

With reference to the eleventh or twelfth possible implementation solution of the second aspect, in a thirteenth possible implementation manner, dedicated power values of at least two different levels of PRACH enhanced transmission are different.

With reference to an implementation solution of the second aspect, in a fourteenth possible implementation manner, if the first characteristic parameter includes the preamble format, the determining a first characteristic parameter that is of PRACH enhanced transmission and that is related to the level information of PRACH enhanced transmission includes:

determining that: preamble formats related to all level information of PRACH enhanced transmission are the same, or preamble formats related to at least two different levels of PRACH enhanced transmission are different.

With reference to the fourteenth possible implementation solution of the second aspect, in a fifteenth possible implementation manner, that preamble formats related to at least two different levels of PRACH enhanced transmission are different includes:

if there are N levels of PRACH enhanced transmission, the first N1 levels information of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers. N1 is less than N. and the first preamble format and the second preamble format are different.

With reference to the fifteenth possible implementation solution of the second aspect, in a sixteenth possible implementation manner, the first preamble format and the second preamble format are preamble formats in a preamble format 1 and a preamble format 3.

With reference to an implementation solution of the second aspect, in a seventeenth possible implementation manner, a preamble format 4 is not used for PRACH enhanced transmission.

With reference to the fourteenth, the fifteenth, the sixteenth, or the seventeenth possible implementation solution of the second aspect, in an eighteenth possible implementation manner, the preamble format related to the determined level information of PRACH enhanced transmission is predefined, or the preamble format related to the determined level information of PRACH enhanced transmission is configured by a network device.

With reference to an implementation solution of the second aspect, in a nineteenth possible implementation manner, if the first characteristic parameter includes the time-frequency resource, the determining a first characteristic parameter that is of PRACH enhanced transmission and that is related to the level information of PRACH enhanced transmission includes:

determining that time-frequency resources related to the first M1 levels of PRACH enhanced transmission in M adjacent levels of PRACH enhanced transmission include a first time-frequency resource; and determining that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

A third aspect of the embodiments of the present invention provides a network device, including:

a parameter determining unit, configured to determine a first characteristic parameter that is of PRACH enhanced transmission and that is related to level information of physical random access channel PRACH enhanced transmission, where the first characteristic parameter includes at least one of a preamble format and a time-frequency resource; and a receiving unit, configured to perform PRACH enhanced receiving according to the first characteristic parameter that is related to all level information of PRACH enhanced transmission and that is determined by the parameter determining unit.

With reference to an implementation solution of the third aspect, in a first possible implementation manner, the network device further includes:

a sending unit, configured to: before the receiving unit performs PRACH enhanced receiving according to the first characteristic parameter related to all the level information of PRACH enhanced transmission, send, to UE, at least one of the following configuration information: preamble initial received target power, a quantity of preamble transmission available attempt times corresponding to the level information of PRACH enhanced transmission, and a dedicated power value of the level information of PRACH enhanced transmission, so that the UE determines, according to the configuration information, transmit power that is of PRACH enhanced transmission and that is related to the level information of PRACH enhanced transmission, or increase the level information of PRACH enhanced transmission by one level, or execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

With reference to an implementation solution of the third aspect or the first possible implementation manner of the third aspect, in a second possible implementation manner, the parameter determining unit is further configured to determine that: quantities that are of preamble transmission available attempt times and that are corresponding to all the level information of PRACH enhanced transmission are the same, or quantities that are of preamble transmission available attempt times and that are corresponding to at least two different levels of PRACH enhanced transmission are different.

With reference to an implementation solution of the third aspect or the first possible implementation manner of the third aspect, in a third possible implementation manner, the parameter determining unit is further configured to determine that dedicated power values of at least two different levels of PRACH enhanced transmission in all the level information of PRACH enhanced transmission are different.

With reference to an implementation solution of the third aspect, in a fourth possible implementation manner, if the first characteristic parameter includes the preamble format, the parameter determining unit is configured to determine that: preamble formats related to all the level information of PRACH enhanced transmission are the same, or preamble formats related to at least two different levels of PRACH enhanced transmission are different.

With reference to the fourth possible implementation manner of the third aspect, in a fifth possible implementation manner, the parameter determining unit is configured to: in a process of determining that preamble formats related to at least two different levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels information of PRACH enhanced transmission are related to a second preamble format, where both N and N1 are positive integers. N1 is less than N. and the first preamble format and the second preamble format are different.

With reference to the fifth possible implementation manner of the third aspect, in a sixth possible implementation manner, the parameter determining unit is configured to determine that the first preamble format and the second preamble format are preamble formats in a preamble format 1 and a preamble format 3.

With reference to an implementation solution of the third aspect, in a seventh possible implementation manner, the parameter determining unit is configured to determine that a preamble format 4 is not used for PRACH enhanced transmission.

With reference to the fourth, the fifth, the sixth, or the seventh possible implementation solution of the third aspect, in an eighth possible implementation manner, the parameter determining unit is configured to determine that the preamble format related to the determined level information of PRACH enhanced transmission is predefined; or the sending unit included in the network device is configured to send, to UE, configuration information of the preamble format related to the determined level information of PRACH enhanced transmission.

With reference to an implementation solution of the third aspect, in a ninth possible implementation manner, if the first characteristic parameter includes the time-frequency resource, the parameter determining unit is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

A fourth aspect of the embodiments of the present invention provides a physical random access channel enhanced transmission method, including:

determining a first characteristic parameter that is of PRACH enhanced transmission and that is related to level information of physical random access channel PRACH enhanced transmission, where the first characteristic parameter includes at least one of a preamble format and a time-frequency resource; and performing PRACH enhanced receiving according to the first characteristic parameter related to all level information of PRACH enhanced transmission.

With reference to an implementation solution of the fourth aspect, in a first possible implementation manner, before the performing PRACH enhanced receiving according to the first characteristic parameter related to all level information of PRACH enhanced transmission, the method includes:

sending, to UE, at least one of the following configuration information; preamble initial received target power, a quantity of preamble transmission available attempt times corresponding to the level information of PRACH enhanced transmission, and a dedicated power value of the level information of PRACH enhanced transmission, so that the UE determines, according to the configuration information, transmit power that is of PRACH enhanced transmission and that is related to the level information of PRACH enhanced transmission, or increasing the level information of PRACH enhanced transmission by one level, or executing a backoff operation and performing a preamble resending attempt starting from lowest level information of PRACH enhanced transmission, or executing a backoff operation and performing a preamble resending attempt by keeping the level information of PRACH enhanced transmission as highest level information of PRACH enhanced transmission, or adjusting a backoff parameter, or notifying a higher layer that enhanced random access fails.

With reference to an implementation solution of the fourth aspect or the first possible implementation manner of the fourth aspect, in a second possible implementation manner, quantities that are of preamble transmission available attempt times and that are corresponding to all the level information of PRACH enhanced transmission are the same, or quantities that are of preamble transmission available attempt times and that are corresponding to at least two different levels of PRACH enhanced transmission are different.

With reference to an implementation solution of the fourth aspect or the first possible implementation manner of the fourth aspect, in a third possible implementation manner, dedicated power values of at least two different levels of PRACH enhanced transmission are different.

With reference to an implementation solution of the fourth aspect, in a fourth possible implementation manner, if the first characteristic parameter includes the preamble format, the determining a first characteristic parameter that is of PRACH enhanced transmission and that is related to level information of PRACH enhanced transmission includes:
   determining that: preamble formats related to all the level information of PRACH enhanced transmission are the same, or preamble formats related to at least two different levels of PRACH enhanced transmission are different.

With reference to the fourth possible implementation manner of the fourth aspect, in a fifth possible implementation manner, that preamble formats related to at least two levels of PRACH enhanced transmission are different includes:
   if there are N levels of PRACH enhanced transmission, the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

With reference to the fifth possible implementation manner of the fourth aspect, in a sixth possible implementation manner, the first preamble format and the second preamble format are preamble formats in a preamble format 1 and a preamble format 3.

With reference to an implementation solution of the fourth aspect, in a seventh possible implementation manner, a preamble format 4 is not used for PRACH enhanced transmission.

With reference to the fourth, the fifth, the sixth, or the seventh possible implementation solution of the fourth aspect, in an eighth possible implementation manner, the preamble format related to the determined level information of PRACH enhanced transmission is predefined; or configuration information of the preamble format related to the determined level information of PRACH enhanced transmission is sent to UE.

With reference to an implementation solution of the fourth aspect, in a ninth possible implementation manner, if the first characteristic parameter includes the time-frequency resource, the determining a first characteristic parameter that is of PRACH enhanced transmission and that is related to level information of PRACH enhanced transmission includes:
   determining that time-frequency resources related to the first M1 levels of PRACH enhanced transmission in M adjacent levels of PRACH enhanced transmission include a first time-frequency resource; and determining that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

A fifth aspect of the embodiments of the present invention provides a device, configured as a half-duplex frequency division duplex receiving device, including:
   a control unit, configured to: when the receiving device switches from an uplink subframe to a downlink subframe, control the receiving device to skip receiving data within a guard interval in a former part of the downlink subframe, or to skip sending data within a guard interval in a later part of the uplink subframe.

With reference to an implementation solution of the fifth aspect, in a first possible implementation manner, the control unit includes:
   a guard interval determining unit, configured to determine the guard interval according to a time for adjusting an operating frequency by a frequency oscillator and/or an uplink and downlink round-trip propagation delay.

A sixth aspect of the embodiments of the present invention provides a network device, including:
   a sending control unit, configured to: control the network device to skip sending downlink data to a half-duplex frequency division duplex receiving device in the first subframe preceding an uplink subframe, and/or control the network device to skip sending downlink data to the half-duplex frequency division duplex receiving device in the first downlink subframe following the uplink subframe.

A seventh aspect of the embodiments of the present invention provides a frame data transmission method, including:
   when a half-duplex frequency division duplex receiving device switches from an uplink subframe to a downlink subframe, skipping receiving, by the receiving device, data within a guard interval in a former part of the downlink subframe, or skipping sending data within a guard interval in a later part of the uplink subframe.

With reference to an implementation solution of the seventh aspect, in a first possible implementation manner, the guard interval is determined by using a time for adjusting an operating frequency by a frequency oscillator and/or an uplink and downlink round-trip propagation delay.

An eighth aspect of the embodiments of the present invention provides a frame data transmission method, including:

skipping sending, by a network device, downlink data to a half-duplex frequency division duplex receiving device in the first subframe preceding an uplink subframe, and/or skipping sending, by the network device, downlink data to the half-duplex frequency division duplex receiving device in the first downlink subframe following the uplink subframe.

It can be learned from the foregoing technical solutions that the embodiments of the present invention have the following advantages: a first characteristic parameter is related to level information, and a characteristic parameter used for PRACH enhanced sending can be rapidly and accurately determined, which reduces power of a terminal.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
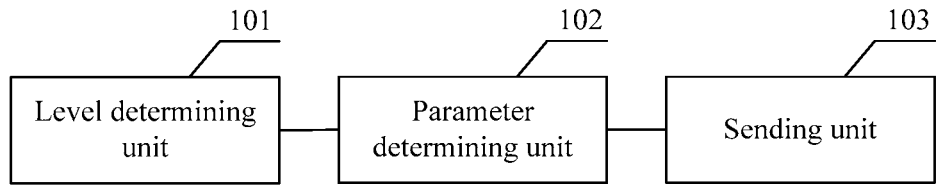
FIG. 1 is a schematic structural diagram of a terminal according to an embodiment of the present invention.

To make the objectives, technical solutions, and advantages of the present invention clearer, the following further describes the embodiments of the present invention in detail with reference to the accompanying drawings. The described embodiments are merely a part rather than all of the embodiments of the present invention. All other embodiments obtained by a person of ordinary skill in the art based on the embodiments of the present invention without creative efforts shall fall within the protection scope of the present invention.

A problem of a power waste of UE is specifically embodied as follows:

(1) In a case in which the UE increases a repetition level of PRACH enhanced transmission by one level, and performs a preamble sending attempt according to a quantity of repetition times for an increased repetition level of PRACH enhanced transmission, if the UE has already performed multiple preamble sending attempts at an original repetition level of PRACH enhanced transmission, and performs power ramping in each preamble sending attempt, that is, transmit power is increased by powerRampingStep (dB), and random access is not completed after the multiple preamble sending attempts, the UE increases the original repetition level of PRACH enhanced transmission by one level. A downlink path loss $PL_c$ estimated by the UE at the increased repetition level of PRACH enhanced transmission is the same as that estimated at the original repetition level, and if an initial value of PREAMBLE_TRANSMISSION_COUNTER in the first preamble sending attempt is 1, power of the first preamble sending attempt is the same as power of the first preamble sending attempt performed at the original repetition level, and then power ramping is performed in a subsequent preamble sending attempt. Power of the first several preamble sending attempts performed by the UE at the increased repetition level of PRACH enhanced transmission may not meet a requirement for successfully completing a random access process, which causes a waste of the power of the first several preamble sending attempts.

(2) In an LTE or LTE-A system with coverage enhancement, when a channel environment in which the UE is located is relatively poor, there is a relatively large error in a downlink path loss $PL_c$ estimated by the UE, and in this case, there is also an error in transmit power calculated by the UE, and if the power is relatively low; it is not necessary for the UE to perform a preamble sending attempt by using the relatively low power, or if the power is relatively high, power for sending a preamble is wasted.

(3) If on a same time resource and a same frequency resource, the UE sends random access preambles at different repetition levels of PRACH enhanced transmission, that is, resource multiplexing is performed on the random access preambles at the different repetition levels of PRACH enhanced transmission in a CDM manner, and if the random access preambles at the different repetition levels of PRACH enhanced transmission use same transmit power, there is a near-far effect, that is, path losses of the random access preambles at the different repetition levels of PRACH enhanced transmission are different, power attenuation values when the preambles arrive at a base station are also different, and a preamble with a larger path loss is submerged by a preamble with a small path loss, which causes a preamble resending attempt.

An embodiment of the present invention provides a terminal, configured to implement physical random access channel PRACH enhanced transmission, where enhanced transmission may be retransmission, spread spectrum transmission, or the like, and this embodiment of the present invention is described by using retransmission as an example. A PRACH is a channel that carries a preamble: PRACH enhanced transmission or PRACH transmission may refer to enhanced transmission or transmission of a channel that carries a preamble, or may refer to enhanced transmission or transmission of a preamble: transmission includes sending and receiving. As shown in FIG. 1, the terminal includes a level determining unit 101, a parameter determining unit 102, and a sending unit 103.

The level determining unit 101 is configured to determine level information of physical random access channel PRACH enhanced transmission.

In this embodiment of the present invention, the level information may be any one of a level, a level index, an enhancement level, an enhancement level index, a repetition level, a repetition level index, a resource level, a resource level index, a resource set level, a resource set level index, a resource set index, and a resource index.

The parameter determining unit 102 is configured to determine a first characteristic parameter that is of PRACH enhanced transmission and that is related to the level information of PRACH enhanced transmission that is determined by the level determining unit 101.

In this embodiment of the present invention, the first characteristic parameter may be at least one of transmit power, a preamble format, and a time-frequency resource.

The sending unit 103 is configured to perform PRACH enhanced sending according to the first characteristic parameter determined by the parameter determining unit 102.

This embodiment of the present invention is applied to an LTE or LTE-A system with coverage enhancement, and there are multiple repetition levels of PRACH enhanced transmission, for example, repetition levels 1, 2, and 3 of PRACH enhanced transmission. Index numbering may be performed on the multiple repetition levels, that is, repetition level indexes. In another manner, there are multiple levels or multiple enhancement levels of PRACH enhanced transmission, and index numbering is performed on the multiple levels, that is, level indexes, or index numbering is performed on the multiple enhancement levels, that is, enhancement level indexes. The level information of PRACH enhanced transmission is any one of the level, the level index, the enhancement level, the enhancement level index, the repetition level, and the repetition level index.

For each level of PRACH enhanced transmission, a quantity of repetition times for sending a preamble by UE and a resource set of PRACH enhanced transmission that are corresponding to each level of PRACH enhanced transmission are specified in advance by the system or signaled. The resource set of PRACH enhanced transmission includes one or more resources of PRACH enhanced transmission. The resources of PRACH enhanced transmission include a code resource (a preamble), a time resource, and a frequency resource that are used to send the preamble. The time resource and the frequency resource may be collectively referred to as a time-frequency resource. If the UE determines the level information of PRACH enhanced transmission, the UE resends, according to a quantity of repetition times corresponding to the determined level information of PRACH enhanced transmission, a preamble on a resource that is of PRACH enhanced transmission and that is included in the resource set of PRACH enhanced transmission. For different level information of PRACH enhanced transmission, quantities of repetition times for sending a preamble by the UE are different. When a required system coverage enhancement value is larger, a path loss between the UE and a network device is also larger, level information that is of PRACH enhanced transmission and that is required to be used by the UE to successfully complete a random access process is also higher, and the quantity of repetition times for sending the preamble is larger. Because there are multiple levels of PRACH enhanced transmission, there are also multiple resource sets of PRACH enhanced transmission, and the multiple resource sets are used by the UE to send the preamble according to different quantities of repetition times. A PRACH resource set may be referred to as a resource set level of PRACH enhanced transmission, and one or more resources that are of PRACH enhanced transmission and that are included in one resource set of PRACH enhanced transmission may be collectively referred to as one resource level of PRACH enhanced transmission, and index numbering is separately performed on the resource set, the resource set level, the resource, and the resource level that are of PRACH enhanced transmission, that is, a resource set index, a resource set level index, a resource index, and a resource level index that are of PRACH enhanced transmission. The level information of PRACH enhanced transmission may also be any one of the resource level, the resource level index, the resource set level, the resource set level index, the resource set index, and the resource index. Index numbering is performed on the quantity of repetition times for sending the preamble by the UE, that is, an index of the quantity of repetition times. The level information of PRACH enhanced transmission may also be one of the quantity of repetition times and the index of the quantity of repetition times.

Optionally, the level information of PRACH enhanced transmission is determined according to the path loss between the network device and the UE. A base station or another network device presets a lowest path loss or path loss threshold and a highest path loss or path loss threshold for determining the level information of PRACH enhanced transmission, and the path loss between the network device and the UE is divided into X ranges according to the lowest path loss or path loss threshold and the highest path loss or path loss threshold, and each path loss range is corresponding to one level of PRACH enhanced transmission, so that the level information of PRACH enhanced transmission is determined according to the lowest path loss or path loss threshold and the highest path loss or path loss threshold. For example, a path loss or a path loss threshold is preset to x0, x1, and x2, the path loss between the network device and the UE is divided into three ranges, and the first, the second, and the third level of PRACH enhanced transmission are determined, that is:

the first level of PRACH enhanced transmission: x0 dB<path loss≤x1 dB;

the second level of PRACH enhanced transmission: x1 dB<path loss≤ x2 dB; and the third level of PRACH enhanced transmission: path loss>x2.

For example, for the first level of PRACH enhanced transmission, the lowest path loss or path loss threshold and the highest path loss or path loss threshold for determining the level information of PRACH enhanced transmission are x0 and x1 respectively. The lowest path loss or path loss threshold and the highest path loss or path loss threshold and/or a value of X may be predefined or signaled by the network device to the UE. Index numbering is performed on the path loss range, that is, a path loss range index. The path loss may also be one of a required coverage enhancement value, reference signal received power, reference signal received quality, and channel quality information, and index numbering is performed on the coverage enhancement value, the reference signal received power, the reference signal received quality, and a channel quality information range, that is, a coverage enhancement range index, a reference signal received power range index, a reference signal received quality range index, and a channel quality information range index. The level information of PRACH enhanced transmission may also be one of the coverage enhancement value, the coverage enhancement range index, the path loss, the path loss range index, the reference signal received power, the reference signal received power range index, the reference signal received quality, the reference signal received quality range index, the channel quality information, and the channel quality information range index.

In this embodiment of the present invention, the level determining unit 101 may determine the level information of PRACH enhanced transmission in multiple manners. The level determining unit 101 may also determine that enhanced transmission is not to be performed on a PRACH, that is, determine that PRACH transmission is performed, where a preamble is sent according to an existing format without repetition. For example, level information of PRACH transmission and/or the level information of PRACH enhanced transmission may be determined according to a path loss range between the UE and a network side or another measurement parameter or monitoring parameter that can reflect a path loss range; or it is determined that the level information of PRACH enhanced transmission is the first (lowest) level of PRACH enhanced transmission; or it is determined that the level information of PRACH enhanced transmission is level information obtained by increasing originally determined level information of PRACH enhanced transmission by one level of PRACH enhanced transmission; or it is determined that PRACH transmission is changed to the first level of PRACH enhanced transmission. A specific manner for determining the level information of PRACH enhanced transmission is not limited in this embodiment of the present invention.

One manner for determining the level information of PRACH transmission and/or PRACH enhanced transmission is as follows: a part of the level information of PRACH transmission and/or PRACH enhanced transmission is determined according to the path loss range between the UE and the network side or the another measurement parameter or monitoring parameter that can reflect the path loss range, and other level information of PRACH enhanced transmission is determined by the UE by sequentially performing an attempt from the level information of PRACH transmission and/or from low level information of enhanced transmission to high level information of enhanced transmission. If an attempt based on the level information of PRACH transmission and/or the low level information of enhanced transmission fails, the attempt is switched to be performed based on an adjacent high level of enhanced transmission. For example, if the level information of PRACH enhanced transmission includes the first, the second, and the third level, PRACH transmission is denoted as the $0^{th}$ level. If the path loss≤x3 dB, it is determined that the level information of PRACH transmission and/or PRACH enhanced transmission is the $0^{th}$ level of PRACH transmission: if the path loss>x4 dB, it is determined that the level information of PRACH transmission and/or PRACH enhanced transmission is the third level of PRACH enhanced transmission: if x3 dB<the path loss≤x4 dB, it is first determined that the level information of PRACH transmission and/or PRACH enhanced transmission is the $0^{th}$ level of PRACH transmission (or the first level of PRACH enhanced transmission). If the determining fails, it is determined that the level information of PRACH transmission and/or PRACH enhanced transmission is the first level of a PRACH enhanced transmission attempt (or the second level of PRACH enhanced transmission), and so on.

Another manner for determining the level information of PRACH transmission and/or PRACH enhanced transmission is as follows: it is determined that the level information of PRACH enhanced transmission is the first (lowest) level of PRACH enhanced transmission. If the UE obtains main information by receiving an enhanced main information block, and/or obtains system information by receiving an enhanced system information block, the UE performs preamble sending by using the first level of PRACH enhanced transmission. If the UE fails to perform random access by performing preamble sending by using the $n^{th}$ level of PRACH enhanced transmission, the UE performs preamble sending by using the $(n+1)^{th}$ level of PRACH enhanced transmission, where n is a positive integer. The enhanced main information block refers to a main information block that is re-sent in a radio frame for multiple times. The enhanced system information block includes one or more of an enhanced system information block of a system information block type 1, an enhanced system information block of a system information block type k, and an enhanced system information block of a system information block type m, where k and m are positive integers, and in particular, k=2. The enhanced system information block of the system information block type 1 refers to a system information block of the system information block type 1 in a subframe #5 of a radio frame with an even number and/or a system information block that is of the system information block type 1 and that is re-sent in another subframe. The enhanced system information block of the system information block type k refers to a system information block that includes configuration information of PRACH enhanced transmission. At least one type of configuration information in configuration information included in the system information block of the system information block type m is the same as configuration information included in the system information block of the system information block type 1.

In this embodiment of the present invention, the first characteristic parameter is related to the level information, and a characteristic parameter used for PRACH enhanced sending can be rapidly and accurately determined, which reduces power of a terminal.

Based on the three specific optional parameters included in the first characteristic parameter, this embodiment of the present invention proposes the following four solutions, which are specifically as follows:

1. Optionally, the first characteristic parameter includes the transmit power; and the parameter determining unit 102 is configured to determine the transmit power of PRACH enhanced transmission according to a second characteristic parameter corresponding to the level information of PRACH enhanced transmission, where the second characteristic parameter is at least one of preamble initial received target power, a quantity of preamble transmission attempt times, a path loss, a path loss threshold, a power ramping step, a power offset value related to the preamble format, and a power offset value related to the level information of PRACH enhanced transmission.

Optionally, the parameter determining unit 102 is configured to determine the transmit power of PRACH enhanced transmission according to the second characteristic parameter corresponding to the level information of PRACH enhanced transmission, where second characteristic parameters corresponding to different level information of PRACH enhanced transmission are completely identical, or partially identical, or completely different.

Optionally, the parameter determining unit 102 is configured to determine, according to a third characteristic parameter corresponding to level information that is of PRACH enhanced transmission and that is one level lower than the level information of PRACH enhanced transmission, the at least one parameter included in the second characteristic parameter corresponding to the level information of PRACH enhanced transmission, where the third characteristic parameter is at least one of preamble initial received target power, a power ramping step, a fixed power offset value, and a maximum quantity of preamble transmission attempt times.

Optionally, the second characteristic parameter includes the preamble initial received target power; and
the parameter determining unit 102 is configured to: if the level information of PRACH enhanced transmission is not the first level of PRACH enhanced transmission, determine that: the preamble initial received target power corresponding to the level information of PRACH enhanced transmission is a sum of the preamble initial received target power and the power ramping step that are corresponding to the level information that is of PRACH enhanced transmission and that is one level lower than the level information of PRACH enhanced transmission, or the preamble initial received target power corresponding to the level information of PRACH enhanced transmission is a fixed power offset value plus a sum of the preamble initial received target power and the power ramping step that are corresponding to the level information that is of PRACH enhanced transmission and that is one level lower than the level information of PRACH enhanced transmission; or
if the level information of PRACH enhanced transmission is the first level of PRACH enhanced transmission, determine that: the preamble initial received target power corresponding to the level information of PRACH enhanced transmission is preamble initial received target power configured by a network device, or the preamble initial received target power corresponding to the level information of PRACH enhanced transmission is a sum of preamble initial received target power and a power ramping step that are corresponding to PRACH transmission, or the preamble initial received target power corresponding to the level information of PRACH enhanced transmission is a fixed power offset value plus a sum of preamble initial received target power and a power ramping step that are corresponding to PRACH transmission.

Optionally, the second characteristic parameter includes the quantity of preamble transmission attempt times; and
the parameter determining unit 102 is configured to: set an initial value of the quantity of preamble transmission attempt times corresponding to the level information of PRACH enhanced transmission to 1 plus the maximum quantity of preamble transmission attempt times corresponding to the level information that is of PRACH enhanced transmission and that is one level lower than the level information of PRACH enhanced transmission; or set an initial value of the quantity of preamble transmission attempt times corresponding to the level information of PRACH enhanced transmission to 1; or set an initial value of the quantity of preamble transmission attempt times corresponding to the level information of PRACH enhanced transmission to 1 plus a maximum quantity of preamble transmission attempt times corresponding to PRACH transmission.

Optionally, the second characteristic parameter includes the path loss or the path loss threshold; and
the parameter determining unit 102 is configured to: set the path loss corresponding to the level information of PRACH enhanced transmission to a lowest path loss for determining the level information of PRACH enhanced transmission; or set the path loss threshold corresponding to the level information of PRACH enhanced transmission to a lowest path loss threshold for determining the level information of PRACH enhanced transmission.

Optionally, the second characteristic parameter includes the power offset value related to the level information of PRACH enhanced transmission; and
the parameter determining unit 102 is configured to: set the power offset value related to the level information of PRACH enhanced transmission to a difference between a highest path loss or path loss threshold for determining the level information of PRACH enhanced transmission and a path loss estimated by a terminal UE; or set the power offset value related to the level information of PRACH enhanced transmission to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE.

Optionally, the parameter determining unit 102 is further configured to: if the level information of PRACH enhanced transmission is not highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, increase the level information of PRACH enhanced transmission by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, increase the level information of PRACH enhanced transmission by one level; or if the level information of PRACH enhanced transmission is highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails; or if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

Further, the parameter determining unit 102 is further configured to determine that: quantities that are of preamble transmission available attempt times and that are corresponding to all level information of PRACH enhanced transmission are the same, or quantities that are of preamble transmission available attempt times and that are corresponding to at least two levels of PRACH enhanced transmission are different.

Optionally, the parameter determining unit 102 is configured to determine that: the quantity of preamble transmission available attempt times corresponding to the level information of PRACH enhanced transmission is configured by the network device, or the quantity of preamble transmission available attempt times corresponding to the level information of PRACH enhanced transmission is predefined, or the quantity of preamble transmission available attempt times corresponding to the level information of PRACH enhanced transmission is determined according to a predefined rule.

2. Optionally, if the first characteristic parameter includes the transmit power,
    the parameter determining unit 102 is configured to: if the level information of PRACH enhanced transmission is the $n^{th}$ level of PRACH enhanced transmission, determine that: the transmit power of PRACH enhanced transmission is a maximum value of transmit power of a terminal UE, or the transmit power of PRACH enhanced transmission is a dedicated power value of the level information of PRACH enhanced transmission, where n is a positive integer.

Optionally, the parameter determining unit 102 is configured to: determine the dedicated power value of the level information of PRACH enhanced transmission according to a predefined value; or determine the dedicated power value of the level information of PRACH enhanced transmission according to configuration performed by a network device.

Optionally, the parameter determining unit 102 is configured to determine that dedicated power values of at least two levels of PRACH enhanced transmission in dedicated power values of the level information of PRACH enhanced transmission are different.

3. Optionally, if the first characteristic parameter includes the preamble format,
    the parameter determining unit 102 is configured to determine that: preamble formats related to all level information of PRACH enhanced transmission are the same, or preamble formats related to at least two levels of PRACH enhanced transmission are different.

Optionally, the parameter determining unit 102 is configured to: in a process of determining that preamble formats related to at least two levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the parameter determining unit 102 is configured to determine that the first preamble format and the second preamble format are preamble formats in a preamble format 1 and a preamble format 3.

Optionally, the parameter determining unit 102 is configured to determine that a preamble format 4 is not used for PRACH enhanced transmission.

Optionally, the parameter determining unit 102 is configured to determine that: the used preamble format related to the determined level information of PRACH enhanced transmission is predefined, or the preamble format related to the determined level information of PRACH enhanced transmission is configured by a network device.

4. Optionally, the first characteristic parameter includes the time-frequency resource; and
    the parameter determining unit 102 is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

Figure 2:
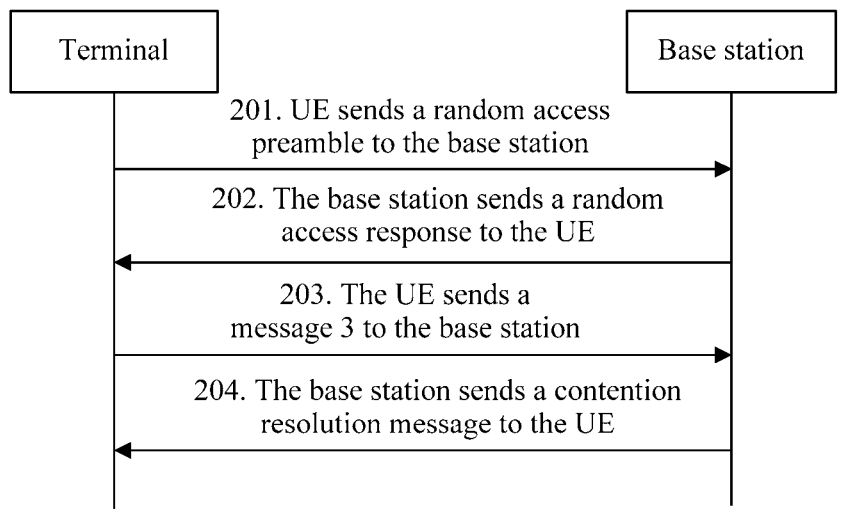
FIG. 2 is a schematic flowchart of a random access method according to an embodiment of the present invention.

Before a method in embodiments of the present invention is introduced, the following first describes a random access process of a terminal in the prior art. As shown in FIG. 2, FIG. 2 shows a detailed description of an optional random access process, which is specifically as follows:

201. UE sends a random access preamble (Msg 1) to a base station.

In this step, the UE sends the random access preamble to the base station by using a PRACH (physical random access channel). The random access preamble includes a cyclic prefix (CP) part whose duration is and a sequence part whose duration is $T_{SEQ}$.

Currently, the random access preamble has five optional formats. For the random access preamble in different formats, $T_{SEQ}$ and $T_{CP}$ have different values, as shown in Table 1, where $T_s$ indicates a time unit, and generally Ts=1/(15000×2048) seconds. In a frequency domain, the PRACH occupies 1.08 MHZ, that is, six PRBs.

TABLE 1

Random access preamble parameters

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

In an FDD (frequency division duplex) system, random access may be performed by using one of preamble formats 0-3. In a TDD (time division duplex) system, in addition to the preamble formats 0-3, a preamble format 4 may also be used when a time length of an UpPTS (uplink pilot timeslot) configured by using a special subframe configuration is 4384's and 5120 $T_s$. One preamble format is used in all random access processes within a cell, and the base station configures a physical random access channel configuration index (prach-ConfigurationIndex) for the UE (User Equipment, or a terminal) by using an SIB2 (system information block type 2) to indicate a preamble format used in the random access process.

There are 64 random access preambles in total within a cell, and in the 64 preambles, a part of dedicated preambles are reserved for non-contention based random access, and the remaining preambles are used for contention-based random access.

For the contention-based random access, the UE randomly selects a preamble from a set of preambles used for the contention-based random access, and selects, from a predefined time resource and a predefined frequency resource, a resource for sending the selected preamble, and therefore there is a possibility that multiple UEs simultaneously send a same preamble, and a subsequent contention resolution solution is required. For the non-contention based random access, the base station configures, by using dedicated signaling, a dedicated preamble and a time resource and a frequency resource that are for sending the preamble, and the UE performs random access by using the dedicated preamble.

Transmit power PPRACH for sending the random access preamble by the UE is obtained according to the following formula: PPRACH=min{$P_{CMAX,c}$(i) PREAMBLE_RECEIVED_TARGET_POWER+$PL_c$}_[dBm], where min{ } indicates an operation for calculating a minimum value, $P_{CMAX,c}$(i) is a maximum value of transmit power of the UE in a subframe whose number is i, $PL_c$ is a value of a downlink path loss that is estimated by the UE, dBm is a power unit decibels per milliwatt, and PREAMBLE_RECEIVED_TARGET_POWER is preamble received target power and is obtained by calculating preambleInitialReceivedTargetPower+DELTA_PREAMBLE+(PREAMBLE_TRANSMISSION_COUNTER−1)*powerRampingStep, where DELTA_PREAMBLE is a power offset value related to a preamble format, powerRampingStep is a power ramping step, and PREAMBLE_TRANSMISSION_COUNTER is a quantity of preamble transmission times.

preambleInitialReceivedTargetPower is preamble initial received target power and is a parameter configured by the base station for the UE by using the SIB2, and DELTA PREAMBLE is a power offset value related to a preamble format and is a fixed value. If the UE fails to complete one random access process, the UE resends the random access preamble, where the preamble may be sent for a maximum of preambleTransMax times, and a maximum quantity of preamble transmission times preambleTransMax is a parameter configured by using the SIB2. If in preambleTransMax times of preamble sending, the random access process is not successfully completed, the UE indicates a problem of random access to a higher layer. An initial value of PREAMBLE_TRANSMISSION_COUNTER is 1, and a value of the counter is increased by 1 each time preamble resending is performed. When the UE resends the random access preamble, transmit power is gradually increased in a ramping manner until a maximum value $P_{CMAX,c}$(i) of the transmit power is reached. In each time of preamble sending, a value of increased power is a power ramping step powerRampingStep, and this parameter is configured by the base station for the UE by using the SIB2.

202. The base station sends a random access response (Msg 2) to the UE.

After detecting the random access preamble, the base station sends the random access response (RAR). The random access response RAR is carried over a PDSCH (physical downlink shared channel), and the PDSCH is scheduled by using a PDCCH (physical downlink control channel) that is scrambled by using an RA-RNTI (random access radio network temporary identifier). The PDSCH includes an RAPID (random access preamble index), which is used to indicate the random access preamble detected by the base station. After sending the random access preamble, the UE detects a PDCCH in each subframe within a random access response window. After detecting the PDCCH that is scrambled by using the RA-RNTI corresponding to the UE, the UE continues to perform demodulation for the PDSCH indicated by the PDCCH. If the RAPID included in the PDSCH indicates the random access preamble selected by the UE, the PDSCH includes the RAR for the UE. If the UE does not receive the RAR for the UE within the random access response window; the UE resends the random access preamble. The RAR further includes information such as a timing alignment instruction, control information (UL grant) used to schedule message 3 (Msg3) data, and a temporary C-RNTI (cell radio network temporary identifier).

203. The UE sends a message 3 (Msg 3) to the base station.

After successfully receiving the RAR for the UE within the random access response window; the UE sends, by using a PUSCH (physical uplink shared channel), the message 3 (Msg 3) in the random access process to the base station in a determined subframe that is after the RAR is received. The message 3 is scrambled by using the temporary C-RNTI (cell radio network temporary identifier) included in the RAR, and includes an identifier of the UE in this cell, which is used for contention resolution.

As described in the foregoing, in the contention-based random access, multiple UEs simultaneously send a same preamble. In this case, different UEs receive a same RAR, to obtain a same temporary C-RNTI, and therefore the message 3 is sent in a same time-frequency resource by using the same temporary C-RNTI, which causes transmission collision of the message 3. If the base station cannot successfully decode the message 3, the UE needs to retransmit the message 3, and if the base station still cannot successfully decode the message 3 when a maximum quantity of retransmission times of the UE is reached, the UE resends the random access preamble. If the base station successfully decodes a message 3 of UE, contention collision between UEs is to be resolved in a downlink message in step 4.

204. The base station sends a contention resolution message (Msg 4) to the UE.

The UE receives the contention resolution message sent by the base station, and completes the random access process. Within a time recorded by a timer for contention resolution, the UE detects the PDCCH and the contention resolution message scheduled by the PDCCH, and if the UE receives the contention resolution message scrambled by using the identifier of the UE in this cell or the contention resolution message that includes the identifier of the UE in this cell, it is considered that the random access succeeds: if the UE has not yet received the contention resolution message scrambled by using the identifier of the UE in this cell or the contention resolution message that includes the identifier of the UE in this cell, when the timer expires, the UE resends the random access preamble.

MTC (machine type communication) means that information about a physical world is acquired by deploying various devices that have particular sensing, computing, execution, and communication capabilities, and information transmission, collaboration, and processing are implemented by using a network, so as to implement interconnection between a person and an object and interconnection between objects. MTC may be combined with the Internet to implement remote sensing and control of an object, and is widely applied to multiple fields such as smart grid, intelligent transportation, environmental protection, government work, public safety, smart household, smart firefighting, industry monitoring, elderly nursing, and personal health. MTC development is known as the third wave of the information industry following a computer and the Internet, and is greatly valued by a research institute and the industry.

A coverage area of a cell generally means the following: when the base station sends a signal by using maximum transmit power, and if the UE can correctly detect the signal sent by the base station with a particular probability, it is considered that a position in which the UE is located is within the coverage area of the cell. The coverage area of the cell is affected by many factors, including a path loss of a radio signal, sensitivity of a user's receiver, and the like. An important application of an MTC service is a smart meter, and this type of smart meter is generally installed in a basement of a house, or is isolated by using a metal housing, or is installed in an old building with a thick wall. In this scenario, a path loss between the UE and the base station is more severe.

When an LTE or LTE-A system supports the MTC service, LTE/LTE-A network coverage needs to be enhanced. For example, coverage enhancement of additional 20 dB or 15 dB is performed based on existing LTE/LTE-A network coverage, to ensure that UE in a basement or in a condition in which channel quantity is poor can reliably communicate with the base station.

Figure 3:
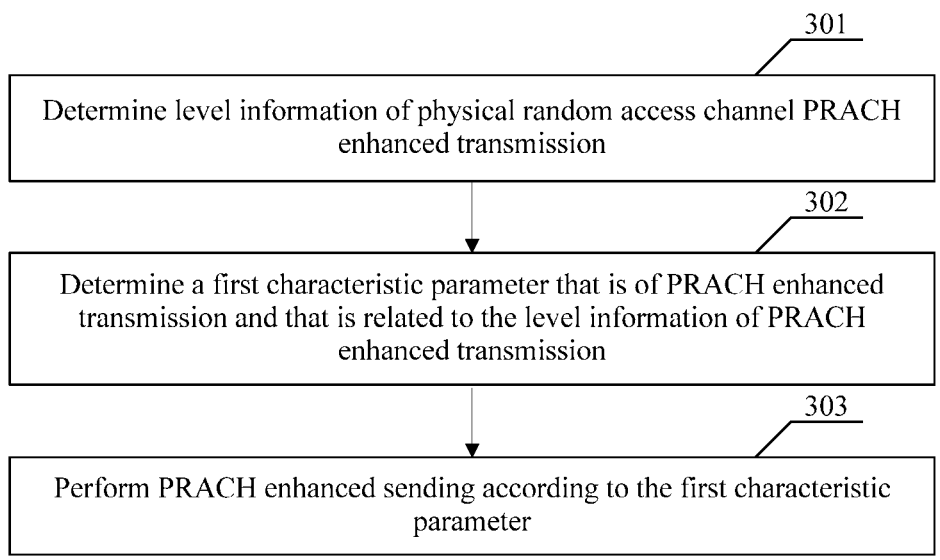
FIG. 3 is a schematic flowchart of a method on a terminal side according to an embodiment of the present invention.

To reduce power of UE, an embodiment of the present invention provides a physical random access channel enhanced transmission method, as shown in FIG. 3, including the following steps:

301. Determine level information of physical random access channel PRACH enhanced transmission.

In this embodiment of the present invention, the level information may be any one of a level, a level index, an enhancement level, an enhancement level index, a repetition level, a repetition level index, a resource level, a resource level index, a resource set level, a resource set level index, a resource set index, and a resource index.

302. Determine a first characteristic parameter that is of PRACH enhanced transmission and that is related to the level information of PRACH enhanced transmission.

In this embodiment of the present invention, the first characteristic parameter may be at least one of transmit power, a preamble format, and a time-frequency resource.

Based on the three specific optional parameters included in the first characteristic parameter, this embodiment of the present invention proposes the following four solutions, which are specifically as follows:

1. Optionally, if the first characteristic parameter includes the transmit power, the determining a first characteristic parameter that is of PRACH enhanced transmission and that is related to the level information of PRACH enhanced transmission includes:

determining the transmit power of PRACH enhanced transmission according to a second characteristic parameter corresponding to the level information of PRACH enhanced transmission, where the second characteristic parameter is at least one of preamble initial received target power, a quantity of preamble transmission attempt times, a path loss, a path loss threshold, a power ramping step, a power offset value related to the preamble format, and a power offset value related to the level information of PRACH enhanced transmission.

Optionally, second characteristic parameters corresponding to different level information of PRACH enhanced transmission are completely identical, or partially identical, or completely different.

Optionally, the at least one parameter included in the second characteristic parameter corresponding to the level information of PRACH enhanced transmission is determined according to a third characteristic parameter corresponding to level information that is of PRACH enhanced transmission and that is one level lower than the level information of PRACH enhanced transmission, where the third characteristic parameter is at least one of preamble initial received target power, a power ramping step, a fixed power offset value, and a maximum quantity of preamble transmission attempt times.

Optionally, the second characteristic parameter includes the preamble initial received target power, and a method for determining the second characteristic parameter corresponding to the level information of PRACH enhanced transmission includes:

if the level information of PRACH enhanced transmission is not the first level of PRACH enhanced transmission, determining that: the preamble initial received target power corresponding to the level information of PRACH enhanced transmission is a sum of the preamble initial received target power and the power ramping step that are corresponding to the level information that is of PRACH enhanced transmission and that is one level lower than the level information of PRACH enhanced transmission, or the preamble initial received target power corresponding to the level information of PRACH enhanced transmission is a fixed power offset value plus a sum of the preamble initial received target power and the power ramping step that are corresponding to the level information that is of PRACH enhanced transmission and that is one level lower than the level information of PRACH enhanced transmission; or if the level information of PRACH enhanced transmission is the first level of PRACH enhanced transmission, determining that: the preamble initial received target power corresponding to the level information of PRACH enhanced transmission is preamble initial received target power configured by a network device, or the preamble initial received target power corresponding to the level information of PRACH enhanced transmission is a sum of preamble initial received target power and a power ramping step that are corresponding to PRACH transmission, or the preamble initial received target power corresponding to the level information of PRACH enhanced transmission is a fixed power offset value plus a sum of preamble initial received target power and a power ramping step that are corresponding to PRACH transmission.

Optionally, the second characteristic parameter includes the quantity of preamble transmission attempt times, and a method for determining the second characteristic parameter corresponding to the level information of PRACH enhanced transmission includes:

setting an initial value of the quantity of preamble transmission attempt times corresponding to the level information of PRACH enhanced transmission to 1 plus the maximum quantity of preamble transmission attempt times corresponding to the level information that is of PRACH enhanced transmission and that is one level lower than the level information of PRACH enhanced transmission; or setting an initial value of the quantity of preamble transmission attempt times corresponding to the level information of PRACH enhanced transmission to 1; or setting an initial value of the quantity of preamble transmission attempt times corresponding to the level information of PRACH enhanced transmission to 1 plus a maximum quantity of preamble transmission attempt times corresponding to PRACH transmission.

Optionally, if the second characteristic parameter includes the path loss or the path loss threshold, a method for determining the second characteristic parameter corresponding to the level information of PRACH enhanced transmission includes:

setting the path loss corresponding to the level information of PRACH enhanced transmission to a lowest path loss for determining the level information of PRACH enhanced transmission; or setting the path loss threshold corresponding to the level information of PRACH enhanced transmission to a lowest path loss threshold for determining the level information of PRACH enhanced transmission.

Optionally, the second characteristic parameter includes the power offset value related to the level information of PRACH enhanced transmission, and a method for determining the second characteristic parameter corresponding to the level information of PRACH enhanced transmission includes:

setting the power offset value related to the level information of PRACH enhanced transmission to a difference between a highest path loss or path loss threshold for determining the level information of PRACH enhanced transmission and a path loss estimated by a terminal UE; or setting the power offset value related to the level information of PRACH enhanced transmission to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE.

Further, the method further includes:

if the level information of PRACH enhanced transmission is not highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, increasing the level information of PRACH enhanced transmission by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, increasing the level information of PRACH enhanced transmission by one level; or if the level information of PRACH enhanced transmission is highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, executing a backoff operation and performing a preamble resending attempt starting from lowest level information of PRACH enhanced transmission, or executing a backoff operation and performing a preamble resending attempt by keeping the level information of PRACH enhanced transmission as highest level information of PRACH enhanced transmission, or adjusting a backoff parameter, or notifying a higher layer that enhanced random access fails; or if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, executing a backoff operation and performing a preamble resending attempt starting from lowest level information of PRACH enhanced transmission, or executing a backoff operation and performing a preamble resending attempt by keeping the level information of PRACH enhanced transmission as highest level information of PRACH enhanced transmission, or adjusting a backoff parameter, or notifying, by UE, a higher layer that enhanced random access fails.

Optionally, quantities that are of preamble transmission available attempt times and that are corresponding to all level information of PRACH enhanced transmission are the same, or quantities that are of preamble transmission available attempt times and that are corresponding to at least two levels of PRACH enhanced transmission are different.

Optionally, the quantity of preamble transmission available attempt times corresponding to the level information of PRACH enhanced transmission is configured by the network device, or the quantity of preamble transmission available attempt times corresponding to the level information of PRACH enhanced transmission is predefined, or the quantity of preamble transmission available attempt times corresponding to the level information of PRACH enhanced transmission is determined according to a predefined rule.

2. Optionally, if the first characteristic parameter includes the transmit power, the determining a first characteristic parameter that is of PRACH enhanced transmission and that is related to the level information of PRACH enhanced transmission includes:

if the level information of PRACH enhanced transmission is the $n^{th}$ level of PRACH enhanced transmission, determining that: the transmit power of PRACH enhanced transmission is a maximum value of transmit power of a terminal UE, or the transmit power of PRACH enhanced transmission is a dedicated power value of the level information of PRACH enhanced transmission, where n is a positive integer.

Optionally, the dedicated power value of the level information of PRACH enhanced transmission is predefined; or the dedicated power value of the level information of PRACH enhanced transmission is configured by a network device.

Optionally, dedicated power values of at least two levels of PRACH enhanced transmission are different.

3. Optionally, if the first characteristic parameter includes the preamble format, the determining a first characteristic parameter that is of PRACH enhanced transmission and that is related to the level information of PRACH enhanced transmission includes:

determining that: preamble formats related to all level information of PRACH enhanced transmission are the same, or preamble formats related to at least two levels of PRACH enhanced transmission are different.

Optionally, that preamble formats related to at least two levels of PRACH enhanced transmission are different includes:

if there are N levels of PRACH enhanced transmission, the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the first preamble format and the second preamble format are preamble formats in a preamble format 1 and a preamble format 3.

Optionally, a preamble format 4 is not used for PRACH enhanced transmission.

Optionally, the preamble format related to the determined level information of PRACH enhanced transmission is predefined, or the preamble format related to the determined level information of PRACH enhanced transmission is configured by a network device.

4. Optionally, if the first characteristic parameter includes the time-frequency resource, the determining a first characteristic parameter that is of PRACH enhanced transmission and that is related to the level information of PRACH enhanced transmission includes:

determining that time-frequency resources related to the first M1 levels of PRACH enhanced transmission in M adjacent levels of PRACH enhanced transmission include a first time-frequency resource; and determining that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

303. Perform PRACH enhanced sending according to the first characteristic parameter.

This embodiment of the present invention is applied to an LTE or LTE-A system with coverage enhancement, and there are multiple repetition levels of PRACH enhanced transmission, for example, repetition levels 1, 2, and 3 of PRACH enhanced transmission. Index numbering may be performed on the multiple repetition levels, that is, repetition level indexes. In another manner, there are multiple levels or multiple enhancement levels of PRACH enhanced transmission, and index numbering is performed on the multiple levels, that is, level indexes, or index numbering is performed on the multiple enhancement levels, that is, enhancement level indexes. The level information of PRACH enhanced transmission is any one of the level, the level index, the enhancement level, the enhancement level index, the repetition level, and the repetition level index.

For each level of PRACH enhanced transmission, a quantity of repetition times for sending a preamble by UE and a resource set of PRACH enhanced transmission that are corresponding to each level of PRACH enhanced transmission are specified in advance by the system or signaled. The resource set of PRACH enhanced transmission includes one or more resources of PRACH enhanced transmission. The resources of PRACH enhanced transmission include a code resource (a preamble), a time resource, and a frequency resource that are used to send the preamble. The time resource and the frequency resource may be collectively referred to as a time-frequency resource. If the UE determines the level information of PRACH enhanced transmission, the UE resends, according to a quantity of repetition times corresponding to the determined level information of PRACH enhanced transmission, a preamble on a resource that is of PRACH enhanced transmission and that is included in the resource set of PRACH enhanced transmission. For different level information of PRACH enhanced transmission, quantities of repetition times for sending a preamble by the UE are different. When a required system coverage enhancement value is larger, a path loss between the UE and a base station is also larger, level information that is of PRACH enhanced transmission and that is required to be used by the UE to successfully complete a random access process is also higher, and the quantity of repetition times for sending the preamble is larger. Because there are multiple levels of PRACH enhanced transmission, there are also multiple resource sets of PRACH enhanced transmission, and the multiple resource sets are used by the UE to send the preamble according to different quantities of repetition times. A PRACH resource set may be referred to as a resource set level of PRACH enhanced transmission, and one or more resources that are of PRACH enhanced transmission and that are included in one resource set of PRACH enhanced transmission may be collectively referred to as one resource level of PRACH enhanced transmission, and index numbering is separately performed on the resource set, the resource set level, the resource, and the resource level that are of PRACH enhanced transmission, that is, a resource set index, a resource set level index, a resource index, and a resource level index that are of PRACH enhanced transmission. The level information of PRACH enhanced transmission may also be any one of the resource level, the resource level index, the resource set level, the resource set level index, the resource set index, and the resource index. Index numbering is performed on the quantity of repetition times for sending the preamble by the UE, that is, an index of the quantity of repetition times. The level information of PRACH enhanced transmission may also be one of the quantity of repetition times and the index of the quantity of repetition times.

Optionally, the level information of PRACH enhanced transmission is determined according to the path loss between the base station and the UE. The base station or another network device presets a lowest path loss or path loss threshold and a highest path loss or path loss threshold for determining the level information of PRACH enhanced transmission, and the path loss between the base station and the UE is divided into X ranges according to the lowest path loss or path loss threshold and the highest path loss or path loss threshold, and each path loss range is corresponding to one level of PRACH enhanced transmission, so that the level information of PRACH enhanced transmission is determined according to the lowest path loss or path loss threshold and the highest path loss or path loss threshold. For example, a path loss or a path loss threshold is preset to x0, x1, and x2, the path loss between the base station and the UE is divided into three ranges, and the first, the second, and the third (or the 1st, the 2nd, and the 3rd) level of PRACH enhanced transmission are determined, that is:

the first level of PRACH enhanced transmission: x0 dB<path loss≤x1 dB;
the second level of PRACH enhanced transmission: x1 dB<path loss≤x2 dB; and
the third level of PRACH enhanced transmission: path loss>x2.

For example, for the first level of PRACH enhanced transmission, the lowest path loss or path loss threshold and the highest path loss or path loss threshold for determining the level information of PRACH enhanced transmission are x0 and x1 respectively. The lowest path loss or path loss threshold and the highest path loss or path loss threshold and/or a value of X may be predefined or signaled by the base station to the UE. Index numbering is performed on the path loss range, that is, a path loss range index. The path loss may also be one of a required coverage enhancement value, reference signal received power, reference signal received quality, and channel quality information, and index numbering is performed on the coverage enhancement value, the reference signal received power, the reference signal received quality, and a channel quality information range, that is, a coverage enhancement range index, a reference signal received power range index, a reference signal received quality range index, and a channel quality information range index. The level information of PRACH enhanced transmission may also be one of the coverage enhancement value, the coverage enhancement range index, the path loss, the path loss range index, the reference signal received power, the reference signal received power range index, the reference signal received quality, the reference signal received quality range index, the channel quality information, and the channel quality information range index.

In step 301 in this embodiment of the present invention, the level information of PRACH enhanced transmission may be determined in multiple manners. In step 301, it may also be determined that enhanced transmission is not to be performed on a PRACH, that is, it is determined that PRACH transmission is performed, where a preamble is sent according to an existing format without repetition. For example, level information of PRACH transmission and/or the level information of PRACH enhanced transmission may be determined according to a path loss range between the UE and a network side or another measurement parameter or monitoring parameter that can reflect a path loss range; or it is determined that the level information of PRACH enhanced transmission is the first (lowest) level of PRACH enhanced transmission; or it is determined that the level information of PRACH enhanced transmission is level information obtained by increasing originally determined level information of PRACH enhanced transmission by one level of PRACH enhanced transmission; or it is determined that PRACH transmission is changed to the first level of PRACH enhanced transmission. A specific manner for determining the level information of PRACH enhanced transmission is not limited in this embodiment of the present invention.

One manner for determining the level information of PRACH transmission and/or PRACH enhanced transmission is as follows: a part of the level information of PRACH transmission and/or PRACH enhanced transmission is determined according to the path loss range between the UE and the network side or the another measurement parameter or monitoring parameter that can reflect the path loss range, and other level information of PRACH enhanced transmission is determined by the UE by sequentially performing an attempt from the level information of PRACH transmission and/or from low level information of enhanced transmission to high level information of enhanced transmission. If an attempt based on the level information of PRACH transmission and/or the low level information of enhanced transmission fails, the attempt is switched to be performed based on an adjacent high level of enhanced transmission. For example, if the level information of PRACH enhanced transmission includes the first, the second, and the third level, PRACH transmission is denoted as the $0^{th}$ level. If the path loss≤x3 dB, it is determined that the level information of PRACH transmission and/or PRACH enhanced transmission is the $0^{th}$ level of PRACH transmission: if the path loss>x4 dB, it is determined that the level information of PRACH transmission and/or PRACH enhanced transmission is the third level of PRACH enhanced transmission: if x3 dB<the path loss≤x4 dB, it is first determined that the level information of PRACH transmission and/or PRACH enhanced transmission is the $0^{th}$ level of PRACH transmission (or the first level of PRACH enhanced transmission). If the determining fails, it is determined that the level information of PRACH transmission and/or PRACH enhanced transmission is the first level of a PRACH enhanced transmission attempt (or the second level of PRACH enhanced transmission), and so on. In this embodiment of the present invention, the first characteristic parameter is related to the level information, and a characteristic parameter used for PRACH enhanced sending can be rapidly and accurately determined, which reduces power of a terminal.

Another manner for determining the level information of PRACH transmission and/or PRACH enhanced transmission is as follows: it is determined that the level information of PRACH enhanced transmission is the first (lowest) level of PRACH enhanced transmission. If the UE obtains main information by receiving an enhanced main information block, and/or obtains system information by receiving an enhanced system information block, the UE performs preamble sending by using the first level of PRACH enhanced transmission. If the UE fails to perform random access by performing preamble sending by using the $n^{th}$ level of PRACH enhanced transmission, the UE performs preamble sending by using the $(n+1)^{th}$ level of PRACH enhanced transmission, where n is a positive integer. The enhanced main information block refers to a main information block that is re-sent in a radio frame for multiple times. The enhanced system information block includes one or more of an enhanced system information block of a system information block type 1, an enhanced system information block of a system information block type k, and an enhanced system information block of a system information block type m, where k and m are positive integers, and in particular, k=2. The enhanced system information block of the system information block type 1 refers to a system information block of the system information block type 1 in a subframe #5 of a radio frame with an even number and/or a system information block that is of the system information block type 1 and that is re-sent in another subframe. The enhanced system information block of the system information block type k refers to a system information block that includes configuration information of PRACH enhanced transmission. At least one type of configuration information in configuration information included in the system information block of the system information block type m is the same as configuration information included in the system information block of the system information block type 1.

Figure 4:
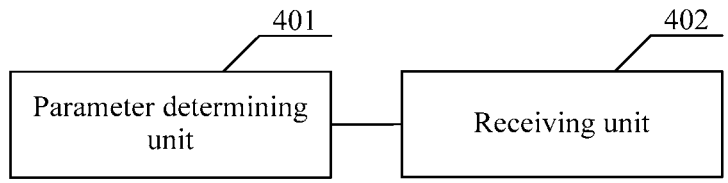
FIG. 4 is a schematic structural diagram of a network device according to an embodiment of the present invention.

An embodiment of the present invention further provides a network device, as shown in FIG. 4, including: a parameter determining unit 401 and a receiving unit 402.

The parameter determining unit 401 is configured to determine a first characteristic parameter that is of PRACH enhanced transmission and that is related to level information of physical random access channel PRACH enhanced transmission.

In this embodiment of the present invention, the first characteristic parameter may be at least one of a preamble format and a time-frequency resource.

The receiving unit 402 is configured to perform PRACH enhanced receiving according to the first characteristic parameter that is related to all level information of PRACH enhanced transmission and that is determined by the parameter determining unit 401.

Figure 5:
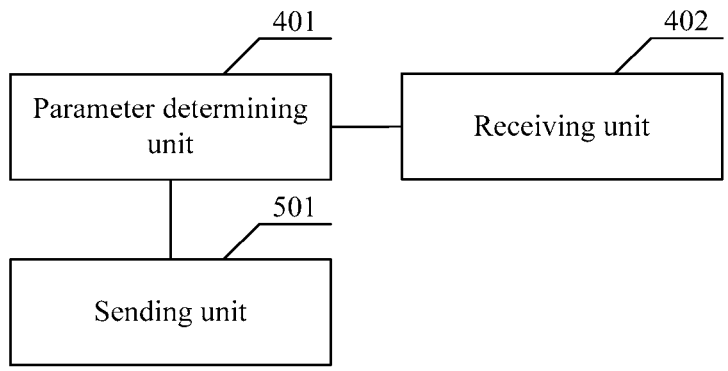
FIG. 5 is a schematic structural diagram of a network device according to an embodiment of the present invention.

Optionally, as shown in FIG. 5, the network device further includes:

a sending unit 501, configured to: before the receiving unit 402 performs PRACH enhanced receiving according to the first characteristic parameter related to all the level information of PRACH enhanced transmission, send, to UE, at least one of the following configuration information: preamble initial received target power, a quantity of preamble transmission available attempt times corresponding to the level information of PRACH enhanced transmission, and a dedicated power value of the level information of PRACH enhanced transmission, so that the UE determines, according to the configuration information, transmit power that is of PRACH enhanced transmission and that is related to the level information of PRACH enhanced transmission, or increase the level information of PRACH enhanced transmission by one level, or execute a back-off operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

Optionally, the parameter determining unit 401 is further configured to determine that: quantities that are of preamble transmission available attempt times and that are corresponding to all the level information of PRACH enhanced transmission are the same, or quantities that are of preamble transmission available attempt times and that are corresponding to at least two levels of PRACH enhanced transmission are different.

Optionally, the parameter determining unit 401 is further configured to determine that dedicated power values of at least two levels of PRACH enhanced transmission in all the level information of PRACH enhanced transmission are different.

Based on different optional parameters of the first characteristic parameter, there may be different solutions to determining the first characteristic parameter that is of PRACH enhanced transmission and that is related to the level information of PRACH enhanced transmission, and this embodiment of the present invention provides a solution, which is specifically as follows:

Optionally, if the first characteristic parameter includes the preamble format, the parameter determining unit 401 is configured to determine that: preamble formats related to all the level information of PRACH enhanced transmission are the same, or preamble formats related to at least two levels of PRACH enhanced transmission are different.

Optionally, the parameter determining unit 401 is configured to: in a process of determining that preamble formats related to at least two levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the parameter determining unit 401 is configured to determine that the first preamble format and the second preamble format are preamble formats in a preamble format 1 and a preamble format 3.

Optionally, the parameter determining unit 401 is configured to determine that a preamble format 4 is not used for PRACH enhanced transmission.

Optionally, the parameter determining unit 401 is configured to determine that the preamble format related to the determined level information of PRACH enhanced transmission is predefined; or the sending unit 501 included in the network device is configured to send, to UE, configuration information of the preamble format related to the determined level information of PRACH enhanced transmission.

Optionally, if the first characteristic parameter includes the time-frequency resource, the parameter determining unit 401 is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

Figure 6:
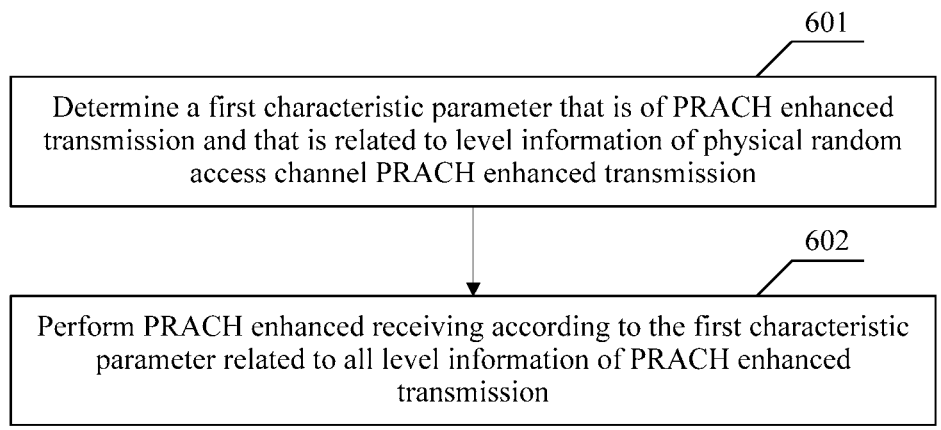
FIG. 6 is a schematic flowchart of a method on a network device side according to an embodiment of the present invention.

An embodiment of the present invention further provides a physical random access channel enhanced transmission method, and this method may be implemented on a network device side. As shown in FIG. 6, the method includes the following steps:

601. Determine a first characteristic parameter that is of PRACH enhanced transmission and that is related to level information of physical random access channel PRACH enhanced transmission.

In this embodiment of the present invention, the level information may be any one of a level, a level index, an enhancement level, an enhancement level index, a repetition level, a repetition level index, a resource level, a resource level index, a resource set level, a resource set level index, a resource set index, and a resource index. In this embodiment of the present invention, the first characteristic parameter may be at least one of a preamble format and a time-frequency resource.

602. Perform PRACH enhanced receiving according to the first characteristic parameter related to all level information of PRACH enhanced transmission.

Further, before the performing PRACH enhanced receiving according to the first characteristic parameter related to all the level information of PRACH enhanced transmission, the method includes: sending, to UE, at least one of the following configuration information: preamble initial received target power, a quantity of preamble transmission available attempt times corresponding to the level information of PRACH enhanced transmission, and a dedicated power value of the level information of PRACH enhanced transmission, so that the UE determines, according to the configuration information, transmit power that is of PRACH enhanced transmission and that is related to the level information of PRACH enhanced transmission, or increasing the level information of PRACH enhanced transmission by one level, or executing a backoff operation and performing a preamble resending attempt starting from lowest level information of PRACH enhanced transmission, or executing a backoff operation and performing a preamble resending attempt by keeping the level information of PRACH enhanced transmission as highest level information of PRACH enhanced transmission, or adjusting a backoff parameter, or notifying a higher layer that enhanced random access fails.

Optionally, quantities that are of preamble transmission available attempt times and that are corresponding to all the level information of PRACH enhanced transmission are the same, or quantities that are of preamble transmission available attempt times and that are corresponding to at least two levels of PRACH enhanced transmission are different.

Optionally, dedicated power values of at least two levels of PRACH enhanced transmission are different.

Based on different optional parameters of the first characteristic parameter, there may be different solutions to determining the first characteristic parameter that is of PRACH enhanced transmission and that is related to the level information of PRACH enhanced transmission, and this embodiment of the present invention provides a solution, which is specifically as follows:

Optionally, if the first characteristic parameter includes the preamble format, the determining a first characteristic parameter that is of PRACH enhanced transmission and that is related to level information of PRACH enhanced transmission includes:

determining that: preamble formats related to all the level information of PRACH enhanced transmission are the same, or preamble formats related to at least two levels of PRACH enhanced transmission are different.

Optionally, that preamble formats related to at least two levels of PRACH enhanced transmission are different includes:

if there are N levels of PRACH enhanced transmission, the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the first preamble format and the second preamble format are preamble formats in a preamble format 1 and a preamble format 3.

Optionally, a preamble format 4 is not used for PRACH enhanced transmission.

Optionally, the preamble format related to the determined level information of PRACH enhanced transmission is predefined; or configuration information of the preamble format related to the determined level information of PRACH enhanced transmission is sent to UE.

Optionally, if the first characteristic parameter includes the time-frequency resource, the determining a first characteristic parameter that is of PRACH enhanced transmission and that is related to level information of PRACH enhanced transmission includes:

determining that time-frequency resources related to the first M1 levels of PRACH enhanced transmission in M adjacent levels of PRACH enhanced transmission include a first time-frequency resource; and determining that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

A main problem to be resolved by the present invention is a power waste of UE caused by an existing power calculation method in PRACH enhanced transmission. In addition, for different preamble formats, sequence duration may be different, and for one level of PRACH enhanced transmission, a quantity of repetition times for resending a preamble is related to a preamble format. Therefore, the preamble format that is of PRACH enhanced transmission and that is related to the level information of PRACH enhanced transmission may also need to be determined. This embodiment of the present invention relates to determining aspects such as the transmit power, the preamble format, and the time-frequency resource that are of PRACH enhanced transmission and that are related to the level information of PRACH enhanced transmission.

Solutions and specific embodiments of the present invention are described by using PRACH enhanced transmission in an LTE or LTE-A system, and the PRACH enhanced transmission method provided in the present invention may also be applied to another system or channel on which resource multiplexing is performed in a CDM manner, such as a Code Division Multiple Access (CDMA) system, a Wideband Code Division Multiple Access Wireless (WCDMA) system, or a Universal Mobile Telecommunication System (UMTS).

With reference to the LTE or LTE-A system, the following describes in detail the PRACH enhanced transmission method provided in this embodiment of the present invention. In this embodiment of the present invention, a PRACH is a channel that carries a preamble; PRACH enhanced transmission or PRACH transmission may be referred to as enhanced transmission or transmission of a channel that carries a preamble, or may be referred to as enhanced transmission or transmission of a preamble. The PRACH enhanced transmission refers to an enhanced transmission manner such as retransmission or spread spectrum transmission performed on a preamble. The PRACH transmission refers to transmission performed on a preamble according to an existing format without repetition. Transmission includes sending and receiving. During PRACH enhanced transmission, retransmission performed on a preamble according to a particular quantity of repetition times or spread spectrum transmission performed on a preamble according to a particular spreading factor is referred to as one preamble transmission attempt. During PRACH transmission, one time of transmission performed on a preamble is referred to as one preamble transmission attempt. The solution in this embodiment of the present invention is described by using preamble retransmission as an example. The following describes in detail the method in this embodiment of the present invention from a UE side.

First, the level information of PRACH enhanced transmission is determined, where the level information is one of a level, a level index, an enhancement level, an enhancement level index, a repetition level, a repetition level index, a resource level, a resource level index, a resource set level, a resource set level index, a resource set index, and a resource index. In an LTE or LTE-A system with coverage enhancement, there are multiple levels of PRACH enhanced transmission, and a quantity that is of repetition times for sending a preamble by UE and that is corresponding to each level of PRACH enhanced transmission is specified in advance by the system or signaled. If the UE determines the level information of PRACH enhanced transmission, the UE resends a preamble according to a quantity of repetition times corresponding to the determined level information of PRACH enhanced transmission. The level information of PRACH enhanced transmission may also be one of a quantity of repetition times, an index of the quantity of repetition times, a coverage enhancement value, a coverage enhancement range index, a path loss, a path loss range index, reference signal received power, a reference signal received power range index, reference signal received quality, a reference signal received quality range index, channel quality information, and a channel quality information range index.

In this embodiment of the present invention, the level information of PRACH enhanced transmission may be determined in multiple manners. It may also be determined that enhanced transmission is not to be performed on a PRACH, that is, it is determined that PRACH transmission is performed, where a preamble is sent according to an existing format without repetition. For example, level information of PRACH transmission and/or the level information of PRACH enhanced transmission may be determined according to a path loss range between the UE and a network side or another measurement parameter or monitoring parameter that can reflect a path loss range; or it is determined that the level information of PRACH enhanced transmission is the first (lowest) level of PRACH enhanced transmission; or it is determined that the level information of PRACH enhanced transmission is level information obtained by increasing originally determined level information of PRACH enhanced transmission by one level of PRACH enhanced transmission; or it is determined that PRACH transmission is changed to the first level of PRACH enhanced transmission. A specific manner for determining the level information of PRACH enhanced transmission is not limited in this embodiment of the present invention.

One manner for determining the level information of PRACH transmission and/or PRACH enhanced transmission is as follows: a part of the level information of PRACH transmission and/or PRACH enhanced transmission is determined according to the path loss range between the UE and the network side or the another measurement parameter or monitoring parameter that can reflect the path loss range, and other level information of PRACH enhanced transmission is determined by the UE by sequentially performing an attempt from the level information of PRACH transmission and/or from low level information of enhanced transmission to high level information of enhanced transmission. If an attempt based on the level information of PRACH transmission and/or the low level information of enhanced transmission fails, the attempt is switched to be performed based on an adjacent high level of enhanced transmission. For example, if the level information of PRACH enhanced transmission includes the first, the second, and the third level, PRACH transmission is denoted as the $0^{th}$ level. If the path loss$\leq$x3 dB, it is determined that the level information of PRACH transmission and/or PRACH enhanced transmission is the 0th level of PRACH transmission: if the path loss$>$x4 dB, it is determined that the level information of PRACH transmission and/or PRACH enhanced transmission is the third level of PRACH enhanced transmission: if x3 dB$<$the path loss$\leq$x4 dB, it is first determined that the level information of PRACH transmission and/or PRACH enhanced transmission is the $0^{th}$ level of PRACH transmission (or the first level of PRACH enhanced transmission). If the determining fails, it is determined that the level information of PRACH transmission and/or PRACH enhanced transmission is the first level of a PRACH enhanced transmission attempt (or the second level of PRACH enhanced transmission), and so on. In addition, the first characteristic parameter of PRACH enhanced transmission is determined, where the first characteristic parameter of PRACH enhanced transmission is related to the determined level information of PRACH enhanced transmission, and the first characteristic parameter includes one or more of the transmit power, the preamble format, and the time-frequency resource.

Another manner for determining the level information of PRACH transmission and/or PRACH enhanced transmission is as follows: it is determined that the level information of PRACH enhanced transmission is the first (lowest) level of PRACH enhanced transmission. If the UE obtains main information by receiving an enhanced main information block, and/or obtains system information by receiving an enhanced system information block, the UE performs preamble sending by using the first level of PRACH enhanced transmission. If the UE fails to perform random access by performing preamble sending by using the $n^{th}$ level of PRACH enhanced transmission, the UE performs preamble sending by using the $(n+1)^{th}$ level of PRACH enhanced transmission, where n is a positive integer. The enhanced main information block refers to a main information block that is re-sent in a radio frame for multiple times. The enhanced system information block includes one or more of an enhanced system information block of a system information block type 1, an enhanced system information block of a system information block type k, and an enhanced system information block of a system information block type m, where k and m are positive integers, and in particular, k=2. The enhanced system information block of the system information block type 1 refers to a system information block of the system information block type 1 in a subframe #5 of a radio frame with an even number and/or a system information block that is of the system information block type 1 and that is re-sent in another subframe. The enhanced system information block of the system information block type k refers to a system information block that includes configuration information of PRACH enhanced transmission. At least one type of configuration information in configuration information included in the system information block of the system information block type m is the same as configuration information included in the system information block of the system information block type 1.

Further, PRACH enhanced sending is performed according to the determined first characteristic parameter of PRACH enhanced transmission.

The following describes the present invention in detail by using four embodiments.

Embodiment 1 of the Present Invention

When the first characteristic parameter of PRACH enhanced transmission is the transmit power, determining the first characteristic parameter of PRACH enhanced transmission, where the first characteristic parameter of PRACH enhanced transmission is related to the determined level information of PRACH enhanced transmission includes: determining the transmit power of PRACH enhanced transmission according to at least a second characteristic parameter corresponding to the level information of PRACH enhanced transmission. The second characteristic parameter includes one or more of preamble initial received target power, a quantity of preamble transmission attempt times, a path loss, a path loss threshold, a power ramping step, a power offset value related to the preamble format, and a power offset value related to the level information of PRACH enhanced transmission. Second characteristic parameters corresponding to different level information of PRACH enhanced transmission may be completely identical, or partially identical, or completely different. Specifically, there are the following several implementation manners:

Manner 1:

The second characteristic parameter includes the preamble initial received target power, the quantity of preamble transmission attempt times, the path loss, and the power ramping step. Transmit power PPRACH that is of PRACH enhanced transmission and that is related to the level information of PRACH enhanced transmission that is determined by the UE=min{$P_{CMAX,c}(i)$, PREAMBLE_RECEIVED_TARGET_POWER+$PL_c$}_[dBm], where min{ } indicates an operation for calculating a minimum value, $P_{CMAX,c}(i)$ is a maximum value of transmit power of the UE in a subframe whose number is i, and $PL_c$ is the path loss and is a value estimated by the UE. If the level information of PRACH enhanced transmission that is determined by the UE is level information obtained by increasing level information of PRACH enhanced transmission in a previous preamble sending attempt performed by the UE by one level, or the $0^{th}$ level of PRACH transmission is increased to the first level of PRACH enhanced transmission, and $PL_c$ estimated by the UE in the increased level information of PRACH enhanced transmission is approximately the same as that estimated for the original level information, and therefore the UE can still use $PL_c$ estimated for the original level information. Preamble received target power PREAMBLE_RECEIVED_TARGET_POWER is equal to PREAMBLE_INITIAL_RECEIVED_TARGET_POWER+(PREAMBLE_TRANSMISSION_COUNTER)−1*powerRampingStep, where PREAMBLE_INITIAL_RECEIVED_TARGET_POWER is the preamble initial received target power, and PREAMBLE_TRANSMISSION_COUNTER is the quantity of preamble transmission attempt times. During PRACH enhanced transmission, each preamble sending attempt includes multiple times of resending, and a quantity of included resending times is corresponding to the level information of PRACH enhanced transmission that is determined by the UE. For each level of PRACH enhanced transmission, an initial value of the quantity of preamble transmission attempt times is 1. The initial value is used to perform the first preamble sending attempt by using one level of PRACH enhanced transmission. After each preamble sending attempt is performed, the quantity of preamble transmission attempt times is increased by 1, and powerRampingStep is the power ramping step and may be a value configured by a base station by using an SIB2.

If the level information of PRACH enhanced transmission that is determined by the UE is not the first level of PRACH enhanced transmission, where the first level of PRACH enhanced transmission is lowest level information of PRACH enhanced transmission, the preamble initial received target power PREAMBLE_INITIAL_RECEIVED_TARGET_POWER corresponding to the level information of PRACH enhanced transmission that is determined by the UE is determined according to a third characteristic parameter corresponding to level information that is of PRACH enhanced transmission and that is one level lower than the level information of PRACH enhanced transmission, where the third characteristic parameter includes at least one of preamble initial received target power, a power ramping step, and a fixed power offset value. Specifically, the preamble initial received target power is equal to a sum of the preamble initial received target power and the power ramping step that are corresponding to the level information that is of PRACH enhanced transmission and that is one level lower than the level information of PRACH enhanced transmission, or is equal to a sum of the preamble initial received target power and the power ramping step+a fixed power offset value. The power ramping step is a value of (PREAMBLE_TRANSMISSION_COUNTER−1)*powerRampingStep when the UE performs the last preamble sending attempt before increasing one level of PRACH enhanced transmission.

If the level information of PRACH enhanced transmission that is determined by the UE is the first level of PRACH enhanced transmission, the preamble initial received target power PREAMBLE_INITIAL_RECEIVED_TARGET_POWER corresponding to the level information of PRACH enhanced transmission that is determined by the UE is preambleInitialReceivedTargetPower, where preambleInitialReceivedTargetPower is preamble initial received target power configured by the base station by using the SIB2, or the preamble initial received target power corresponding to the level information of PRACH enhanced transmission that is determined by the UE is a sum of preamble initial received target power and a power ramping step that are corresponding to PRACH transmission, where the power ramping step is a value of (PREAMBLE_TRANSMISSION_COUNTER−1)*powerRampingStep of the preamble sending performed for the last time during PRACH transmission (a preamble is not re-sent) performed before PRACH enhanced transmission, or the preamble initial received target power corresponding to the level information of PRACH enhanced transmission that is determined by the UE is a sum of preamble initial received target power and a power ramping step that are corresponding to PRACH transmission+a fixed power offset value.

Manner 2:

The second characteristic parameter includes the preamble initial received target power, the quantity of preamble transmission attempt times, the path loss, and the power ramping step. Transmit power PPRACH that is of PRACH enhanced transmission and that is related to the level information of PRACH enhanced transmission that is determined by the UE=min$\{P_{CMAX,c}(i)$ PREAMBLE_RECEIVED_TARGET_POWER+$PL_c\}$_[dBm], where min$\{\ \}$ indicates an operation for calculating a minimum value, $P_{CMAX,c}(i)$ is a maximum value of transmit power of the UE in a subframe whose number is i, and $PL_c$ is the path loss and is a value estimated by the UE. If the level information of PRACH enhanced transmission that is determined by the UE is level information obtained by increasing level information of PRACH enhanced transmission in a previous preamble sending attempt performed by the UE by one level, or the $0^{th}$ level of PRACH transmission is increased to the first level of PRACH enhanced transmission, and Plc estimated by the UE in the increased level information of PRACH enhanced transmission is approximately the same as that estimated for the original level information, and therefore the UE can still use $PL_c$ estimated for the original level information. Preamble received target power PREAMBLE_RECEIVED_TARGET_POWER is equal to preambleInitialReceivedTargetPower+(PREAMBLE_TRANSMISSION_COUNTER−1)*powerRampingStep, where preambleInitialReceivedTargetPower is the preamble initial received target power, and different from Manner 1, preambleInitialReceivedTargetPower is a value configured by a base station for the UE by using an SIB2, and for all level information of PRACH enhanced transmission, corresponding initial preamble received target power is preambleInitialReceivedTargetPower. PREAMBLE_TRANSMISSION_COUNTER is the quantity of preamble transmission attempt times, and during PRACH enhanced transmission, each preamble sending attempt includes multiple times of resending, and a quantity of included resending times is corresponding to the level information of PRACH enhanced transmission that is determined by the UE. After each preamble sending attempt is performed, the quantity of preamble transmission attempt times is increased by 1, and powerRampingStep is the power ramping step and may be a value configured by the base station by using the SIB2.

Different from Manner 1, if the level information of PRACH enhanced transmission that is determined by the UE is not the first level of PRACH enhanced transmission, where the first level of PRACH enhanced transmission is lowest level information of PRACH enhanced transmission, an initial value of the quantity of preamble transmission attempt times PREAMBLE_TRANSMISSION_COUNTER corresponding to the level information of PRACH enhanced transmission that is determined by the UE is determined according to a third characteristic parameter corresponding to level information that is of PRACH enhanced transmission and that is one level lower than the level information of PRACH enhanced transmission, where the third characteristic parameter is a maximum quantity of preamble transmission attempt times. The initial value is used to perform the first preamble sending attempt by using one level of PRACH enhanced transmission. Specifically, the initial value of the quantity of preamble transmission attempt times PREAMBLE_TRANSMISSION_COUNTER corresponding to the level information of PRACH enhanced transmission that is determined by the UE is equal to 1 plus the maximum quantity of preamble transmission attempt times corresponding to the level information that is of PRACH enhanced transmission and that is one level lower than the level information of PRACH enhanced transmission. The maximum quantity of preamble transmission attempt times corresponding to the level information that is of PRACH enhanced transmission and that is one level lower than the level information of PRACH enhanced transmission is a value of a quantity of preamble transmission attempt times of the last preamble sending attempt performed before the UE increases one level of PRACH enhanced transmission.

If the level information of PRACH enhanced transmission that is determined by the UE is the first level of PRACH enhanced transmission, an initial value of the quantity of preamble transmission attempt times PREAMBLE_TRANSMISSION_COUNTER corresponding to the level information of PRACH enhanced transmission that is determined by the UE is equal to 1; or an initial value of the quantity of preamble transmission attempt times PREAMBLE_TRANSMISSION_COUNTER corresponding to the level information of PRACH enhanced transmission that is determined by the UE is equal to 1 plus a maximum quantity of preamble transmission attempt times corresponding to PRACH transmission. The maximum quantity of preamble transmission attempt times corresponding to PRACH transmission is a value of a quantity of preamble transmission times of the last preamble sending attempt performed during PRACH transmission (a preamble is not re-sent) performed before PRACH enhanced transmission.

Manner 3:

The second characteristic parameter includes the preamble initial received target power, the quantity of preamble transmission attempt times, the path loss or path loss threshold, and the power ramping step. Transmit power PPRACH that is of PRACH enhanced transmission and that is related to the level information of PRACH enhanced transmission that is determined by the UE=min$\{P_{CMAX,c}(i)$, PREAMBLE_RECEIVED_TARGET_POWER+$PL_c\}$_[dBm], where min$\{\ \}$ indicates an operation for calculating a minimum value, $P_{CMAX,c}(i)$ is a maximum value of transmit power of the UE in a subframe whose number is i, and $PL_c$ is the path loss or path loss threshold. The preamble received target power PREAMBLE_RECEIVED_TARGET_POWER is equal to preambleInitialReceivedTargetPower+(PREAMBLE_TRANSMISSION_COUNTER−1)*powerRampingStep, where preambleInitialReceivedTargetPower is the preamble initial received target power and is a value configured by a base station for the UE by using an SIB2, and for all level information of PRACH enhanced transmission, corresponding preamble initial received target power is preambleInitialReceivedTargetPower. PREAMBLE_TRANSMISSION_COUNTER is the quantity of preamble transmission attempt times, and during PRACH enhanced transmission, each preamble sending attempt includes multiple times of resending, and a quantity of included resending times is corresponding to the level information of PRACH enhanced transmission that is determined by the UE. For each level of PRACH enhanced transmission, an initial value of the quantity of preamble transmission attempt times is 1. The initial value is used to perform the first preamble sending attempt by using one level of PRACH enhanced transmission. After each preamble sending attempt is performed, the quantity of preamble transmission attempt times is increased by 1, and powerRampingStep is the power ramping step and may be a value configured by the base station by using the SIB2.

The path loss or path loss threshold $PL_c$ is different from that in Manner 1 and Manner 2. In Manner 3, the base station or another network device presets a lowest path loss or path loss threshold and a highest path loss or path loss threshold for determining the level information of PRACH enhanced transmission, and a path loss between the network device and the UE is divided into X ranges according to the lowest path loss or path loss threshold and the highest path loss or path loss threshold, and each path loss range is corresponding to one level of PRACH enhanced transmission, so that the level information of PRACH enhanced transmission is determined according to the lowest path loss or path loss threshold and the highest path loss or path loss threshold. For example, a path loss or a path loss threshold is preset to x0, x1, and x2, the path loss between the network device and the UE is divided into three ranges, and the first, the second, and the third level of PRACH enhanced transmission are determined, that is:

the first level of PRACH enhanced transmission: x0 dB<path loss≤x1 dB;
the second level of PRACH enhanced transmission: x1 dB<path loss≤x2 dB; and
the third level of PRACH enhanced transmission: path loss>x2.

For example, for the first level of PRACH enhanced transmission, the lowest path loss or path loss threshold and the highest path loss or path loss threshold for determining the level information of PRACH enhanced transmission are x0 and x1 respectively. The lowest path loss or path loss threshold and the highest path loss or path loss threshold and/or a value of X may be predefined or signaled by the network device to the UE.

If the level information of PRACH enhanced transmission that is determined by the UE is level information obtained by increasing level information of PRACH enhanced transmission in a previous preamble sending attempt performed by the UE by one level, or the level information of PRACH enhanced transmission that is determined by the UE is the first level of PRACH enhanced transmission, and the UE performs PRACH transmission in the previous preamble sending attempt without preamble repetition, in this case, the path loss $PL_c$ corresponding to the level information of PRACH enhanced transmission that is determined by the UE is the lowest path loss for determining the level information of PRACH enhanced transmission, or the path loss threshold $PL_c$ corresponding to the level information of PRACH enhanced transmission that is determined by the UE is the lowest path loss threshold for determining the level information of PRACH enhanced transmission. For example, if the level information of PRACH enhanced transmission that is determined by the UE is the first level of PRACH enhanced transmission, $PL_c$ is equal to x0.

If the level information of PRACH enhanced transmission that is determined by the UE is not the first level of PRACH enhanced transmission, the path loss or path loss threshold $PL_c$ corresponding to the level information of PRACH enhanced transmission that is determined by the UE is a path loss estimated by the UE.

Alternatively, for each level of PRACH enhanced transmission, the path loss $PL_c$ corresponding to the level information of PRACH enhanced transmission that is determined by the UE is the lowest path loss for determining the level information of PRACH enhanced transmission, or the path loss threshold $PL_c$ corresponding to the level information of PRACH enhanced transmission that is determined by the UE is the lowest path loss threshold for determining the level information of PRACH enhanced transmission.

Manner 4:

In Manner 4, the second characteristic parameter may further include at least one of the power offset value related to the preamble format, the power offset value related to the level information of PRACH enhanced transmission, and a power offset value of PRACH enhanced transmission.

Accordingly, the preamble received target power PREAMBLE_RECEIVED_TARGET_POWER is equal to preambleInitialReceivedTargetPower+[DELTA_PREAMBLE]−[DELTA_LEVEL]−[DELTA_CI]+(PREAMBLE_TRANSMISSION_COUNTER−1)*powerRampingStep.

Preamble transmit power PPRACH=min{$P_{CMAX,c}$(i)−[DELTA_LEVEL]−[DELTA_CI], PREAMBLE_RECEIVED_TARGET_POWER+$PL_c$}_[dBm], where [ ] indicates that a parameter in the square brackets is optional.

DELTA_PREAMBLE is the power offset value related to the preamble format and is a fixed value, and a value of DELTA_PREAMBLE may be the same as that in the background. DELTA_CI is the power offset value of PRACH enhanced transmission and is a fixed value, and a value of DELTA_CI may be specified in a protocol, or may be configured by a network device for the UE. For all level information of PRACH enhanced transmission, the value is the same. DELTA_LEVEL is the power offset value related to the level information of PRACH enhanced transmission. Values of other parameters may be the same as those in the background, or may be determined in any one of Manner 1 to Manner 3, which is not limited in this manner.

In Manner 4, if a base station or another network device presets a lowest path loss or path loss threshold and a highest path loss or path loss threshold for determining the level information of PRACH enhanced transmission, the level information of PRACH enhanced transmission is determined according to the lowest path loss or path loss threshold and the highest path loss or path loss threshold, a specific method of the determining is the same as the description in Manner 3, and details are not described herein again. A method for determining the power offset value DELTA_LEVEL related to the level information of PRACH enhanced transmission includes:

setting the power offset value related to the level information of PRACH enhanced transmission to a difference between the highest path loss or path loss threshold for determining the level information of PRACH enhanced transmission and a path loss estimated by a terminal UE. For example, if the level information of PRACH enhanced transmission that is determined by the UE is the first level of PRACH enhanced transmission, DELTA_LEVEL=x1−$PL_c$, where $PL_c$ is the path loss estimated by the UE.

Alternatively, the power offset value related to the level information of PRACH enhanced transmission is equal to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE. In the foregoing calculation manner, the level information of PRACH enhanced transmission is a number for indicating level information of PRACH enhanced transmission, and if the level information of PRACH enhanced transmission is the $n^{th}$ level of PRACH enhanced transmission, the number of the level information of PRACH enhanced transmission is equal to n. In this embodiment, the path loss step for determining the level information of PRACH enhanced transmission is equal to a difference between the highest path loss (path loss threshold) for determining the level information of PRACH enhanced transmission and the lowest path loss (path loss threshold) for determining the level information of PRACH enhanced transmission, and for all the level information of PRACH enhanced transmission, path loss steps for determining the level information of PRACH enhanced transmission are the same. For example, if the level information of PRACH enhanced transmission that is determined by the UE is the second level of PRACH enhanced transmission, DELTA_LEVEL=x0+2*(x1−x0)−$PL_c$, where $PL_c$ is the path loss estimated by the UE, and x1−x0=x2−x1.

In this embodiment, impact of a near-far effect can be avoided, and power consumption of the UE can be reduced.

The method in Embodiment 1 further includes a method used by the UE to increase the level information of PRACH enhanced transmission by one level and perform a preamble resending attempt by using increased level information of PRACH enhanced transmission.

Specifically, if the level information of PRACH enhanced transmission is not highest level information of PRACH enhanced transmission, when the quantity of preamble transmission attempt times corresponding to the level information of PRACH enhanced transmission is equal to an initial value of the quantity of preamble transmission attempt times corresponding to the level information of PRACH enhanced transmission−1+a quantity of preamble transmission available attempt times corresponding to the level information of PRACH enhanced transmission, the level information of PRACH enhanced transmission is increased by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, the level information of PRACH enhanced transmission is increased by one level; or if the level information of PRACH enhanced transmission is highest level information of PRACH enhanced transmission, when the quantity of preamble transmission attempt times corresponding to the level information of PRACH enhanced transmission is equal to an initial value of the quantity of preamble transmission attempt times corresponding to the level information of PRACH enhanced transmission−1+a quantity of preamble transmission available attempt times corresponding to the level information of PRACH enhanced transmission;

(1) A backoff operation is executed and a preamble resending attempt is performed starting from lowest level information of PRACH enhanced transmission, which includes selecting a random backoff time based on a backoff parameter of the UE, where a value of the backoff time complies with a uniform distribution between 0 and a value of the backoff parameter. The UE delays the backoff time, performs the preamble resending attempt starting from the lowest level information of PRACH enhanced transmission, and recalculates an initial value of the preamble sending attempt. The UE may also include a step of adjusting the backoff parameter.

(2) Alternatively, a backoff operation is executed and a preamble resending attempt is performed by keeping the level information of PRACH enhanced transmission as highest level information of PRACH enhanced transmission, which includes selecting a random backoff time based on a backoff parameter of the UE, where a value of the backoff time complies with a uniform distribution between 0) and a value of the backoff parameter. The UE delays the backoff time, performs the preamble resending attempt by keeping the level information of PRACH enhanced transmission as the highest level information of PRACH enhanced transmission, and recalculates an initial value of the preamble sending attempt. The UE may also include a step of adjusting the backoff parameter.

(3) Alternatively, a backoff parameter is adjusted, that is, the UE adjusts a backoff parameter stored by the UE, where the adjustment may be increasing or decreasing the backoff parameter by the UE.

(4) Alternatively, the UE notifies a higher layer that enhanced random access fails.

Alternatively, if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, a backoff operation is executed and a preamble resending attempt is performed starting from lowest level information of PRACH enhanced transmission, or a backoff operation is executed, and a preamble resending attempt is performed by keeping the level information of PRACH enhanced transmission as highest level information of PRACH enhanced transmission, or a backoff parameter is adjusted, or the UE notifies a higher layer that enhanced random access fails.

The quantity of preamble transmission available attempt times corresponding to the level information of PRACH enhanced transmission refers to a quantity of times of preamble transmission attempts that can be performed by using one level of PRACH enhanced transmission, that is, a maximum quantity of preamble transmission available attempt times by using one level of PRACH enhanced transmission. For different level information of PRACH enhanced transmission, quantities of preamble transmission available attempt times are the same, or quantities that are of preamble transmission available attempt times and that are corresponding to at least two levels of PRACH enhanced transmission are different.

The quantity of preamble transmission available attempt times corresponding to the level information of PRACH enhanced transmission may be configured by the base station for the UE by using the SIB2, where a same quantity of preamble transmission available attempt times may be configured for all the level information of PRACH enhanced transmission, or different quantities of preamble transmission available attempt times may be configured for different level information of PRACH enhanced transmission. Alternatively, the quantity of preamble transmission available attempt times corresponding to the level information of PRACH enhanced transmission is predefined. For example, the quantity of preamble transmission available attempt times is specified in a protocol. Alternatively, the quantity of preamble transmission available attempt times corresponding to the level information of PRACH enhanced transmission is determined according to a predefined rule. For example, a quantity of preamble transmission available attempt times corresponding to each level of PRACH enhanced transmission is equal to [preambleTransMax/3] or [preambleTransMax/4] where preambleTransMax is a maximum quantity of preamble transmission times configured by the base station, and [ ] is a round-up operation.

The method in Embodiment 1 further includes a method used by the UE to change PRACH transmission (the $0^{th}$ level) into PRACH enhanced transmission and perform a preamble resending attempt by using the first level of PRACH enhanced transmission.

Specifically, if the quantity of preamble transmission attempt times of PRACH transmission performed by the UE is equal to an initial value of the quantity of preamble transmission attempt times of PRACH transmission−1+the quantity of preamble transmission available attempt times of PRACH transmission, PRACH transmission is changed to PRACH enhanced transmission, and the preamble resending attempt is performed by using the first level of PRACH enhanced transmission; or if the quantity of preamble transmission attempt times of PRACH transmission performed by the UE is equal to the quantity of preamble transmission available attempt times of PRACH transmission, PRACH transmission is changed to PRACH enhanced transmission, and the preamble resending attempt is performed by using the first level of PRACH enhanced transmission.

The quantity of preamble transmission available attempt times of PRACH transmission refers to a quantity of times of preamble transmission attempts that can be performed during PRACH transmission. The quantity of preamble transmission available attempt times of PRACH transmission may be different from an existing preambleTransMax. The quantity of preamble transmission available attempt times of PRACH transmission may be configured by the base station for the UE by using the SIB2, or specified in a protocol. Optionally, the quantity of preamble transmission available attempt times of PRACH transmission is obtained by calculating according to the existing preambleTransMax. For example, the quantity of preamble transmission available attempt times of PRACH transmission is equal to [preambleTransMax/4].

In this embodiment, when UE resends a preamble according to a quantity of repetition times for increased level information of PRACH enhanced transmission, the UE ensures continuity of preamble transmit power of original level information of PRACH enhanced transmission, and therefore a probability that power of the first several preamble sending attempts of the UE cannot meet a requirement for successfully completing a random access process is greatly reduced, which avoids a power waste of the UE. In addition, in Manner 2 of this embodiment, an error caused when the transmit power is calculated according to a path loss estimated by the UE can also be avoided.

Embodiment 2 of the Present Invention

When the first characteristic parameter of PRACH enhanced transmission is the transmit power, determining the first characteristic parameter of PRACH enhanced transmission, where the first characteristic parameter of PRACH enhanced transmission is related to the determined level information of PRACH enhanced transmission includes: if the level information of PRACH enhanced transmission that is determined by the UE is the $n^{th}$ level of PRACH enhanced transmission, determining that the transmit power of PRACH enhanced transmission is a maximum value of transmit power of the UE, where n is an integer greater than 0. For example, a value of n may be one or more of 1, 2, and 3, and for example, n is 2 and 3.

In this embodiment, after the UE determines that the level information of PRACH enhanced transmission is the $n^{th}$ level of PRACH enhanced transmission, the UE directly performs a preamble sending attempt according to the maximum value of the transmit power, which avoids an error caused when the transmit power is calculated according to a path loss estimated by the UE.

Considering that on a same time resource and a same frequency resource, the UE sends preambles of different level information of PRACH enhanced transmission, and if the preambles of the different level information of PRACH enhanced transmission are sent according to the maximum value of the transmit power of the UE, there is a problem of a near-far effect. The method in this embodiment further includes: if the level information of PRACH enhanced transmission that is determined by the UE is the $n^{th}$ level of PRACH enhanced transmission, determining that the transmit power of PRACH enhanced transmission is a dedicated power value of the level information of PRACH enhanced transmission.

The dedicated power value of the level information of PRACH enhanced transmission may be predefined, for example, the dedicated power value is specified in a protocol; or the dedicated power value of the level information of PRACH enhanced transmission is configured by a base station, for example, the base station configures the dedicated power value for the UE by using an SIB2. Dedicated power values of at least two levels of PRACH enhanced transmission are different. For example, for the at least two levels of PRACH enhanced transmission, a preamble is sent by using a same time-frequency resource, the dedicated power values of the at least two levels of PRACH enhanced transmission are different.

In this embodiment, after the UE determines that level information of PRACH enhanced transmission is the $n^{th}$ level of PRACH enhanced transmission, the UE directly performs a preamble sending attempt according to a dedicated power value of the level information of PRACH enhanced transmission, which avoids an error caused when the transmit power is calculated according to a path loss estimated by the UE. Further, on a same time-frequency resource, the UE sends preambles of different level information of PRACH enhanced transmission, and if dedicated power values used by the preambles of the different level information of PRACH enhanced transmission are different, power values of the preambles that are of the different level information of PRACH enhanced transmission and that arrive at a base station are approximately the same, which avoids impact of a near-far effect.

Embodiment 3 of the Present Invention

For different preamble formats, sequence duration may be different, and for one level of PRACH enhanced transmission, a quantity of repetition times for resending a preamble is related to a preamble format. Therefore, the preamble format is determined for the level information of PRACH enhanced transmission in this embodiment.

When the first characteristic parameter of PRACH enhanced transmission is the preamble format, determining the first characteristic parameter of PRACH enhanced transmission, where the first characteristic parameter of PRACH enhanced transmission is related to the determined level information of PRACH enhanced transmission includes: determining that preamble formats related to all level information of PRACH enhanced transmission are the same, or preamble formats related to at least two levels of PRACH enhanced transmission are different.

Within a cell, all the level information of PRACH enhanced transmission uses a same preamble format. For example, a preamble format 3 is used for PRACH enhanced transmission. A method for determining the used preamble format is not limited in this embodiment of the present invention, and reference may be made to a mature determining solution: that is, the SIB2 sent by the base station includes a physical random access channel configuration index prach-ConfigurationIndex, and the UE determines, by using the physical random access channel configuration index prach-ConfigurationIndex, the preamble format used for random access.

Alternatively, within a cell, the preamble formats related to the at least two levels of PRACH enhanced transmission are different. Preambles that are re-sent according to the at least two levels of PRACH enhanced transmission use different preamble formats.

In this embodiment, that preamble formats related to at least two levels of PRACH enhanced transmission are different includes: if there are N levels of PRACH enhanced transmission, the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different. The first preamble format and the second preamble format may have same CP duration and different sequence duration. For example, the first preamble format and the second preamble format are preamble formats in preamble formats 1 and 3. For example, if there are three levels of PRACH enhanced transmission, the first level of PRACH enhanced transmission is related to the preamble format 1, and the second level of PRACH enhanced transmission and the third level of PRACH enhanced transmission are related to the preamble format 3.

In this embodiment, the first N1 levels of PRACH enhanced transmission in the N levels of PRACH enhanced transmission are adjacent levels, that is, the first level of PRACH enhanced transmission is successively increased by one level, and increasing is performed for N1-1 times in total to obtain N1 levels of PRACH enhanced transmission: the subsequent N-N1 levels of PRACH enhanced transmission are adjacent levels, that is, the $(N1+1)^{th}$ level of PRACH enhanced transmission is successively increased by one level, and increasing is performed for N-N1-1 times to obtain N-N1 levels of PRACH enhanced transmission.

The method in this embodiment further includes: a preamble format 4 cannot be used for PRACH enhanced transmission. For example, in a TDD system with coverage enhancement, the preamble format that is configured by the base station by using the physical random access channel configuration index prach-ConfigurationIndex in the sent SIB2 is not the preamble format 4.

In this embodiment, the preamble format related to the determined level information of PRACH enhanced transmission may be predefined, for example, the preamble format is determined in a protocol; or the preamble format related to the determined level information of PRACH enhanced transmission is configured by the base station for the UE by using the SIB2. The base station may directly include, in the SIB2, an information element (IE) or a field for configuring the preamble format, and configure a same preamble format or different preamble formats for the level information of PRACH enhanced transmission. Alternatively, the base station includes the random access channel configuration index prach-ConfigurationIndex in the SIB2, and configures a same preamble format or different preamble formats for the level information of PRACH enhanced transmission by using the index.

According to the method in this embodiment, a preamble format related to level information of PRACH enhanced transmission is determined. If preamble formats related to all level information of PRACH enhanced transmission are the same, there is a relatively simple random access implementation manner. If preamble formats related to at least two levels of PRACH enhanced transmission are different, one or more levels of PRACH enhanced transmission may use a preamble format with relatively long sequence duration, which reduces a CP overhead of a preamble.

Embodiment 4 of the Present Invention

When the first characteristic parameter of PRACH enhanced transmission is the time-frequency resource, determining the first characteristic parameter of PRACH enhanced transmission, where the first characteristic parameter of PRACH enhanced transmission is related to the determined level information of PRACH enhanced transmission includes: determining that time-frequency resources related to the first M1 levels of PRACH enhanced transmission in M adjacent levels of PRACH enhanced transmission include a first time-frequency resource; and determining that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M. For example, there are three adjacent levels of PRACH enhanced transmission, a time-frequency resource related to the first level of PRACH enhanced transmission includes a current time-frequency resource used for PRACH transmission, and time-frequency resources related to the second level of PRACH enhanced transmission and the third level of PRACH enhanced transmission include the second time-frequency resource, where the second time-frequency resource and the current time-frequency resource used for PRACH transmission are different. It should be noted that in this embodiment, that time-frequency resources related to multiple levels of PRACH enhanced transmission include the first or second time-frequency resource means that transmission of random access preambles by using the multiple levels of PRACH enhanced transmission shares the same first or second time-frequency resource, and whether a time-frequency resource different from the shared time-frequency resource may be used for preamble transmission performed by using one level of PRACH enhanced transmission in the multiple levels of PRACH enhanced transmission is not limited in this embodiment.

In this embodiment, the first M1 levels of PRACH enhanced transmission in the M levels of PRACH enhanced transmission are adjacent levels, that is, the first level of PRACH enhanced transmission is successively increased by one level, and increasing is performed for M1-1 times in total to obtain M1 levels of PRACH enhanced transmission: the subsequent M-M1 levels of PRACH enhanced transmission are adjacent levels, that is, the $(M1+1)^{th}$ level of PRACH enhanced transmission is successively increased by one level, and increasing is performed for M-M1-1 times to obtain M-M1 levels of PRACH enhanced transmission.

According to the method in this embodiment, because level information that is of PRACH enhanced transmission and that is of a preamble transmitted on a same time-frequency resource is an adjacent level, on the same time-frequency resource, a difference between path losses of preambles that are of different level information of PRACH enhanced transmission and that are sent by UE is limited, and a difference between power attenuation values when the preambles arrive at a base station is limited, and therefore impact of a near-far effect is reduced. In addition, on the same time-frequency resource, if the preambles of the different level information of PRACH enhanced transmission use a CDM resource multiplexing manner, a same preamble format needs to be used, where a first time-frequency resource and a second time-frequency resource are different time-frequency resources: in this case, subsequent M-M1 levels of PRACH enhanced transmission may use a preamble format different from that used by the first M1 levels of PRACH enhanced transmission, and therefore a preamble format with relatively long sequence duration may be used, which reduces a CP overhead of a preamble.

Figure 7:
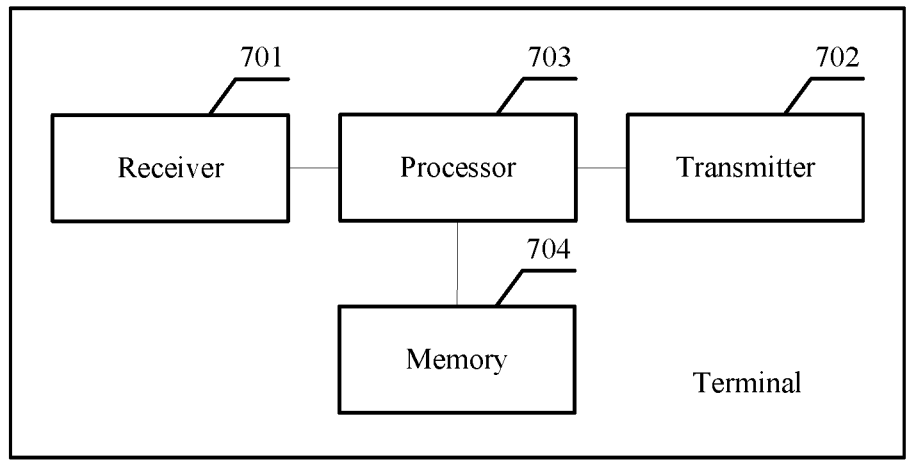
FIG. 7 is a schematic structural diagram of a terminal according to an embodiment of the present invention.

An embodiment of the present invention further provides another terminal, as shown in FIG. 7, including: a receiver 701, a transmitter 702, a processor 703, and a memory 704.

The processor 703 is configured to: determine level information of physical random access channel PRACH enhanced transmission, where in this embodiment of the present invention, the level information may be any one of a level, a level index, an enhancement level, an enhancement level index, a repetition level, a repetition level index, a resource level, a resource level index, a resource set level, a resource set level index, a resource set index, and a resource index; and determine a first characteristic parameter that is of PRACH enhanced transmission and that is related to the level information of PRACH enhanced transmission, where in this embodiment of the present invention, the first characteristic parameter may be at least one of transmit power, a preamble format, and a time-frequency resource. The transmitter 702 is configured to perform PRACH enhanced sending according to the first characteristic parameter.

This embodiment of the present invention is applied to an LTE or LTE-A system with coverage enhancement, and there are multiple repetition levels of PRACH enhanced transmission, for example, repetition levels 1, 2, and 3 of PRACH enhanced transmission. Index numbering may be performed on the multiple repetition levels, that is, repetition level indexes. In another manner, there are multiple levels or multiple enhancement levels of PRACH enhanced transmission, and index numbering is performed on the multiple levels, that is, level indexes, or index numbering is performed on the multiple enhancement levels, that is, enhancement level indexes. The level information of PRACH enhanced transmission is any one of the level, the level index, the enhancement level, the enhancement level index, the repetition level, and the repetition level index.

For each level of PRACH enhanced transmission, a quantity of repetition times for sending a preamble by UE and a resource set of PRACH enhanced transmission that are corresponding to each level of PRACH enhanced transmission are specified in advance by the system or signaled. The resource set of PRACH enhanced transmission includes one or more resources of PRACH enhanced transmission. The resources of PRACH enhanced transmission include a code resource (a preamble), a time resource, and a frequency resource that are used to send the preamble. The time resource and the frequency resource may be collectively referred to as a time-frequency resource. If the UE determines the level information of PRACH enhanced transmission, the UE resends, according to a quantity of repetition times corresponding to the determined level information of PRACH enhanced transmission, a preamble on a resource that is of PRACH enhanced transmission and that is included in the resource set of PRACH enhanced transmission. For different level information of PRACH enhanced transmission, quantities of repetition times for sending a preamble by the UE are different. When a required system coverage enhancement value is larger, a path loss between the UE and a network device is also larger, level information that is of PRACH enhanced transmission and that is required to be used by the UE to successfully complete a random access process is also higher, and the quantity of repetition times for sending the preamble is larger. Because there are multiple levels of PRACH enhanced transmission, there are also multiple resource sets of PRACH enhanced transmission, and the multiple resource sets are used by the UE to send the preamble according to different quantities of repetition times. A PRACH resource set may be referred to as a resource set level of PRACH enhanced transmission, and one or more resources that are of PRACH enhanced transmission and that are included in one resource set of PRACH enhanced transmission may be referred to as one resource level of PRACH enhanced transmission, and index numbering is separately performed on the resource set, the resource set level, the resource, and the resource level that are of PRACH enhanced transmission, that is, a resource set index, a resource set level index, a resource index, and a resource level index that are of PRACH enhanced transmission. The level information of PRACH enhanced transmission may also be any one of the resource level, the resource level index, the resource set level, the resource set level index, the resource set index, and the resource index. Index numbering is performed on the quantity of repetition times for sending the preamble by the UE, that is, an index of the quantity of repetition times. The level information of PRACH enhanced transmission may also be one of the quantity of repetition times and the index of the quantity of repetition times.

Optionally, the level information of PRACH enhanced transmission is determined according to the path loss between the network device and the UE. A base station or another network device presets a lowest path loss or path loss threshold and a highest path loss or path loss threshold for determining the level information of PRACH enhanced transmission, and the path loss between the network device and the UE is divided into X ranges according to the lowest path loss or path loss threshold and the highest path loss or path loss threshold, and each path loss range is corresponding to one level of PRACH enhanced transmission, so that the level information of PRACH enhanced transmission is determined according to the lowest path loss or path loss threshold and the highest path loss or path loss threshold. For example, a path loss or a path loss threshold is preset to x0, x1, and x2, the path loss between the network device and the UE is divided into three ranges, and the first, the second, and the third level of PRACH enhanced transmission are determined, that is:
  the first level of PRACH enhanced transmission: x0 dB<path loss≤x1 dB;
  the second level of PRACH enhanced transmission: x1 dB<path loss≤x2 dB; and
  the third level of PRACH enhanced transmission: path loss>x2.

For example, for the first level of PRACH enhanced transmission, the lowest path loss or path loss threshold and the highest path loss or path loss threshold for determining the level information of PRACH enhanced transmission are x0 and x1 respectively. The lowest path loss or path loss threshold and the highest path loss or path loss threshold and/or a value of X may be predefined or signaled by the network device to the UE. Index numbering is performed on the path loss range, that is, a path loss range index. The path loss may also be one of a required coverage enhancement value, reference signal received power, reference signal received quality, and channel quality information, and index numbering is performed on the coverage enhancement value, the reference signal received power, the reference signal received quality, and a channel quality information range, that is, a coverage enhancement range index, a reference signal received power range index, a reference signal received quality range index, and a channel quality information range index. The level information of PRACH enhanced transmission may also be one of the coverage enhancement value, the coverage enhancement range index, the path loss, the path loss range index, the reference signal received power, the reference signal received power range index, the reference signal received quality, the reference signal received quality range index, the channel quality information, and the channel quality information range index.

In this embodiment of the present invention, the first characteristic parameter is related to the level information, and a characteristic parameter used for PRACH enhanced sending can be rapidly and accurately determined, which reduces power of a terminal.

Based on the three specific optional parameters included in the first characteristic parameter, this embodiment of the present invention proposes the following four solutions, which are specifically as follows:

1. Optionally, the first characteristic parameter includes the transmit power; and the processor 703 is configured to determine the transmit power of PRACH enhanced transmission according to a second characteristic parameter corresponding to the level information of PRACH enhanced transmission, where the second characteristic parameter is at least one of preamble initial received target power, a quantity of preamble transmission attempt times, a path loss, a path loss threshold, a power ramping step, a power offset value related to the preamble format, and a power offset value related to the level information of PRACH enhanced transmission.

Optionally, the processor 703 is configured to determine the transmit power of PRACH enhanced transmission according to the second characteristic parameter corresponding to the level information of PRACH enhanced transmission, where second characteristic parameters corresponding to different level information of PRACH enhanced transmission are completely identical, or partially identical, or completely different.

Optionally, the processor 703 is configured to determine, according to a third characteristic parameter corresponding to level information that is of PRACH enhanced transmission and that is one level lower than the level information of PRACH enhanced transmission, the at least one parameter included in the second characteristic parameter corresponding to the level information of PRACH enhanced transmission, where the third characteristic parameter is at least one of preamble initial received target power, a power ramping step, a fixed power offset value, and a maximum quantity of preamble transmission attempt times.

Optionally, the second characteristic parameter includes the preamble initial received target power; and
  the processor 703 is configured to: if the level information of PRACH enhanced transmission is not the first level of PRACH enhanced transmission, determine that: the preamble initial received target power corresponding to the level information of PRACH enhanced transmission is a sum of the preamble initial received target power and the power ramping step that are corresponding to the level information that is of PRACH enhanced transmission and that is one level lower than the level information of PRACH enhanced transmission, or the preamble initial received target power corresponding to the level information of PRACH enhanced transmission is a fixed power offset value plus a sum of the preamble initial received target power and the power ramping step that are corresponding to the level information that is of PRACH enhanced transmission and that is one level lower than the level information of PRACH enhanced transmission; or
  if the level information of PRACH enhanced transmission is the first level of PRACH enhanced transmission, determine that: the preamble initial received target power corresponding to the level information of PRACH enhanced transmission is preamble initial received target power configured by a network device, or the preamble initial received target power corresponding to the level information of PRACH enhanced transmission is a sum of preamble initial received target power and a power ramping step that are corresponding to PRACH transmission, or the preamble initial received target power corresponding to the level information of PRACH enhanced transmission is a fixed power offset value plus a sum of preamble initial received target power and a power ramping step that are corresponding to PRACH transmission.

Optionally, the second characteristic parameter includes the quantity of preamble transmission attempt times; and
  the processor 703 is configured to: set an initial value of the quantity of preamble transmission attempt times corresponding to the level information of PRACH enhanced transmission to 1 plus the maximum quantity of preamble transmission attempt times corresponding to the level information that is of PRACH enhanced transmission and that is one level lower than the level information of PRACH enhanced transmission; or set an initial value of the quantity of preamble transmission attempt times corresponding to the level information of PRACH enhanced transmission to 1; or set an initial value of the quantity of preamble transmission attempt times corresponding to the level information of PRACH enhanced transmission to 1 plus a maximum quantity of preamble transmission attempt times corresponding to PRACH transmission.

Optionally, the second characteristic parameter includes the path loss or the path loss threshold; and the processor 703 is configured to: set the path loss corresponding to the level information of PRACH enhanced transmission to a lowest path loss for determining the level information of PRACH enhanced transmission; or set the path loss threshold corresponding to the level information of PRACH enhanced transmission to a lowest path loss threshold for determining the level information of PRACH enhanced transmission.

Optionally, the second characteristic parameter includes the power offset value related to the level information of PRACH enhanced transmission; and the processor 703 is configured to: set the power offset value related to the level information of PRACH enhanced transmission to a difference between a highest path loss or path loss threshold for determining the level information of PRACH enhanced transmission and a path loss estimated by a terminal UE; or set the power offset value related to the level information of PRACH enhanced transmission to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE.

Optionally, the processor 703 is further configured to: if the level information of PRACH enhanced transmission is not highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, increase the level information of PRACH enhanced transmission by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, increase the level information of PRACH enhanced transmission by one level; or if the level information of PRACH enhanced transmission is highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails; or if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

Further, the processor 703 is further configured to determine that: quantities that are of preamble transmission available attempt times and that are corresponding to all level information of PRACH enhanced transmission are the same, or quantities that are of preamble transmission available attempt times and that are corresponding to at least two levels of PRACH enhanced transmission are different.

Optionally, the processor 703 is configured to determine that: the quantity of preamble transmission available attempt times corresponding to the level information of PRACH enhanced transmission is configured by the network device, or the quantity of preamble transmission available attempt times corresponding to the level information of PRACH enhanced transmission is predefined, or the quantity of preamble transmission available attempt times corresponding to the level information of PRACH enhanced transmission is determined according to a predefined rule.

2. Optionally, if the first characteristic parameter includes the transmit power, the processor 703 is configured to: if the level information of PRACH enhanced transmission is the $n^{th}$ level of PRACH enhanced transmission, determine that: the transmit power of PRACH enhanced transmission is a maximum value of transmit power of a terminal UE, or the transmit power of PRACH enhanced transmission is a dedicated power value of the level information of PRACH enhanced transmission, where n is a positive integer.

Optionally, the processor 703 is configured to: determine the dedicated power value of the level information of PRACH enhanced transmission according to a predefined value; or determine the dedicated power value of the level information of PRACH enhanced transmission according to configuration performed by a network device.

Optionally, the processor 703 is configured to determine that dedicated power values of at least two levels of PRACH enhanced transmission in dedicated power values of the level information of PRACH enhanced transmission are different.

3. Optionally, if the first characteristic parameter includes the preamble format, the processor 703 is configured to determine that: preamble formats related to all level information of PRACH enhanced transmission are the same, or preamble formats related to at least two levels of PRACH enhanced transmission are different.

Optionally, the processor 703 is configured to: in a process of determining that preamble formats related to at least two levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the processor 703 is configured to determine that the first preamble format and the second preamble format are preamble formats in a preamble format 1 and a preamble format 3.

Optionally, the processor 703 is configured to determine that a preamble format 4 is not used for PRACH enhanced transmission.

Optionally, the processor 703 is configured to determine that: the used preamble format related to the determined level information of PRACH enhanced transmission is predefined, or the preamble format related to the determined level information of PRACH enhanced transmission is configured by a network device.

4. Optionally, the first characteristic parameter includes the time-frequency resource; and the processor 703 is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

Figure 8:
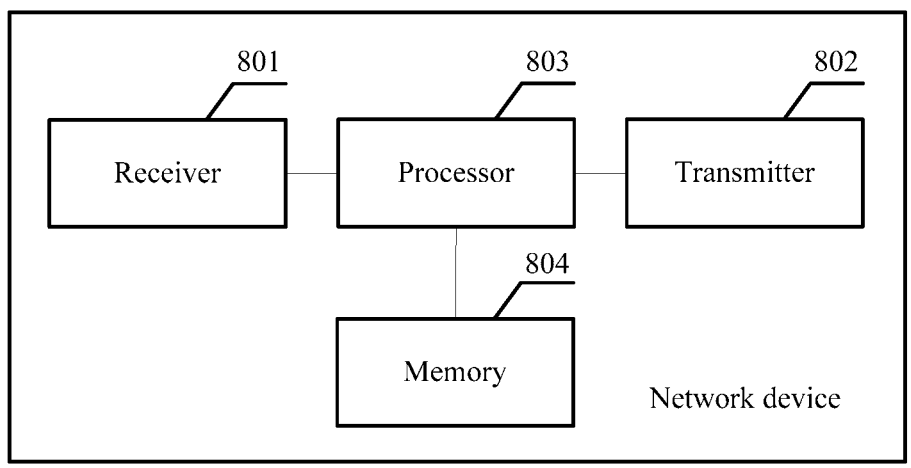
FIG. 8 is a schematic structural diagram of a network device according to an embodiment of the present invention.

An embodiment of the present invention further provides a network device, as shown in FIG. 8, including: a receiver 801, a transmitter 802, a processor 803, and a memory 804.

The processor 803 is configured to determine a first characteristic parameter that is of PRACH enhanced transmission and that is related to level information of physical random access channel PRACH enhanced transmission.

In this embodiment of the present invention, the first characteristic parameter may be at least one of a preamble format and a time-frequency resource.

The receiver 801 is configured to perform PRACH enhanced receiving according to the first characteristic parameter that is related to all level information of PRACH enhanced transmission and that is determined by the processor 803.

Optionally, as shown in FIG. 8, the network device further includes:

the transmitter 802, configured to: before the receiver 801 performs PRACH enhanced receiving according to the first characteristic parameter related to all the level information of PRACH enhanced transmission, send, to UE, at least one of the following configuration information: preamble initial received target power, a quantity of preamble transmission available attempt times corresponding to the level information of PRACH enhanced transmission, and a dedicated power value of the level information of PRACH enhanced transmission, so that the UE determines, according to the configuration information, transmit power that is of PRACH enhanced transmission and that is related to the level information of PRACH enhanced transmission, or increase the level information of PRACH enhanced transmission by one level, or execute a back-off operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

Optionally, the processor 803 is further configured to determine that: quantities that are of preamble transmission available attempt times and that are corresponding to all the level information of PRACH enhanced transmission are the same, or quantities that are of preamble transmission available attempt times and that are corresponding to at least two levels of PRACH enhanced transmission are different.

Optionally, the processor 803 is further configured to determine that dedicated power values of at least two levels of PRACH enhanced transmission in all the level information of PRACH enhanced transmission are different.

Based on different optional parameters of the first characteristic parameter, there may be different solutions to determining the first characteristic parameter that is of PRACH enhanced transmission and that is related to the level information of PRACH enhanced transmission, and this embodiment of the present invention provides a solution, which is specifically as follows:

Optionally, if the first characteristic parameter includes the preamble format, the processor 803 is configured to determine that: preamble formats related to all the level information of PRACH enhanced transmission are the same, or preamble formats related to at least two levels of PRACH enhanced transmission are different.

Optionally, the processor 803 is configured to: in a process of determining that preamble formats related to at least two levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the processor 803 is configured to determine that the first preamble format and the second preamble format are preamble formats in a preamble format 1 and a preamble format 3.

Optionally, the processor 803 is configured to determine that a preamble format 4 is not used for PRACH enhanced transmission.

Optionally, the processor 803 is configured to determine that the preamble format related to the determined level information of PRACH enhanced transmission is predefined; or the transmitter 802 included in the network device is configured to send, to UE, configuration information of the preamble format related to the determined level information of PRACH enhanced transmission.

Optionally, if the first characteristic parameter includes the time-frequency resource, the processor 803 is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

Figure 9:
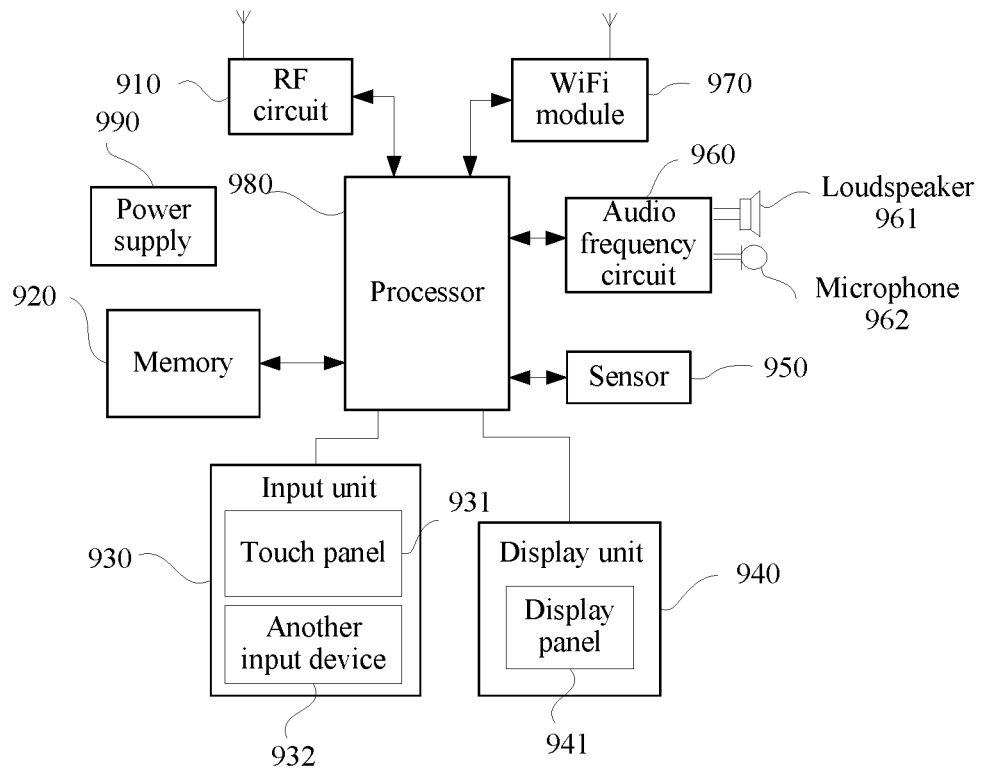
FIG. 9 is a schematic structural diagram of a terminal according to an embodiment of the present invention.

An embodiment of the present invention further provides another terminal. As shown in FIG. 9, for ease of description, only parts related to this embodiment of the present invention are illustrated. For specific technical details that are not disclosed, refer to the method part of the embodiments of the present invention. The terminal may be any terminal device such as a mobile phone, a tablet computer, a PDA (personal digital assistant), a POS (point of sales), or a vehicle-mounted computer, for example, the terminal is a mobile phone.

FIG. 9 shows a block diagram of a partial structure of a mobile phone related to the terminal provided in this embodiment of the present invention. Referring to FIG. 9, the mobile phone includes parts such as a radio frequency (RF) circuit 910, a memory 920, an input unit 930, a display unit 940, a sensor 950, an audio frequency circuit 960, a wireless fidelity (WiFi) module 970, a processor 980, and a power supply 990. A person skilled in the art may understand that the mobile phone structure shown in FIG. 9 does not constitute any limitation to the mobile phone and may include more or less parts than those shown in the figure, or a combination of some parts, or parts disposed differently.

The following describes each constituent part of the mobile phone in detail with reference to FIG. 9:

The RF circuit 910 may be configured to receive and send a signal in an information receiving or sending process or a call process, and in particular, after receiving downlink information of a base station, send the downlink information to the processor 980 to perform processing; and in addition, send designed uplink data to the base station. Generally, the RF circuit 910 includes but is not limited to an antenna, at least one amplifier, a transceiver, a coupler, a low noise amplifier (LNA), and a duplexer. In addition, the RF circuit 910 may further communicate with a network and another device by means of radio communication. Any communications standard or protocol may be used for the foregoing radio communication, including but not limited to a Global System for Mobile Communications (GSM), a general packet radio service (GPRS), Code Division Multiple Access (CDMA), Wideband Code Division Multiple Access (WCDMA), Long Term Evolution (LTE), an email, and a short message service (SMS).

The memory 920 may be configured to store a software program and a module, and the processor 980 runs the software program and the module that are stored in the memory 920, so as to execute various functions and applications of the mobile phone and perform data processing. The memory 920 may mainly include a program storage area and a data storage area, where the program storage area may store an operating system, an application program required by at least one function (such as a voice play function or an image play function), and the like, and the data storage area may store data (such as audio data and a phone book) created according to use of the mobile phone, and the like. In addition, the memory 920 may include a high-speed random access memory, and may further include a non-volatile memory, for example, at least one magnetic disk storage device, a flash memory device, or another volatile solid-state storage device.

The input unit 930 may be configured to receive input digital or character information, and generate key signal input related to user setting and function control of the mobile phone. Specifically, the input unit 930 may include a touch panel 931 and another input device 932. The touch panel 931 is also referred to as a touchscreen and may collect a touch operation (such as an operation performed by a user on the touch panel 931 or near the touch panel 931 by using any proper object or accessory, such as a finger or a stylus) on or near the touch panel 931, and drive a corresponding connection apparatus according to a preset program. Optionally, the touch panel 931 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information into contact coordinates, and sends the contact coordinates to the processor 980, and can receive and execute a command sent by the processor 980. In addition, the touch panel 931 may be implemented by using multiple types, such as a resistive type, a capacitive type, an infrared type, and a surface acoustic wave type. In addition to the touch panel 931, the input unit 930 may include the another input device 932. Specifically, the another input device 932 may include but is not limited to one or more of a physical keyboard, a function key (such as a volume control key or a switch key), a trackball, a mouse, and a joystick.

The display unit 940 may be configured to display information input by the user or information provided for the user, and various menus of the mobile phone. The display unit 940 may include a display panel 941. Optionally, the display panel 941 may be configured in a form such as a liquid crystal display LCD) or an organic light-emitting diode (OLED). Further, the touch panel 931 may cover the display panel 941. When detecting a touch operation on or near the touch panel 931, the touch panel 931 transfers the touch operation to the processor 980 to determine a type of a touch event, and then the processor 980 provides corresponding visual output on the display panel 941 according to the type of the touch event. In FIG. 9, the touch panel 931 and the display panel 941 are configured as two independent parts to implement input and output functions of the mobile phone. However, in some embodiments, the touch panel 931 and the display panel 941 may be integrated to implement the input and output functions of the mobile phone.

The mobile phone may further include at least one sensor 950, such as a light sensor, a motion sensor, or another sensor. Specifically, the light sensor may include an ambient light sensor and a proximity sensor, where the ambient light sensor may adjust luminance of the display panel 941 according to brightness of ambient light, and the proximity sensor may turn off the display panel 941 and/or backlight when the mobile phone moves to an ear. As a type of motion sensor, an accelerometer sensor may detect values of acceleration in various directions (generally, three axes): detect, in a still state, a value and a direction of gravity; and be applied to an application that recognizes a mobile phone posture (such as screen switching between landscape orientation and vertical orientation, a related game, and magnetometer posture calibration), a function related to vibration recognition (such as a pedometer and knocking), and the like. Other sensors such as a gyroscope, a barometer, a hygrometer, a thermometer, and an infrared sensor that may also be configured in the mobile phone are not described herein again.

The audio frequency circuit 960, a loudspeaker 961, and a microphone 962 may provide an audio interface between the user and the mobile phone. The audio frequency circuit 960 may transmit, to the loudspeaker 961, an electrical signal that is obtained after conversion of received audio data, and the loudspeaker 961 converts the electrical signal into a sound signal and outputs the sound signal: in another aspect, the microphone 962 converts a collected sound signal into an electrical signal, the audio frequency circuit 960 receives and converts the electrical signal into audio data and outputs the audio data to the processor 980 to perform processing, and then the audio data is sent to, for example, another mobile phone, by using the RF circuit 910, or the audio data is output to the memory 920 to perform further processing.

WiFi belongs to a short-distance wireless transmission technology. The mobile phone may help, by using the WiFi module 970, the user send and receive an email, browse a web page, access streaming media, and the like. The WiFi module 970 provides wireless broadband Internet access for the user. Although FIG. 9 shows the WiFi module 970, it may be understood that the WiFi module 970 is not a mandatory part of the mobile phone, and may completely be omitted as required without changing a scope of the essence of the present invention.

The processor 980 is a control center of the mobile phone and is connected to each part of the entire mobile phone by using various interfaces and lines, and performs, by running or executing the software program and/or module that is stored in the memory 920 and invoking data stored in the memory 920, various functions of the mobile phone and data processing, so as to perform overall monitoring on the mobile phone. Optionally, the processor 980 may include one or more processing units. Preferably, an application processor and a modem processor may be integrated into the processor 980, where the application processor mainly processes an operating system, a user interface, an application program, and the like; and the modem processor mainly processes radio communication. It may be understood that the foregoing modem processor may also not be integrated into the processor 980.

The mobile phone further includes the power supply 990 (such as a battery) that supplies power to each part. Preferably, the power supply may be logically connected to the processor 980 by using a power management system, so that functions such as management of charging, discharging, and power consumption are implemented by using the power supply management system.

Though not shown, the mobile phone may further include a camera, a Bluetooth module, and the like, which are not described herein again.

In this embodiment of the present invention, the processor 980 included in the terminal further has the following functions:

The processor 980 is configured to: determine level information of physical random access channel PRACH enhanced transmission, where in this embodiment of the present invention, the level information may be any one of a level, a level index, an enhancement level, an enhancement level index, a repetition level, a repetition level index, a resource level, a resource level index, a resource set level, a resource set level index, a resource set index, and a resource index; and determine a first characteristic parameter that is of PRACH enhanced transmission and that is related to the level information of PRACH enhanced transmission, where in this embodiment of the present invention, the first characteristic parameter may be at least one of transmit power, a preamble format, and a time-frequency resource. The RF circuit 910 or the WIFI module 970 is configured to perform PRACH enhanced sending according to the first characteristic parameter.

This embodiment of the present invention is applied to an LTE or LTE-A system with coverage enhancement, and there are multiple repetition levels of PRACH enhanced transmission, for example, repetition levels 1, 2, and 3 of PRACH enhanced transmission. Index numbering may be performed on the multiple repetition levels, that is, repetition level indexes. In another manner, there are multiple levels or multiple enhancement levels of PRACH enhanced transmission, and index numbering is performed on the multiple levels, that is, level indexes, or index numbering is performed on the multiple enhancement levels, that is, enhancement level indexes. The level information of PRACH enhanced transmission is any one of the level, the level index, the enhancement level, the enhancement level index, the repetition level, and the repetition level index.

For each level of PRACH enhanced transmission, a quantity of repetition times for sending a preamble by UE and a resource set of PRACH enhanced transmission that are corresponding to each level of PRACH enhanced transmission are specified in advance by the system or signaled. The resource set of PRACH enhanced transmission includes one or more resources of PRACH enhanced transmission. The resources of PRACH enhanced transmission include a code resource (a preamble), a time resource, and a frequency resource that are used to send the preamble. The time resource and the frequency resource may be collectively referred to as a time-frequency resource. If the UE determines the level information of PRACH enhanced transmission, the UE resends, according to a quantity of repetition times corresponding to the determined level information of PRACH enhanced transmission, a preamble on a resource that is of PRACH enhanced transmission and that is included in the resource set of PRACH enhanced transmission. For different level information of PRACH enhanced transmission, quantities of repetition times for sending a preamble by the UE are different. When a required system coverage enhancement value is larger, a path loss between the UE and a base station is also larger, level information that is of PRACH enhanced transmission and that is required to be used by the UE to successfully complete a random access process is also higher, and the quantity of repetition times for sending the preamble is larger. Because there are multiple levels of PRACH enhanced transmission, there are also multiple resource sets of PRACH enhanced transmission, and the multiple resource sets are used by the UE to send the preamble according to different quantities of repetition times. A PRACH resource set may be referred to as a resource set level of PRACH enhanced transmission, and one or more resources that are of PRACH enhanced transmission and that are included in one resource set of PRACH enhanced transmission may be collectively referred to as one resource level of PRACH enhanced transmission, and index numbering is separately performed on the resource set, the resource set level, the resource, and the resource level that are of PRACH enhanced transmission, that is, a resource set index, a resource set level index, a resource index, and a resource level index that are of PRACH enhanced transmission. The level information of PRACH enhanced transmission may also be any one of the resource level, the resource level index, the resource set level, the resource set level index, the resource set index, and the resource index. Index numbering is performed on the quantity of repetition times for sending the preamble by the UE, that is, an index of the quantity of repetition times. The level information of PRACH enhanced transmission may also be one of the quantity of repetition times and the index of the quantity of repetition times.

In this embodiment of the present invention, the first characteristic parameter is related to the level information, and a characteristic parameter used for PRACH enhanced sending can be rapidly and accurately determined, which reduces power of a terminal.

Based on the three specific optional parameters included in the first characteristic parameter, this embodiment of the present invention proposes the following four solutions, which are specifically as follows:

1. Optionally, the first characteristic parameter includes the transmit power; and the processor 980 is configured to determine the transmit power of PRACH enhanced transmission according to a second characteristic parameter corresponding to the level information of PRACH enhanced transmission, where the second characteristic parameter is at least one of preamble initial received target power, a quantity of preamble transmission attempt times, a path loss, a path loss threshold, a power ramping step, a power offset value related to the preamble format, and a power offset value related to the level information of PRACH enhanced transmission.

Optionally, the processor 980 is configured to determine the transmit power of PRACH enhanced transmission according to the second characteristic parameter corresponding to the level information of PRACH enhanced transmission, where second characteristic parameters corresponding to different level information of PRACH enhanced transmission are completely identical, or partially identical, or completely different.

Optionally, the processor 980 is configured to determine, according to a third characteristic parameter corresponding to level information that is of PRACH enhanced transmission and that is one level lower than the level information of PRACH enhanced transmission, the at least one parameter included in the second characteristic parameter corresponding to the level information of PRACH enhanced transmission, where the third characteristic parameter is at least one of preamble initial received target power, a power ramping step, a fixed power offset value, and a maximum quantity of preamble transmission attempt times.

Optionally, the second characteristic parameter includes the preamble initial received target power; and the processor 980 is configured to: if the level information of PRACH enhanced transmission is not the first level of PRACH enhanced transmission, determine that: the preamble initial received target power corresponding to the level information of PRACH enhanced transmission is a sum of the preamble initial received target power and the power ramping step that are corresponding to the level information that is of PRACH enhanced transmission and that is one level lower than the level information of PRACH enhanced transmission, or the preamble initial received target power corresponding to the level information of PRACH enhanced transmission is a fixed power offset value plus a sum of the preamble initial received target power and the power ramping step that are corresponding to the level information that is of PRACH enhanced transmission and that is one level lower than the level information of PRACH enhanced transmission; or if the level information of PRACH enhanced transmission is the first level of PRACH enhanced transmission, determine that: the preamble initial received target power corresponding to the level information of PRACH enhanced transmission is preamble initial received target power configured by a network device, or the preamble initial received target power corresponding to the level information of PRACH enhanced transmission is a sum of preamble initial received target power and a power ramping step that are corresponding to PRACH transmission, or the preamble initial received target power corresponding to the level information of PRACH enhanced transmission is a fixed power offset value plus a sum of preamble initial received target power and a power ramping step that are corresponding to PRACH transmission.

Optionally, the second characteristic parameter includes the quantity of preamble transmission attempt times; and the processor 980 is configured to: set an initial value of the quantity of preamble transmission attempt times corresponding to the level information of PRACH enhanced transmission to 1 plus the maximum quantity of preamble transmission attempt times corresponding to the level information that is of PRACH enhanced transmission and that is one level lower than the level information of PRACH enhanced transmission; or set an initial value of the quantity of preamble transmission attempt times corresponding to the level information of PRACH enhanced transmission to 1; or set an initial value of the quantity of preamble transmission attempt times corresponding to the level information of PRACH enhanced transmission to 1 plus a maximum quantity of preamble transmission attempt times corresponding to PRACH transmission.

Optionally, the second characteristic parameter includes the path loss or the path loss threshold; and the processor 980 is configured to: set the path loss corresponding to the level information of PRACH enhanced transmission to a lowest path loss for determining the level information of PRACH enhanced transmission; or set the path loss threshold corresponding to the level information of PRACH enhanced transmission to a lowest path loss threshold for determining the level information of PRACH enhanced transmission.

Optionally, the second characteristic parameter includes the power offset value related to the level information of PRACH enhanced transmission; and the processor 980 is configured to: set the power offset value related to the level information of PRACH enhanced transmission to a difference between a highest path loss or path loss threshold for determining the level information of PRACH enhanced transmission and a path loss estimated by a terminal UE; or set the power offset value related to the level information of PRACH enhanced transmission to a difference between a sum of a lowest path loss or path loss threshold for determining the first level of PRACH enhanced transmission and a product that is obtained by multiplying the level information of PRACH enhanced transmission by a path loss step for determining the level information of PRACH enhanced transmission and a path loss estimated by a terminal UE.

Optionally, the processor 980 is further configured to: if the level information of PRACH enhanced transmission is not highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, increase the level information of PRACH enhanced transmission by one level; or if the level information of PRACH enhanced transmission is not highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, increase the level information of PRACH enhanced transmission by one level; or if the level information of PRACH enhanced transmission is highest level information of PRACH enhanced transmission, when the quantity of preamble transmission attempt times corresponding to the level information of PRACH enhanced transmission is equal to a sum of a difference between an initial value of the quantity of preamble transmission attempt times corresponding to the level information of PRACH enhanced transmission and 1 and a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails; or if the level information of PRACH enhanced transmission is highest level information of PRACH enhanced transmission, when the quantity of preamble transmission attempt times corresponding to the level information of PRACH enhanced transmission is equal to a quantity of preamble transmission available attempt times corresponding to the level information of PRACH enhanced transmission, execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

Further, the processor 980 is further configured to determine that: quantities that are of preamble transmission available attempt times and that are corresponding to all level information of PRACH enhanced transmission are the same, or quantities that are of preamble transmission available attempt times and that are corresponding to at least two levels of PRACH enhanced transmission are different.

Optionally, the processor 980 is configured to determine that: the quantity of preamble transmission available attempt times corresponding to the level information of PRACH enhanced transmission is configured by the network device, or the quantity of preamble transmission available attempt times corresponding to the level information of PRACH enhanced transmission is predefined, or the quantity of preamble transmission available attempt times corresponding to the level information of PRACH enhanced transmission is determined according to a predefined rule.

2. Optionally, if the first characteristic parameter includes the transmit power,
   the processor 980 is configured to: if the level information of PRACH enhanced transmission is the $n^{th}$ level of PRACH enhanced transmission, determine that: the transmit power of PRACH enhanced transmission is a maximum value of transmit power of a terminal UE, or the transmit power of PRACH enhanced transmission is a dedicated power value of the level information of PRACH enhanced transmission, where n is a positive integer.

Optionally, the processor 980 is configured to: determine the dedicated power value of the level information of PRACH enhanced transmission according to a predefined value; or determine the dedicated power value of the level information of PRACH enhanced transmission according to configuration performed by a network device.

Optionally, the processor 980 is configured to determine that dedicated power values of at least two levels of PRACH enhanced transmission in dedicated power values of the level information of PRACH enhanced transmission are different.

3. Optionally, if the first characteristic parameter includes the preamble format,
   the processor 980 is configured to determine that: preamble formats related to all level information of PRACH enhanced transmission are the same, or preamble formats related to at least two levels of PRACH enhanced transmission are different.

Optionally, the processor 980 is configured to: in a process of determining that preamble formats related to at least two levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the processor 980 is configured to determine that the first preamble format and the second preamble format are preamble formats in a preamble format 1 and a preamble format 3.

Optionally, the processor 980 is configured to determine that a preamble format 4 is not used for PRACH enhanced transmission.

Optionally, the processor 980 is configured to determine that: the used preamble format related to the determined level information of PRACH enhanced transmission is predefined, or the preamble format related to the determined level information of PRACH enhanced transmission is configured by a network device.

4. Optionally, the first characteristic parameter includes the time-frequency resource; and
   the processor 980 is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

Figure 10:
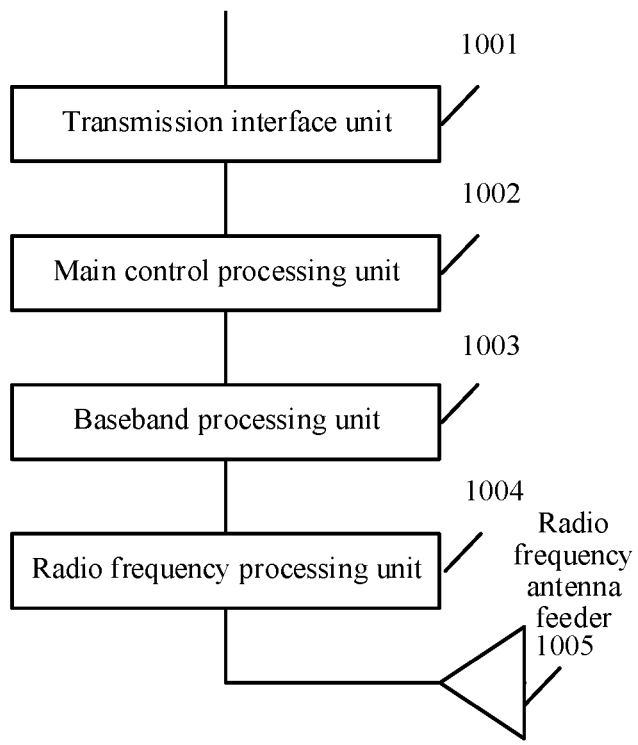
FIG. 10 is a schematic structural diagram of a network device according to an embodiment of the present invention.

An embodiment of the present invention further provides another network device, and the network device may be a base station. As shown in FIG. 10, the network device includes: a transmission interface unit 1001, a main control processing unit 1002, a baseband processing unit 1003, a radio frequency processing unit 1004, and a radio frequency antenna feeder 1005.

The baseband processing unit 1003 is configured to determine a first characteristic parameter that is of PRACH enhanced transmission and that is related to level information of physical random access channel PRACH enhanced transmission.

In this embodiment of the present invention, the first characteristic parameter may be at least one of a preamble format and a time-frequency resource.

The radio frequency antenna feeder 1005 is configured to perform PRACH enhanced receiving according to the first characteristic parameter that is related to all level information of PRACH enhanced transmission and that is determined by the baseband processing unit 1003.

Optionally, as shown in FIG. 10, the network device further includes:

the radio frequency antenna feeder 1005, configured to: before the radio frequency antenna feeder 1005 performs PRACH enhanced receiving according to the first characteristic parameter related to all the level information of PRACH enhanced transmission, send, to UE, at least one of the following configuration information: preamble initial received target power, a quantity of preamble transmission available attempt times corresponding to the level information of PRACH enhanced transmission, and a dedicated power value of the level information of PRACH enhanced transmission, so that the UE determines, according to the configuration information, transmit power that is of PRACH enhanced transmission and that is related to the level information of PRACH enhanced transmission, or increase the level information of PRACH enhanced transmission by one level, or execute a backoff operation and perform a preamble resending attempt starting from lowest level information of PRACH enhanced transmission, or execute a backoff operation and perform a preamble resending attempt by keeping the level information of PRACH enhanced transmission as highest level information of PRACH enhanced transmission, or adjust a backoff parameter, or notify a higher layer that enhanced random access fails.

Optionally, the baseband processing unit 1003 is configured to determine that: quantities that are of preamble transmission available attempt times and that are corresponding to all the level information of PRACH enhanced transmission are the same, or quantities that are of preamble transmission available attempt times and that are corresponding to at least two levels of PRACH enhanced transmission are different.

Optionally, the baseband processing unit 1003 is configured to determine that dedicated power values of at least two levels of PRACH enhanced transmission in all the level information of PRACH enhanced transmission are different.

Based on different optional parameters of the first characteristic parameter, there may be different solutions to determining the first characteristic parameter that is of PRACH enhanced transmission and that is related to the level information of PRACH enhanced transmission, and this embodiment of the present invention provides a solution, which is specifically as follows:

Optionally, if the first characteristic parameter includes the preamble format, the baseband processing unit 1003 is configured to determine that: preamble formats related to all the level information of PRACH enhanced transmission are the same, or preamble formats related to at least two levels of PRACH enhanced transmission are different.

Optionally, the baseband processing unit 1003 is configured to: in a process of determining that preamble formats related to at least two levels of PRACH enhanced transmission are different, if there are N levels of PRACH enhanced transmission, determine that: the first N1 levels of PRACH enhanced transmission in the N levels of PRACH enhanced transmission are related to a first preamble format, and subsequent N-N1 levels of PRACH enhanced transmission in the N levels of PRACH enhanced transmission are related to a second preamble format, where both N and N1 are positive integers, N1 is less than N, and the first preamble format and the second preamble format are different.

Optionally, the baseband processing unit 1003 is configured to determine that the first preamble format and the second preamble format are preamble formats in a preamble format 1 and a preamble format 3.

Optionally, the baseband processing unit 1003 is configured to determine that a preamble format 4 is not used for PRACH enhanced transmission.

Optionally, the baseband processing unit 1003 is configured to determine that the preamble format related to the determined level information of PRACH enhanced transmission is predefined; or the radio frequency antenna feeder 1005 included in the network device is configured to send, to UE, configuration information of the preamble format related to the determined level information of PRACH enhanced transmission.

Optionally, if the first characteristic parameter includes the time-frequency resource, the baseband processing unit 1003 is configured to: determine that time-frequency resources related to the first M1 levels of PRACH enhanced transmission in M adjacent levels of PRACH enhanced transmission include a first time-frequency resource; and determine that time-frequency resources related to subsequent M-M1 levels of PRACH enhanced transmission in the M adjacent levels of PRACH enhanced transmission include a second time-frequency resource, where the first time-frequency resource and the second time-frequency resource are different time-frequency resources, M and M1 are positive integers, and M1 is less than or equal to M.

An embodiment of the present invention further provides a solution in which a half-duplex frequency division duplex (HD-FDD) receiving device performs frame data transmission, which is specifically as follows:

For the half-duplex frequency division duplex (HD-FDD) receiving device, when the receiving device switches from a downlink subframe to an uplink subframe or switches from an uplink subframe to a downlink subframe, because of problems such as off/on switching of a frequency oscillator, a power ramp-up of the oscillator, and a propagation delay between a network device and the receiving device, a phenomenon that sending in an uplink subframe overlaps with receiving in a downlink subframe adjacent to the uplink subframe occurs, and therefore a receiver cannot receive data that is in an entire downlink subframe or cannot send data that is in an entire uplink subframe within an overlapping time. In this embodiment, behaviors/a behavior of the receiving device and/or the network device are/is specified to resolve data receiving and sending when sending in the uplink subframe overlaps with receiving in the downlink subframe.

Figure 11:
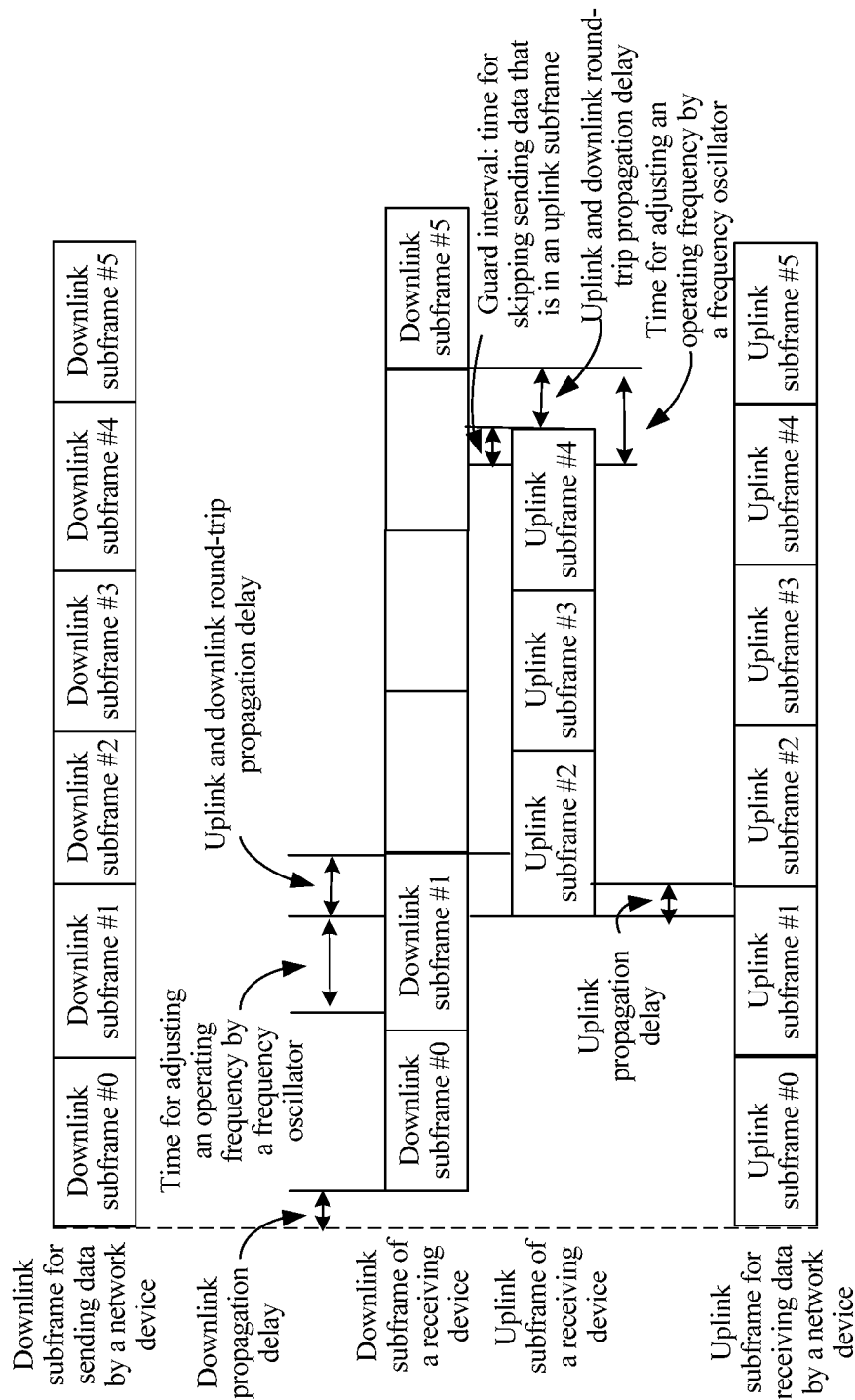
FIG. 11 is a schematic structural diagram of a frame according to an embodiment of the present invention.

As shown in FIG. 11, four rows of subframes from the top to the bottom are respectively: a downlink subframe for sending data by the network device, a downlink subframe of the receiving device, an uplink subframe of the receiving device, and an uplink subframe for receiving data by the network device.

Figure 12:
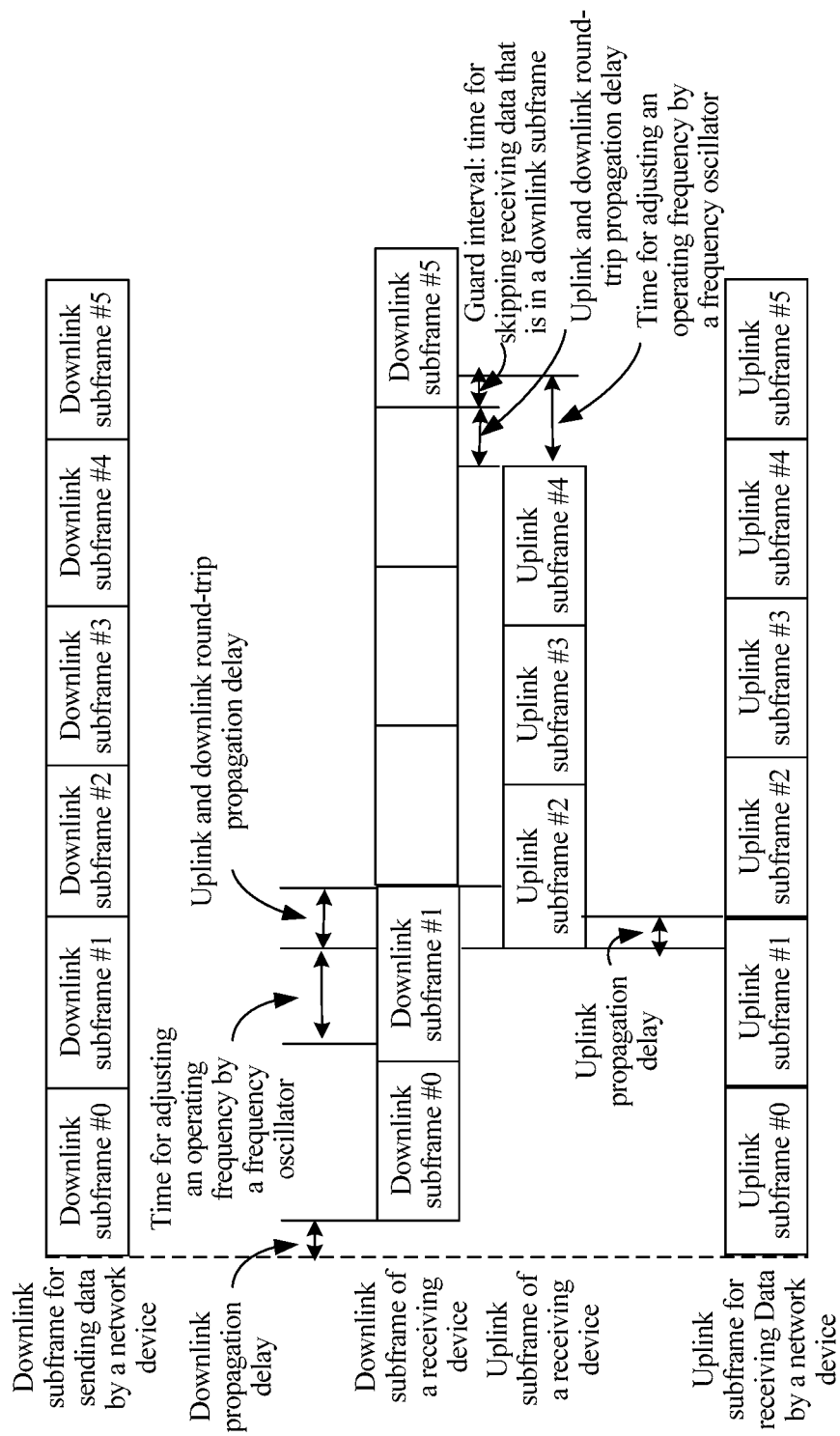
FIG. 12 is a schematic structural diagram of a frame according to an embodiment of the present invention.

As shown in FIG. 12, four rows of subframes from the top to the bottom are respectively: a downlink subframe for sending data by the network device, a downlink subframe of the receiving device, an uplink subframe of the receiving device, and an uplink subframe for receiving data by the network device.

FIG. 11 and FIG. 12 show a time for skipping sending data that is in an uplink subframe, a downlink propagation delay, and an uplink propagation delay: another parameter is described in detail in a subsequent embodiment.

For the half-duplex frequency division duplex (HD-FDD) receiving device, when the receiving device switches from a downlink subframe (for example, a downlink subframe #1 of the receiving device in FIG. 11) to an adjacent uplink subframe (for example, an uplink subframe #2 of the receiving device in FIG. 11), because of factors such as off/on adjustment of an operating frequency performed by the frequency oscillator, and a propagation delay between the network device and the receiving device, the receiving device needs to stop receiving data in a later part of the downlink subframe (for example, the downlink subframe #1 of the receiving device in FIG. 11), and prepare to send data of the uplink subframe (for example, the uplink subframe #2 of the receiving device in FIG. 11). The later part that is of the downlink subframe (for example, the downlink subframe #1 of the receiving device in FIG. 11) and in which no receiving operation is performed is referred to as a guard interval. The guard interval is determined by factors such as a time for adjusting an operating frequency by the frequency oscillator and the propagation delay between the network device and the receiving device. For example, in FIG. 11, the guard interval of the switching from the downlink subframe #1 of the receiving device to the uplink subframe #2 of the receiving device is a sum of the time for adjusting the operating frequency by the frequency oscillator and an uplink and downlink round-trip propagation delay.

The time for adjusting the operating frequency by the frequency oscillator includes an off/on switching time of the frequency oscillator and a power ramp-up time of the frequency oscillator. In an FDD system, receiving a signal and sending a signal are performed by using two different frequency bands. When a half-duplex FDD receiver does not have a frequency duplexer and has only a frequency oscillator, in a process in which the receiver switches from receiving a signal to sending a signal or switches from sending a signal to receiving a signal, the frequency oscillator needs to adjust an operating frequency of the frequency oscillator to complete switching of receiving/sending or sending/receiving a signal. To adjust the operating frequency of the frequency oscillator, the frequency oscillator generally needs to first turn off the running frequency oscillator, and then restart the frequency oscillator to adjust the frequency oscillator to a required frequency. After the frequency oscillator is restarted, a power ramp-up time is further required. As an example of a power ramp-up of the frequency oscillator, the power ramp-up time of the frequency oscillator may be a transient period, that is, it takes a time of 20 us in total for the frequency oscillator to reach a required threshold after startup.

The propagation delay between the network device and the receiving device refers to a time used to propagate downlink data over a path from the network device to the receiving device and/or a time used to propagate uplink data over a path from the receiving device to the network device. For example, the uplink and downlink round-trip propagation delay in FIG. 11 and FIG. 12 refers to a sum of a time of propagation over the path from the network device to the receiving device and a time of propagation over the path from the receiving device to the network device.

Similarly, when the receiving device switches from an uplink subframe (for example, an uplink subframe #4 of the receiving device in FIG. 11) to an adjacent downlink subframe (for example, a downlink subframe #5 of the receiving device in FIG. 11), the receiving device skips sending data within a guard interval in a later part of the uplink subframe (for example, the uplink subframe #4 of the receiving device in FIG. 11), and prepares to receive data of the downlink subframe (for example, the downlink subframe #5 of the receiving device in FIG. 11). Alternatively, the receiving device completes sending data of the uplink subframe (for example, an uplink subframe #4 of the receiving device in FIG. 12), but skips receiving downlink data within a guard interval in a former part of the downlink subframe (for example, a downlink subframe #5 of the receiving device in FIG. 12). The guard interval is determined by factors such as a time for adjusting an operating frequency by the frequency oscillator and a propagation delay between the network device and the receiving device. For example, in FIG. 11 and FIG. 12, the guard interval of the receiving device that switches from the uplink subframe #4 to the downlink subframe #5 is a difference between the time for adjusting the operating frequency by the frequency oscillator and an uplink and downlink round-trip propagation delay.

Optionally, the network device skips sending downlink data to the receiving device in the first downlink subframe (for example, a downlink subframe 1 of the receiving device in FIG. 11) preceding an uplink subframe (for example, an uplink subframe 2 of the receiving device in FIG. 11), and/or the network device skips sending downlink data to the receiving device in the first downlink subframe (for example, a downlink subframe 5 of the receiving device in FIG. 12) following an uplink subframe (for example, an uplink subframe 4 of the receiving device in FIG. 12).

In conclusion, an embodiment of the present invention provides a frame data transmission solution, including:

when a half-duplex frequency division duplex (HD-FDD) receiving device switches from an uplink subframe to a downlink subframe, skipping receiving, by the receiving device, data within a guard interval in a former part of the downlink subframe, or skipping sending data within a guard interval in a later part of the uplink subframe, where the guard interval is determined by factors/a factor such as a time for adjusting an operating frequency by a frequency oscillator and/or an uplink and downlink round-trip propagation delay. Optionally, corresponding to a half-duplex frequency division duplex (HD-FDD) receiving device, a network device skips sending downlink data to the receiving device in the first subframe preceding an uplink subframe, and/or the network device skips sending downlink data to the receiving device in the first downlink subframe following the uplink subframe.

Figure 13:
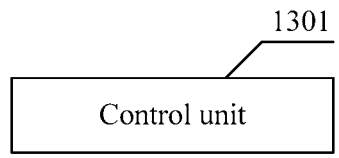
FIG. 13 is a schematic structural diagram of a device according to an embodiment of the present invention.

An embodiment of the present invention provides a device, configured as a half-duplex frequency division duplex receiving device, as shown in FIG. 13, including:

a control unit 1301, configured to: when the receiving device switches from an uplink subframe to a downlink subframe, control the receiving device to skip receiving data within a guard interval in a former part of the downlink subframe, or to skip sending data within a guard interval in a later part of the uplink subframe.

In the foregoing solution, when switching from the uplink subframe to the downlink subframe, the receiving device skips receiving the data within the guard interval in the former part of the downlink subframe, or skips sending the data within the guard interval in the later part of the uplink subframe.

Figure 14:
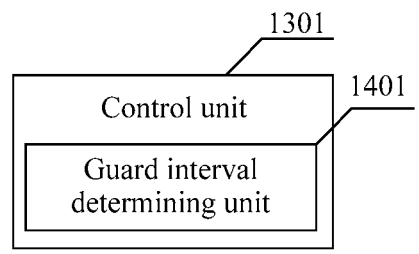
FIG. 14 is a schematic structural diagram of a device according to an embodiment of the present invention.

Optionally, as shown in FIG. 14, the control unit 1301 includes:

a guard interval determining unit 1401, configured to determine the guard interval according to a time for adjusting an operating frequency by a frequency oscillator and/or an uplink and downlink round-trip propagation delay.

Figure 15:
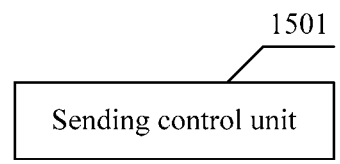
FIG. 15 is a schematic structural diagram of a network device according to an embodiment of the present invention.

An embodiment of the present invention provides a network device, as shown in FIG. 15, including:

a sending control unit 1501, configured to: control the network device to skip sending downlink data to a half-duplex frequency division duplex receiving device in the first subframe preceding an uplink subframe, and/or control the network device to skip sending downlink data to the half-duplex frequency division duplex receiving device in the first downlink subframe following the uplink subframe.

In the foregoing solution, the network device skips sending the downlink data to the half-duplex frequency division duplex receiving device in the first subframe preceding the uplink subframe, and/or skips sending the downlink data to the half-duplex frequency division duplex receiving device in the first downlink subframe following the uplink subframe, which can avoid overlap between sending in the uplink subframe and receiving in the downlink subframe.

Figure 16:
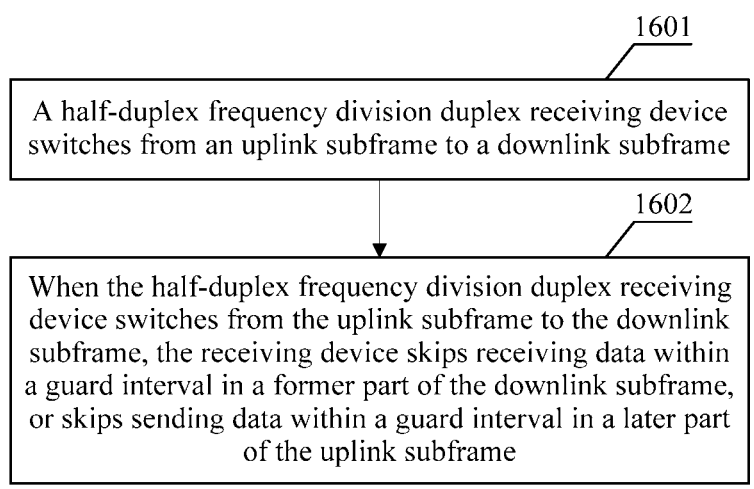
FIG. 16 is a schematic flowchart of a method according to an embodiment of the present invention.

An embodiment of the present invention provides a frame data transmission method, as shown in FIG. 16, including the following steps:

1601. A half-duplex frequency division duplex receiving device switches from an uplink subframe to a downlink subframe.

1602. When the half-duplex frequency division duplex receiving device switches from the uplink subframe to the downlink subframe, the receiving device skips receiving data within a guard interval in a former part of the downlink subframe, or skips sending data within a guard interval in a later part of the uplink subframe.

In the foregoing solution, when switching from the uplink subframe to the downlink subframe, the receiving device skips receiving the data within the guard interval in the former part of the downlink subframe, or skips sending the data within the guard interval in the later part of the uplink subframe, which can avoid overlap between sending in the uplink subframe and receiving in the downlink subframe.

Figure 17:
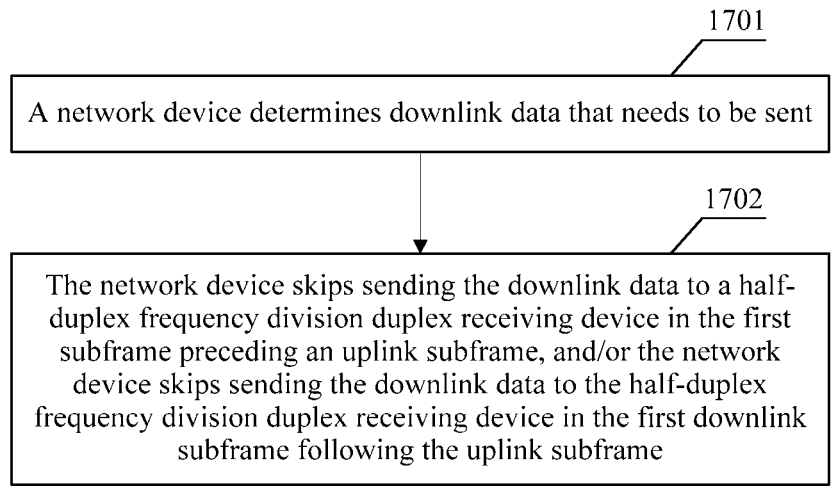
FIG. 17 is a schematic flowchart of a method according to an embodiment of the present invention.

Optionally, the guard interval is determined by using a time for adjusting an operating frequency by a frequency oscillator and/or an uplink and downlink round-trip propagation delay:

An embodiment of the present invention further provides another frame data transmission method, as shown in FIG. 17, including the following steps:

1701. A network device determines downlink data that needs to be sent.

1702. The network device skips sending the downlink data to a half-duplex frequency division duplex receiving device in the first subframe preceding an uplink subframe, and/or the network device skips sending the downlink data to the half-duplex frequency division duplex receiving device in the first downlink subframe following the uplink subframe.

In the foregoing solution, the network device skips sending the downlink data to the half-duplex frequency division duplex receiving device in the first subframe preceding the uplink subframe, and/or skips sending the downlink data to the half-duplex frequency division duplex receiving device in the first downlink subframe following the uplink subframe, which can avoid overlap between sending in the uplink subframe and receiving in the downlink subframe.

Figure 18:
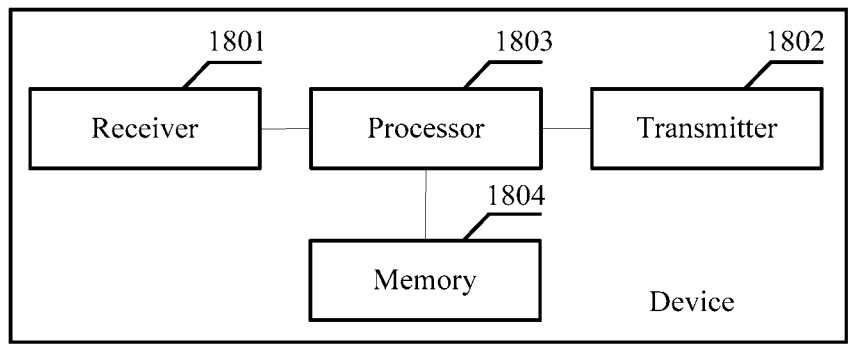
FIG. 18 is a schematic structural diagram of a device according to an embodiment of the present invention.

An embodiment of the present invention further provides another device, configured as a half-duplex frequency division duplex receiving device, as shown in FIG. 18, including: a receiver 1801, a transmitter 1802, a processor 1803, and a memory 1804, where the processor 1803 is configured to: when the receiving device switches from an uplink subframe to a downlink subframe, skip receiving data within a guard interval in a former part of the downlink subframe, or skip sending data within a guard interval in a later part of the uplink subframe.

In the foregoing solution, when switching from the uplink subframe to the downlink subframe, the receiving device is controlled to skip receiving the data within the guard interval in the former part of the downlink subframe, or to skip sending the data within the guard interval in the later part of the uplink subframe, which can avoid overlap between sending in the uplink subframe and receiving in the downlink subframe.

Optionally, the processor 1803 is configured to determine the guard interval by using a time for adjusting an operating frequency by a frequency oscillator and/or an uplink and downlink round-trip propagation delay.

Figure 19:
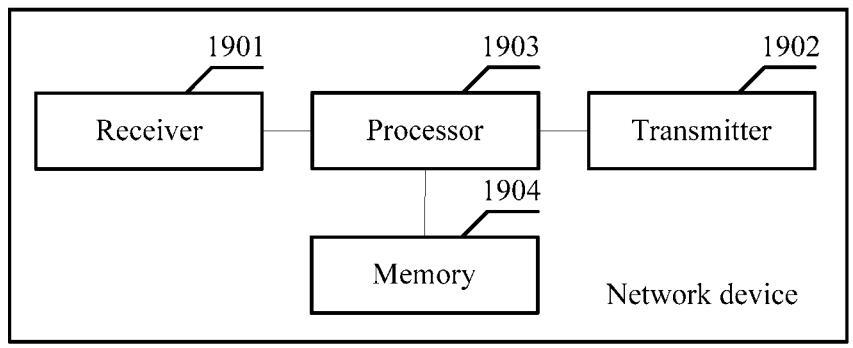
FIG. 19 is a schematic structural diagram of a network device according to an embodiment of the present invention.

An embodiment of the present invention further provides another network device, as shown in FIG. 19, including: a receiver 1901, a transmitter 1902, a processor 1903, and a memory 1904, where the processor 1903 is configured to: control the network device to skip sending downlink data to a half-duplex frequency division duplex receiving device in the first subframe preceding an uplink subframe, and/or control the network device to skip sending downlink data to the half-duplex frequency division duplex receiving device in the first downlink subframe following the uplink subframe. In the foregoing solution, the network device skips sending the downlink data to the half-duplex frequency division duplex receiving device in the first subframe preceding the uplink subframe, and/or skips sending the downlink data to the half-duplex frequency division duplex receiving device in the first downlink subframe following the uplink subframe, which can avoid overlap between sending in the uplink subframe and receiving in the downlink subframe.

It should be noted that, the apparatus division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

The invention claimed is:

1. A method comprising:
performing a first physical random access channel (PRACH) enhanced transmission with a first repetition number; and
in response to a number of PRACH transmission attempts associated with the first repetition number being equal to a maximum number of PRACH transmission attempts, performing a second PRACH transmission with a second repetition number,
wherein the first repetition number is different from the second repetition number, and
wherein the first repetition number and the second repetition number are associated with a same PRACH configuration index.

2. A method comprising:
sending configuration information that indicates at least one of a first repetition number or a second repetition number,
wherein the first repetition number is used for performing a first physical random access channel (PRACH) enhanced transmission, and
wherein the second repetition number is used for performing a second PRACH transmission in response to a number of PRACH transmission attempt associated with the first repetition number being equal to a maximum number of PRACH transmission attempt; and
performing PRACH enhanced receiving,
wherein the first repetition number is different from the second repetition number, and
wherein the first repetition number and the second repetition number are associated with a same PRACH configuration index.

3. An apparatus comprising one or more processors in communication with a non-transitory memory storing computer instructions that, when executed by the one or more processors, cause the apparatus to:
perform a first physical random access channel (PRACH) enhanced transmission with a first repetition number; and
in response to a number of PRACH transmission attempts associated with the first repetition number being equal to a maximum number of PRACH transmission attempts, perform a second PRACH transmission with a second repetition number,
wherein the first repetition number is different from the second repetition number, and
wherein the first repetition number and the second repetition number are associated with a same PRACH configuration index.

4. An apparatus comprising one or more processors in communication with a non-transitory memory storing computer instructions that, when executed by the one or more processors, cause the apparatus to:
send configuration information indicates at least one of a first repetition number or a second repetition number,
wherein the first repetition number is used for performing a first physical random access channel (PRACH) enhanced transmission, and
wherein the second repetition number is used for performing a second PRACH transmission in response to a number of PRACH transmission attempts associated with the first repetition number being equal to a maximum number of PRACH transmission attempts; and
perform PRACH enhanced receiving,
wherein the first repetition number is different from the second repetition number, and
wherein the first repetition number and the second repetition number are associated with a same PRACH configuration index.

5. The method according to claim 1, wherein the second repetition number is higher than the first repetition number.

6. The method according to claim 1, further comprising:
determining a transmit power of the first PRACH transmission or the second PRACH transmission according to at least one of an initial preamble receiving a target power, a path loss, a power ramping step or a power offset value associated with the first repetition number or the second repetition number.

7. The method according to claim 1, further comprising receiving configuration information that indicates at least one of the first repetition number or the second repetition number.

8. The method according to claim 7, wherein the configuration information is a system information block (SIB).

9. The method according to claim 1, wherein the method is performed by a terminal device or a chip in a terminal device.

10. The method according to claim 2, wherein the second repetition number is higher than the first repetition number.

11. The method according to claim 2, wherein the configuration information is a system information block (SIB).

12. The method according to claim 2, wherein the method is performed by a network device or a chip in a network device.

13. The apparatus according to claim 3, wherein the second repetition number is higher than the first repetition number.

14. The apparatus according to claim 3, wherein the instructions, when executed by the one or more processors, further cause the apparatus to:
determine a transmit power of the first PRACH transmission or the second PRACH transmission according to at least one of initial preamble receiving target power, a path loss, a power ramping step or a power offset value associated with the first repetition number or the second repetition number.

15. The apparatus according to claim 3, further comprising receiving configuration information that indicates at least one of the first repetition number or the second repetition number.

16. The apparatus according to claim 15, wherein the configuration information is a system information block (SIB).

17. The apparatus according to claim 3, wherein the apparatus is a terminal device or a chip in a terminal device.

18. The apparatus according to claim 4, wherein the second repetition number is higher than the first repetition number.

19. The apparatus according to claim 4, wherein the configuration information is a system information block (SIB).

20. The apparatus according to claim 4, wherein the apparatus is a network device or a chip in a network device.

\* \* \* \* \*